(12) United States Patent
Ohashi et al.

(10) Patent No.: US 7,677,038 B2
(45) Date of Patent: Mar. 16, 2010

(54) PUMP UNIT

(75) Inventors: Ryota Ohashi, Amagasaki (JP);
Hironori Sumomozawa, Amagasaki
(JP); Nobuhisa Kamikawa, Amagasaki
(JP); Masahisa Kawamura, Amagasaki
(JP)

(73) Assignee: Kanzaki Kokyukoki Mfg. Co., Ltd.,
Amagasaki, Hyogo (JP)

( * ) Notice: Subject to any disclaimer, the term of this
patent is extended or adjusted under 35
U.S.C. 154(b) by 253 days.

(21) Appl. No.: 11/625,046

(22) Filed: Jan. 19, 2007

(65) Prior Publication Data

US 2007/0144169 A1 Jun. 28, 2007

Related U.S. Application Data

(60) Continuation-in-part of application No. 11/530,547, filed on Sep. 11, 2006, now Pat. No. 7,409,829, which is a continuation of application No. 11/464,938, filed on Aug. 16, 2006, now Pat. No. 7,418,819, which is a continuation of application No. 11/330,329, filed on Jan. 12, 2006, now Pat. No. 7,121,091, which is a continuation of application No. 10/864,571, filed on Jun. 10, 2004, now Pat. No. 7,028,472, which is a continuation of application No. 10/826,287, filed on Apr. 19, 2004, now Pat. No. 7,131,268, said application No. 11/464,938 is a continuation of application No. 10/166,770, filed on Jun. 12, 2002, now Pat. No. 6,772,591, which is a division of application No. 10/166,770, which is a division of application No. 09/644,568, filed on Aug. 24, 2000, now Pat. No. 6,425,244.

(30) Foreign Application Priority Data

Oct. 18, 1999 (JP) .................................. 11-295833
Oct. 18, 1999 (JP) .................................. 11-295845
Oct. 18, 1999 (JP) .................................. 11-296003
Nov. 22, 1999 (JP) .................................. 11-331315
Mar. 23, 2000 (JP) ............................. 2000-082051

(51) Int. Cl.
*F04B 49/00* (2006.01)
*F04B 23/00* (2006.01)
(52) U.S. Cl. ......................................... 60/453; 60/487
(58) Field of Classification Search .................. 60/453,
60/484, 486, 487, 488
See application file for complete search history.

(56) References Cited

U.S. PATENT DOCUMENTS 3,680,312 A 8/1972 Forster (Continued)

FOREIGN PATENT DOCUMENTS

JP 50-26231 3/1974

(Continued)

OTHER PUBLICATIONS

Notification of Reasons for Rejection for corresponding Japanese patent Appl. No. H11-331315, (with English translation) Japanese Patent Office, mailed Apr. 17, 2009, 4 pgs.

(Continued)

*Primary Examiner*—Thomas E Lazo
(74) *Attorney, Agent, or Firm*—Sterne, Kessler, Goldstein & Fox P.L.L.C.

(57) ABSTRACT

There is provided a pump unit including plurality of hydraulic pumps respectively fluidly connected to plurality of hydraulic motors, which are disposed away from the pump unit, so as to form closed circuits, the pump unit including a pump case accommodating the plurality of hydraulic pumps so that the plurality of hydraulic pumps are operatively driven by a common power source; and a filter mounted at the pump case so as to be inserted in a charge passage for replenishing operation fluid from a fluid sump to the closed circuits.

10 Claims, 70 Drawing Sheets

U.S. PATENT DOCUMENTS

| | | | |
|---|---|---|---|
| 3,966,841 | A | 6/1976 | Combs |
| 4,044,557 | A | 8/1977 | Stoessel et al. |
| 4,920,733 | A | 5/1990 | Berrios |
| 4,934,252 | A | 6/1990 | Giere |
| 4,955,249 | A | 9/1990 | Wetor |
| 5,069,037 | A | 12/1991 | Sakigawa et al. |
| 5,094,077 | A | 3/1992 | Okada |
| 5,394,699 | A | 3/1995 | Matsufuji |
| 5,622,051 | A | 4/1997 | Iida |
| 5,800,134 | A | 9/1998 | Hasegawa et al. |
| 5,819,535 | A | 10/1998 | Smothers |
| 5,918,691 | A | 7/1999 | Ishii |
| 5,957,229 | A | 9/1999 | Ishii |
| 5,957,666 | A | 9/1999 | Lee |
| 6,073,443 | A | 6/2000 | Okada |
| 6,122,996 | A | 9/2000 | Hauser et al. |
| 6,189,641 | B1 | 2/2001 | Azuma |
| 6,233,929 | B1 | 5/2001 | Okada |
| 6,332,393 | B1 | 12/2001 | Trimble |
| 6,361,282 | B1 | 3/2002 | Wanschura |
| 6,487,856 | B1 | 12/2002 | Ohashi et al. |
| 6,494,686 | B1 | 12/2002 | Ward |
| 6,672,843 | B1 | 1/2004 | Holder |
| 6,736,605 | B2 | 5/2004 | Ohashi et al. |
| 7,409,829 | B2 | 8/2008 | Ohashi et al. |
| 7,418,819 | B2 | 9/2008 | Ohashi et al. |

FOREIGN PATENT DOCUMENTS

| | | |
|---|---|---|
| JP | 59-175676 | 11/1984 |
| JP | 64-24626 | 2/1989 |
| JP | 06-017926 | 1/1994 |
| JP | 06-297969 | 10/1994 |
| JP | 06-336123 | 12/1994 |
| JP | 07-315064 | 12/1995 |
| JP | 08-219253 | 8/1996 |
| JP | 8-230495 | 9/1996 |
| JP | 09-209920 | 8/1997 |
| JP | 10-205432 | 8/1998 |
| JP | 10-266948 | 10/1998 |
| JP | 11-48804 | 2/1999 |
| JP | 11-048804 | 2/1999 |
| JP | 11-235931 | 8/1999 |

OTHER PUBLICATIONS

Notification of Reasons for Rejection for corresponding Japanese patent Appl. No. H11-295845, (with English translation) Japanese Patent Office, mailed Aug. 21, 2009, 4 pgs.

PUMP UNIT

BACKGROUND OF THE INVENTION

Field of the Invention

The present invention relates to a pump unit that includes plurality of hydraulic pumps respectively fluidly connected to plurality of hydraulic motors, which are disposed away from the pump unit, so as to form closed circuits.

For example, U.S. Pat. No. 4,920,733 discloses a vehicle including first and second hydraulic pumps respectively connected via first and second hydraulic lines to the first and second hydraulic motors for driving the right and left drive wheels. In this vehicle, the first and second hydraulic motors respectively have outputs variable in response to the adjustment of the input/output flow rates of the first and second hydraulic pumps, thereby controlling the rotational speed and rotational direction of the right and left drive wheels.

The vehicle of the above arrangement has the first hydraulic pump and the second hydraulic pump separately arranged from one another, the former being operated in association with the first hydraulic motor, and the latter being operated in association with the second hydraulic motor. Such a separate arrangement of the hydraulic pumps involves a troublesome piping work between the first and second hydraulic pumps and the first and second hydraulic motors, a troublesome assembling work of the pump unit, a complicated transmission mechanism from a driving source to the first and second hydraulic pumps, and pose various other problems.

Moreover, in a case where the hydraulic pump is fluidly connected to the hydraulic motor so as to constitute a closed circuit, a charging mechanism for replenishing the closed circuit is required.

Specifically, in the configuration where pressurized fluid is fed to the closed circuit by the charging mechanism, a filtering structure including a filter is needed in order to prevent impurities from entering into the closed circuit. However, in the prior filtering mechanism, the filter is disposed away from the hydraulic pump and the hydraulic motor.

In the prior configuration, it is needed to provide an exclusive mounting member such as a mounting stay for fixing the filter, and is also needed to fluidly connect between a fluid tank and the filter via one external conduit and to fluidly connect between the filter and the closed circuit via another external conduit, resulting in posing a problem of increasing the cost of the filtering structure.

The present invention has been therefore conceived in consideration of the above prior art. It is an object of the present invention to provide a pump unit including plurality of hydraulic pumps respectively fluidly connected to plurality of hydraulic motors, which are disposed away from the pump unit, so as to form closed circuits, the pump unit being capable of achieving the simplification of the piping work between the hydraulic pumps and the hydraulic motors, the simplification of transmission mechanism for transmitting power from a power source to the plurality of hydraulic pumps and the simplification of the assembling work of the hydraulic pumps as well as the simplification of the filtering structure for filtering operation fluid that is fed into the closed circuit as the replenishing fluid.

BRIEF SUMMARY OF THE INVENTION

According to the present invention, there is provided a pump unit including plurality of hydraulic pumps respectively fluidly connected to plurality of hydraulic motors, which are disposed away from the pump unit, so as to form closed circuits, the pump unit including a pump case accommodating the plurality of hydraulic pumps so that the plurality of hydraulic pumps are operatively driven by a common power source; and a filter mounted at the pump case so as to be inserted in a charge passage for replenishing operation fluid from a fluid sump to the closed circuits.

With the above arrangement, since the plurality of hydraulic pumps are accommodated in the single pump case, it is possible to achieve a simplified piping work in fluidly connecting the plurality of hydraulic pumps and the plurality of hydraulic motors, a simplified transmission mechanism for transmitting power from the power source to the plurality of hydraulic pumps, and the simplified assembling work in mounting the pump unit to a position to be mounted. In addition, since the filter is mounted at the pump case, it is possible to omit an exclusive mounting member such as a mounting stay for fixing the filter at a portion such as a vehicle frame to be mounted and an external conduit for fluidly connecting the filter and the pump unit.

In one embodiment, the pump unit further includes a charge pump having a suction side fluidly connected to the fluid sump and a discharge side fluidly connected to the charge passage, the charge pump operatively driven by the common power source.

For example, the filter is mounted at a charge pump case accommodating the charge pump.

Preferably, the filter is mounted at the charge pump case in a threaded manner.

Preferably, the plurality of hydraulic pumps includes first and second hydraulic pumps respectively driven by first and second pump shafts that are arrange in parallel to each other; the charge pump is driven by one of the first and second pump shafts, the one pump shaft having an output end that extends outwards from the pump case accommodating the first and second hydraulic pumps; and the filter is mounted at the charge pump case so as to overlap with the hydraulic pump driven by the other pump shaft out of the first and second pump shafts when seen from the front along the axial direction of the first and second pump shafts.

With the arrangement, it is possible to utilize a dead space in the pump unit as a mounting space for the filer.

Preferably, the filter includes a filer case having a contact surface contacted to the charge pump case, a filter body accommodated in the filter case, and a filter-side suction passage and a filter-side discharge passage having openings opened to the contact surface, the filter-side suction passage and the filter-side discharge passage being fluidly connected to each other trough the filter body. The filter is mounted at the charge pump case so that the openings of the filter-side suction passage and the filter-side discharge passage face upward on the basis of the mounting state of the pump unit.

With the arrangement, it is possible to effectively prevent the air from remaining within the filter.

Preferably, the pump unit further includes plurality of pump shafts respectively driving the plurality of hydraulic pumps, the plurality of pump shafts being arranged in parallel with respect to one another. The charge pump is driven by one of the plurality of pump shafts; and the filter is mounted at the charge pump case so as to extend in a direction orthogonal to an axis line of the one pump shaft.

With the arrangement, it is possible to mount the filter at the charge pump case while preventing enlargement of the pump unit with respect to the axis lines of the pump shafts.

Preferably, the pump unit further includes a suction fluid passage fluidly connected to a suction side of the charge pump; a discharge fluid passage fluidly connected to a discharge side of the charge pump; a charge passage for replenishing a part of pressurized fluid in the discharge fluid passage into each of the closed circuits; and a working machine operating fluid passage for supplying a part of the pressurized fluid in the discharge fluid passage toward an external hydraulic device.

With the arrangement, it is possible to replenish operation fluid into the closed circuits and supply operation fluid to the external hydraulic device without providing an additional hydraulic pressure source such as an auxiliary pump.

Preferably, the pump unit further includes a working machine switching valve for selectively communicating or shutting off the working machine operating fluid passage.

With the arrangement, it is possible to omit an exclusive mounting member such as a mounting stay for fixing the working machine switching valve at a portion such as a vehicle frame to be mounted and an external conduit for fluidly connecting the working machine switching valve and the pump unit.

For example, the working machine operating fluid passage includes a proximal end fluidly connected to the discharge fluid passage and distal ends branched so as to have two working machine operating fluid ports; and the working machine switching valve is inserted in one of the two branched passages.

Preferably, hydraulic fluid ports to the plurality of hydraulic motors and a working machine operating fluid port to the external hydraulic device are faced to the same direction with respect to one another.

With the arrangement, it is possible to achieve the simplified piping work in connecting conduits to the ports.

Preferably, the pump unit further includes a relief valve that has a primary side fluidly connected to the discharge fluid passage. The working machine operating fluid passage is fluidly connected to the discharge fluid passage via a sequence valve; and the charge passage is fluidly connected to the discharge fluid passage via a pressure-reducing valve.

With the arrangement, it is possible to secure the pressurized fluid in the charge passage and the working machine operating fluid passage.

Preferably, the pump unit further includes a PTO shaft operatively driven by the common power source; a hydraulic PTO clutch for selectively engaging or disengaging power transmission from the common power source to the PTO shaft; a PTO fluid passage having a proximal end fluidly connected to the discharge fluid passage via an orifice and a distal end fluidly connected to the PTO clutch; a PTO switching valve inserted within the PTO fluid passage; and a PTO relief valve having a primary side fluidly connected to the PTO fluid passage.

With the arrangement, it is possible to supply operation fluid to the PTO clutch device without providing an additional hydraulic pressure source.

BRIEF DESCRIPTION OF THE DRAWINGS/FIGURES

The above, and other objects, features and advantages of the present invention will become apparent from the detailed description thereof in conjunction with the accompanying drawings wherein.

DETAILED DESCRIPTION OF THE INVENTION

First Embodiment

The first embodiment of the pump unit according to the present invention will be hereinafter described with reference to the accompanying drawings.

A pump unit 100 according to the first embodiment of the present invention is designed to be operated in association with an actuator that is connected thereto via first and second pairs of hydraulic lines 184a and 184b and driven through an effect of pressurized hydraulic fluid in the pair of hydraulic lines. This embodiment will be described by taking for example the case that hydraulic motors 182a and 182b each are used as the actuator.

Figure 1:
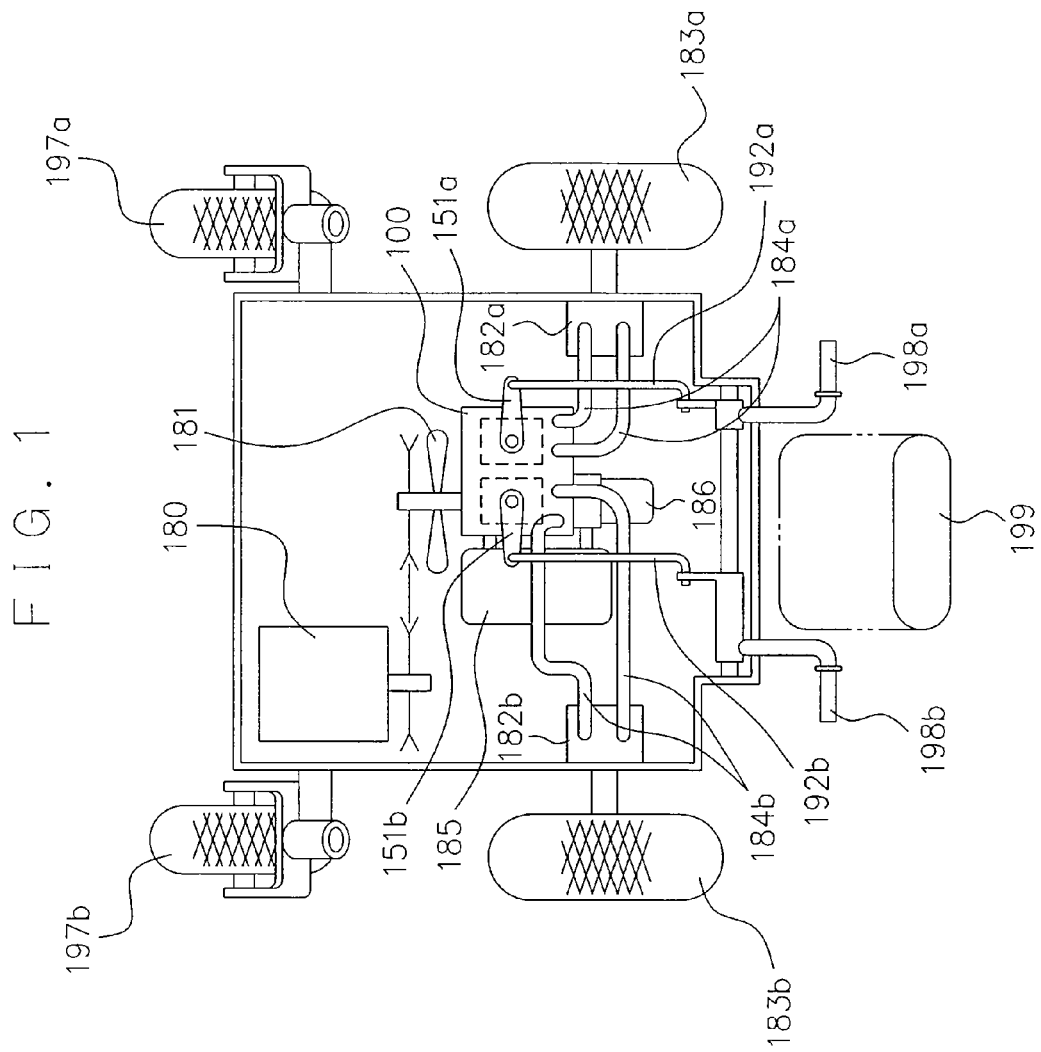
FIG. 1 is an expansion plan view of a vehicle to which a pump unit according to a first embodiment of the present invention is applied.
Figure 2:
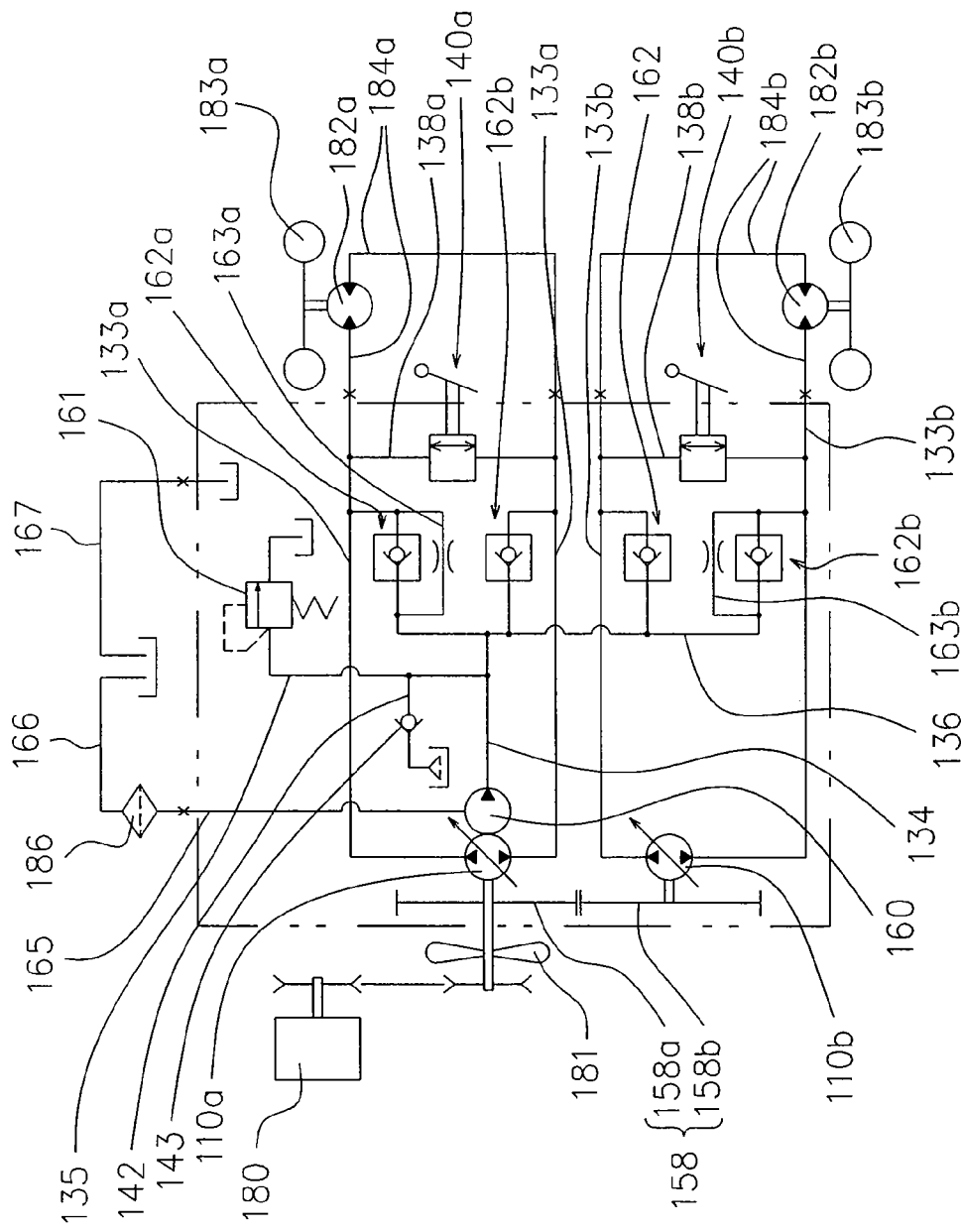
FIG. 2 is a hydraulic circuit diagram of the vehicle shown in FIG. 1.
Figure 3:
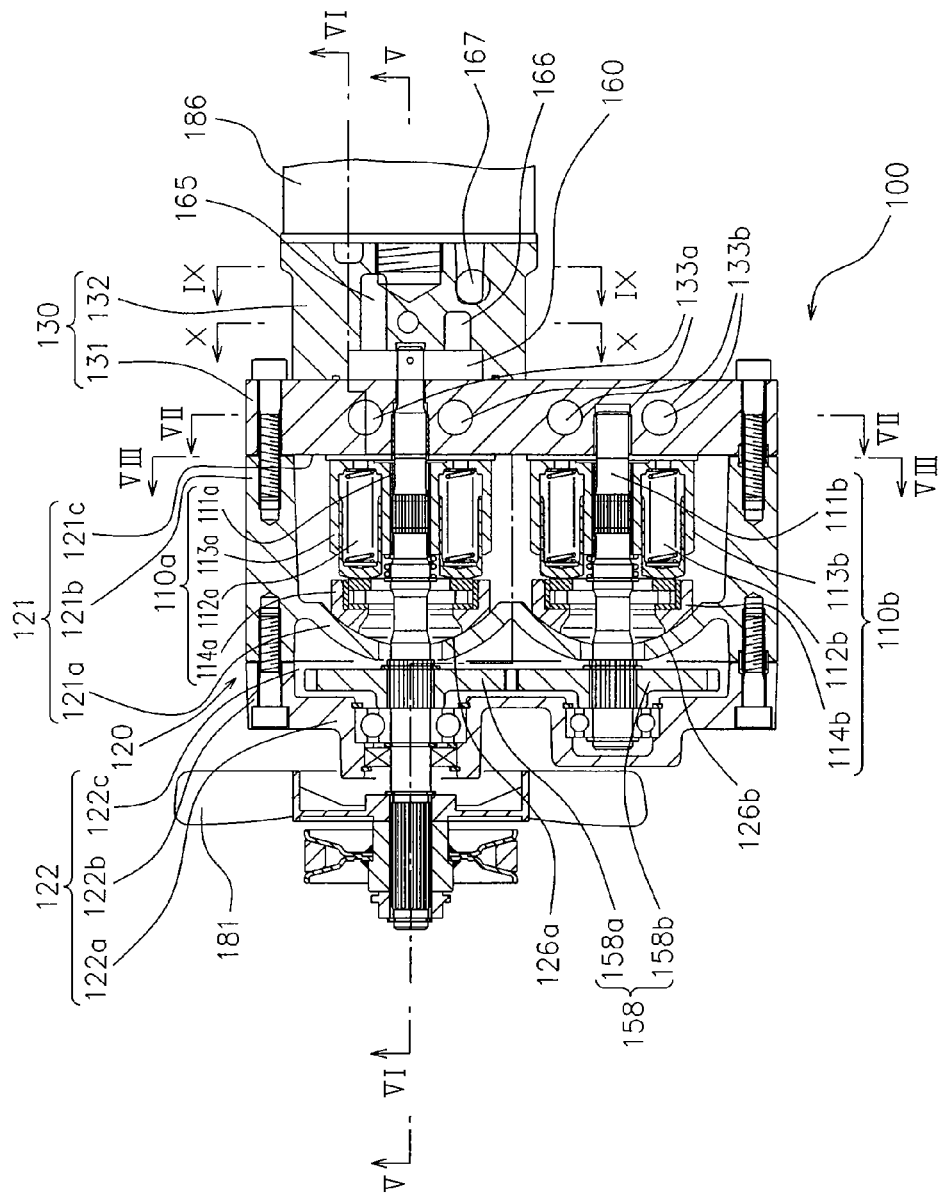
FIG. 3 is a cross sectional plan view of the pump unit according to the first embodiment.
Figure 4:
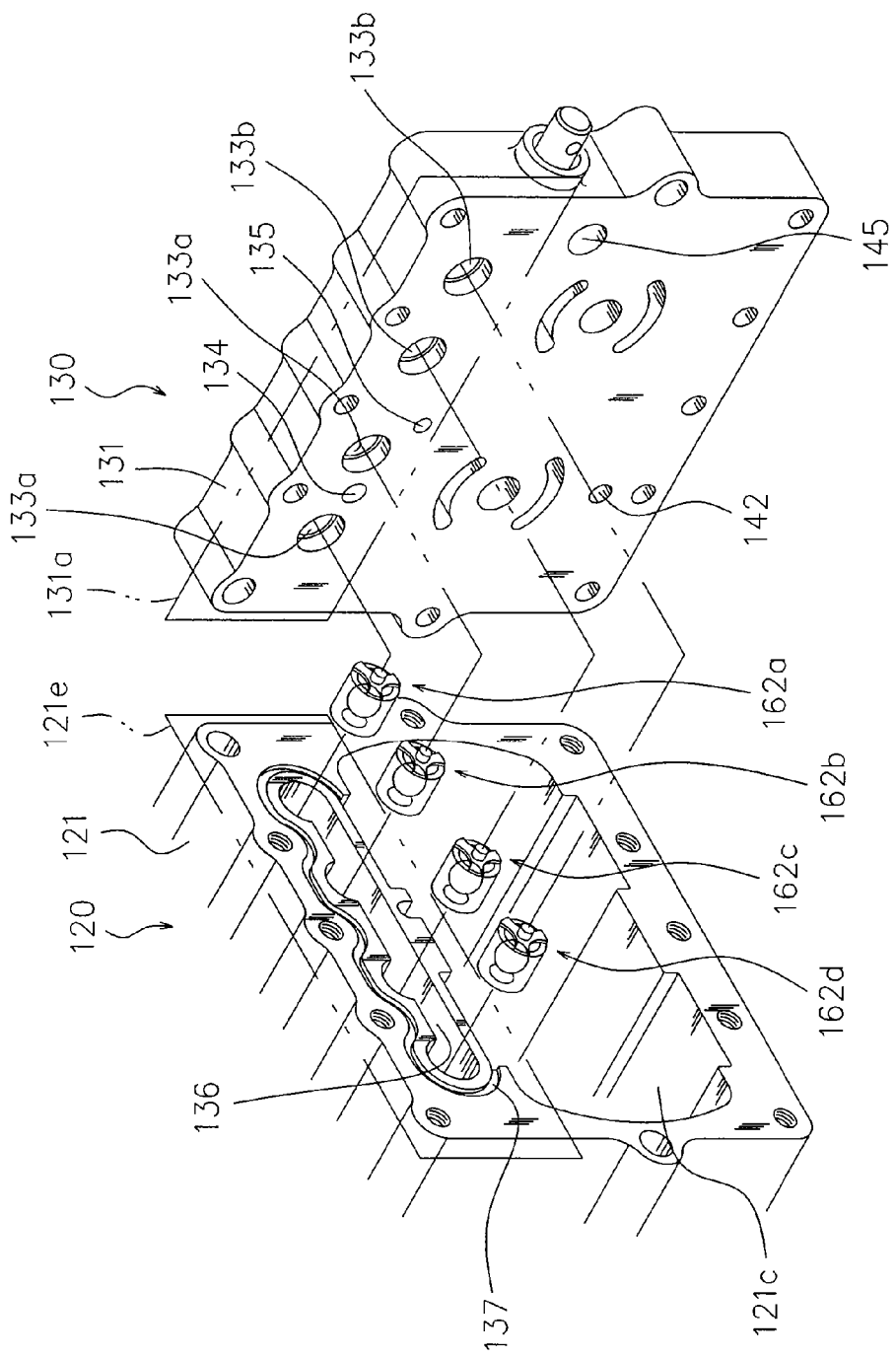
FIG. 4 is a perspective view with a partially exploded portion of the pump unit of FIGS. 2 and 3.
Figure 10:
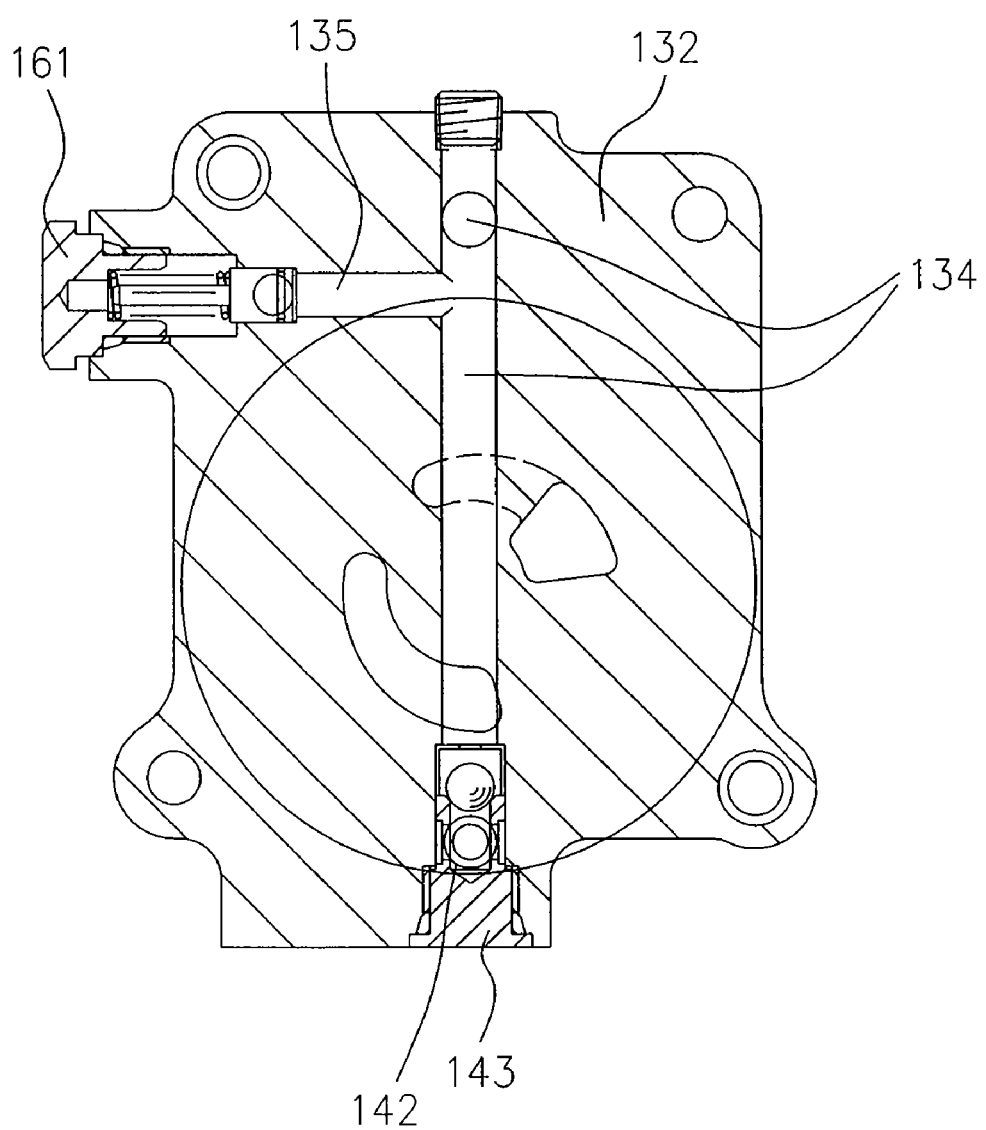
FIG. 10 is a cross section taken along line X-X in FIG. 3.
Figure 11:
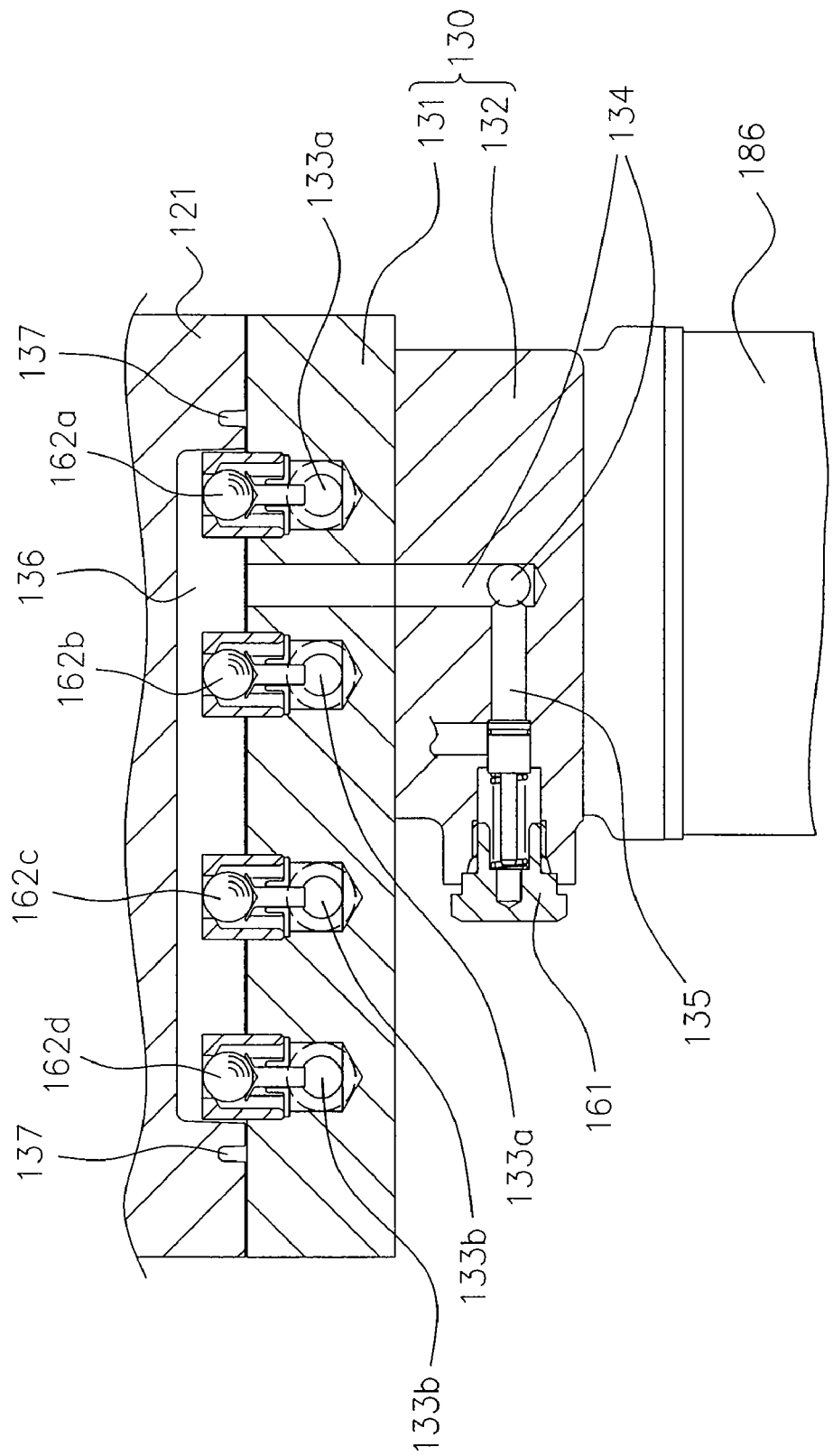
FIG. 11 is a cross section taken along line XI-XI in FIG. 6.

FIGS. 1 and 2 are respectively an expansion plan view of a vehicle to which the pump unit 100 of this embodiment is applied, and a hydraulic circuit of the vehicle. FIG. 3 is a cross sectional plan view of the pump unit and its periphery. FIG. 4 is a perspective view with a partially exploded portion of the pump unit. FIGS. 5 to 10 are respectively cross sections taken along lines V-V, VI-VI, VII-VII, VIII-VIII, IX-IX, and X-X in FIG. 3. FIG. 11 is a cross section taken along lines XI-XI in FIG. 6. The reference codes 185, 197a and 197b, and 199 in FIG. 1 respectively represent a reservoir tank, caster wheels, and a driver seat.

As illustrated in FIGS. 2 and 3, the pump unit 100 includes a first hydraulic pump 110a, a second hydraulic pump 110b, a pump case 120 that accommodates the first and second hydraulic pumps 110a and 110b and has an opening 121c through which the hydraulic pumps are inserted into the pump case 120, and a center section 130 connected to the pump case so as to close the opening of the pump case.

In this embodiment, the pump unit 100 is explained as having a pair of hydraulic pumps. However, the present invention is not necessarily limited to this arrangement. Rather, it is applicable to the case where a single hydraulic pump is used, or three or more than three hydraulic pumps are used.

As illustrated in FIG. 2, the first and second hydraulic pumps 110a and 110b are of a variable displacement type, which has a variable input/output flow rates through the operation of a swash plate. The hydraulic pumps 110a and 110b are respectively connected to the first and second hydraulic motors 182a and 182b serving as the actuator, via the first pair of hydraulic lines 184a and the second pair of hydraulic lines 184b.

Accordingly, varying the input/output flow rates of each of the hydraulic pumps 110a and 11b through the swash plate causes the pressure difference between the first pair of hydraulic lines 184a, and the second pair of hydraulic lines 184b. According to the operational angle of the swash plate, motor shafts of the first hydraulic motor 182a and/or the second hydraulic motor 182b are rotated, and drive wheels 183a and 183b that are operatively connected to the motor shafts are driven. The reference codes 180 and 181 in FIG. 2 respectively represent a power source and a cooling fan.

As described above, the first and second hydraulic pumps 110a and 110b according to this embodiment are of the variable displacement type, and the first and second hydraulic motors 182a and 182b in association with the hydraulic pumps 110a and 110b are of a fixed displacement type. However, the present invention is not necessarily limited to this arrangement. That is, it is possible to employ the hydraulic pumps of the fixed displacement type, and the hydraulic motors of the variable displacement type driven by the hydraulic pumps or the hydraulic pumps and the hydraulic motors, both of which are of the variable displacement type.

In this embodiment, the first and second hydraulic pumps 110a and 110b are of an axial piston type. Alternatively, the pump unit may employ the hydraulic pumps of a radial piston type.

Figure 5:
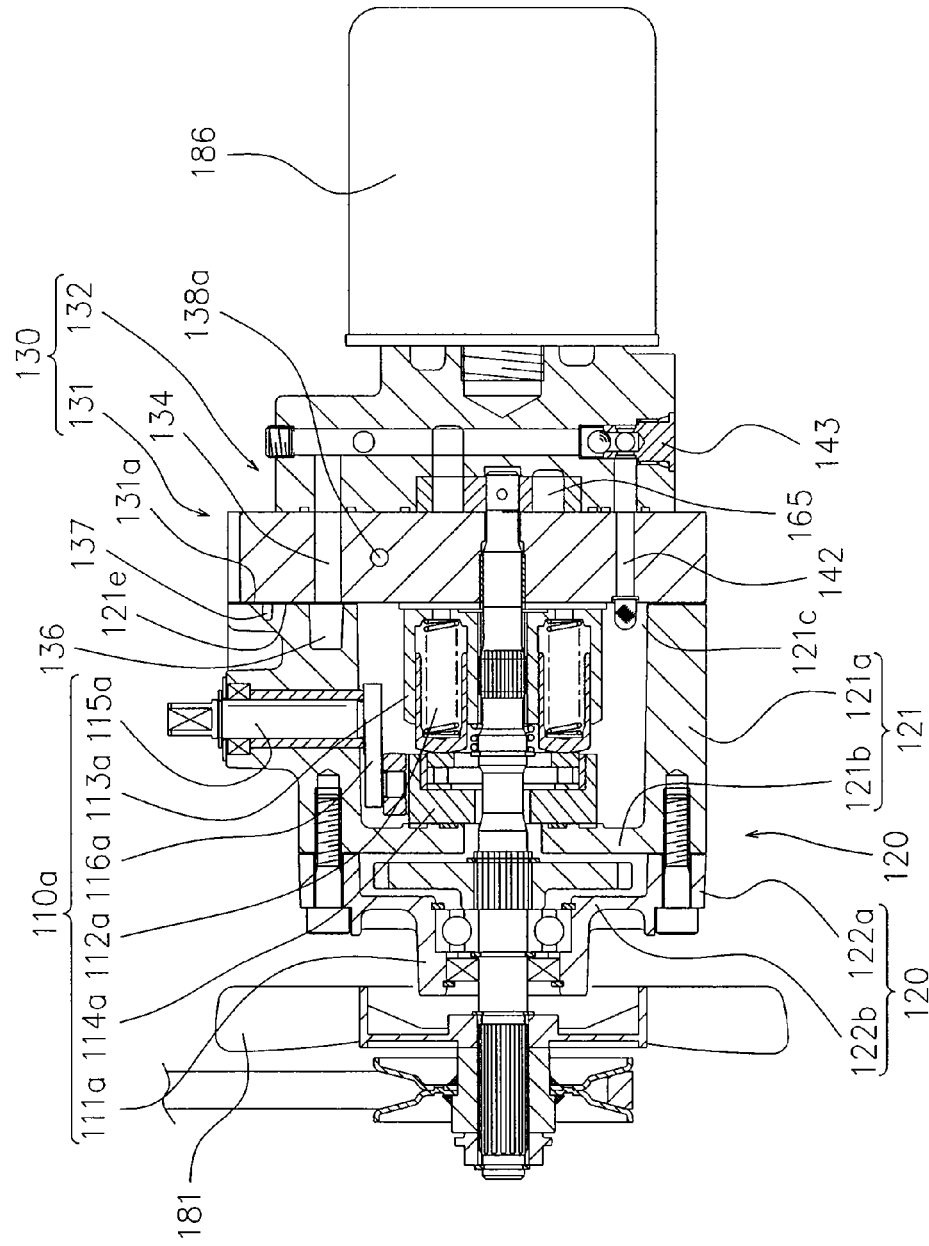
FIG. 5 is a cross section taken along line V-V in FIG. 3.

As illustrated in FIGS. 3 and 5, the first and second hydraulic pumps 110a and 110b respectively include a first hydraulic pump shaft 111a and a second hydraulic pump shaft 111b, both of which are disposed parallel to one another, a first piston unit 112a and a second piston unit 112b that are reciprocatingly movable according to the rotation of the pump shafts, a first cylinder block 113a and a second cylinder block 113b that reciprocably support the piston units, a first angularly adjustable swash plate 114a and a second angularly adjustable swash plate 114b that regulate the stroke lengths of the piston units by varying their tilting angles to vary their input/output flow rates, and a first control shaft 115a and a second control shaft 115b that control the tilting angles of these swash plates.

As illustrated in FIG. 5, the first control shaft 115a has an inner end extending into the pump case 120 and connected to the first angularly adjustable swash plate 114a via an arm 116a, and an outer end extending vertically above the pump case 120. The second control shaft 115b has a similar arrangement (not shown).

In this embodiment, the pump unit 100 is of a horizontal type that has the horizontally extending first and second hydraulic pump shafts 111a and 111b. However, the present invention is not necessarily limited to this arrangement. Rather, it is a matter of course to employ the pump unit of a vertical type that has the vertically extending first and second hydraulic pump shafts 111a and 111b.

The pump unit 100 further includes a neutral position return mechanism 150 that returns the swash plates 114a and 114b of the first and second hydraulic pumps 110a and 110b to their respective neutral positions. A plan view of a portion of the pump unit 100 is illustrated in FIG. 12.

The neutral position return mechanism 150 includes a first neutral position return mechanism 150a for the first hydraulic pump 110a, and a second neutral position return mechanism 150b for the second hydraulic pump 110b disposed on a common base plate 150c mounted on the upper surface of the pump case 120. The following description, which will be made for the first neutral position return mechanism 150a, will also be applicable for the second neutral position return mechanism 150b.

Figure 12:
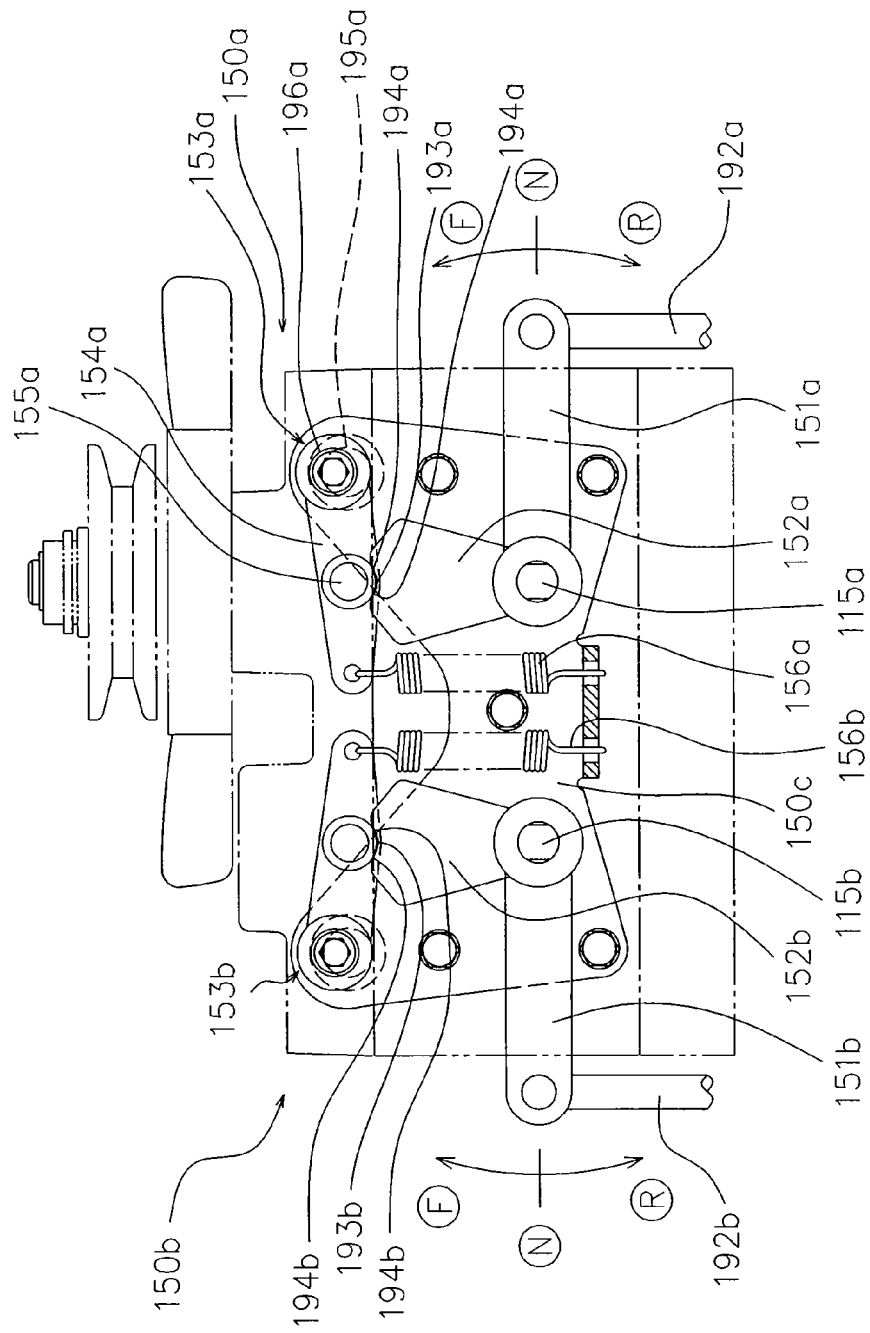
FIG. 12 is a plan view of the pump unit of FIGS. 2 and 3.

As illustrated in FIG. 12, the first neutral position return mechanism 150a includes a connecting arm 151 with a first end pivotably connected to a connecting member 192a connected to a control lever 198a (see FIG. 1) and a second end non-rotatably connected to the control shaft 115a, a swing arm 152a with a proximal end non-rotatably connected to the control shaft 115a and a distal end as a free end, and an eccentric pin 153a detachably fixed to the upper surface of the pump case 120.

The swing arm 152a has a distal edge defining a deepest part 193a near the shaft center of the control shaft 115a, and cam surfaces laterally extending from the deepest part in such a manner as to gradually increase the distance from the shaft center of the control shaft 115a as they extend away from the deepest part.

The eccentric pin 153a has a first shaft portion 195a mounted on the upper surface of the base plate 150c, and a second shaft portion 196a extending upwardly from the first shaft portion 195a. The second shaft portion has the shaft center eccentric to that of the first shaft portion, so that the second shaft portion 196a has the shaft center rotated around the shaft center of the first shaft portion 195a through the rotation of the first shaft portion 195a around the shaft center thereof.

The first neutral position return mechanism 150a further includes a pressing arm 154a with a proximal end rotatably supported on the second shaft portion 196a of the eccentric pin 150, and a distal end as a free end. The pressing arm 154a is provided with a roller 155a engageable with the distal edge of the swing arm 152a. The pressing arm 154a and the swing arm 152a are disposed in such a manner as to have the roller 155a engageable with the deepest part 193a of the swing arm 152a, when the swash plate of the hydraulic pump 110a lies at the neutral position.

Specifically, the pressing arm 154a is positioned such that the roller 155a is engaged with the deepest part 193a of the swing arm 152a, while holding the swash plate of the hydraulic pump 110a at a position to be considered as the neutral position. At this time, there may occur the case where the hydraulic pump 110a is not brought into a neutral state due to assembling errors or the like. Specifically, there may occur the case the swing arm 152a must be rotated by a predetermined angle in either direction around the shaft center of the control shaft 115a from a predetermined design position illustrated in FIG. 12, in order to have the swash plate lying at the neutral position.

Even if such a positional error occurs, the first neutral position return mechanism 150 can adjust the relative displacement between the control shaft 115a and the connecting member 192a easily. Specifically, in the first neutral position return mechanism 150, the eccentric pin 153a has the second shaft portion 196a as the supporting point of the pressing arm 154a, which shaft portion is eccentric to the first shaft portion 195a, thereby allowing the second shaft portion 196a to have the shaft center easily adjustable through the rotation of the first shaft portion 195a around the shaft center thereof, and hence the roller 155a to have an easily adjustable distance relative to the swing arm 152a. Thus, the roller 155a can easily be brought into engagement with the deepest part 193a of the swing arm 152a, even when the hydraulic pump 110a cannot come into the neutral state without the rotation of the swing arm 152a by a predetermined angle around the shaft center of the control shaft 115 from the predetermined design position.

The first neutral position return mechanism 150a further includes a spring member 156a to urge the roller 155a towards the distal edge of the swing arm 152a.

The first neutral position return mechanism 150a having the above arrangement performs in the following manner. When the driver operates the mechanism 150a through the shifting operation of a control lever 198a provided near the driver seat, the connecting member 192a is slidingly moved along either direction (F or R with N therebetween) indicated by the arrows of FIG. 12 according to the shifting operation of the control lever 198a, thereby pivotally moving the connecting arm 151a, and hence rotating the control shaft 115a. The swash plate can be thus tilted according to the shifting operation of the control lever.

On the other hand, when the driver releases the control lever 198a from its operational state where the swash plate is held in a tilted position, the first neutral position return mechanism 150a can automatically return the swash plate of the hydraulic pump to the neutral position. Specifically, since the swash plate tilted in either direction from the neutral position causes the control shaft 115a to be rotated around the shaft center thereof in either direction from the neutral position, the swing arm 152a is pivotally moved in either direction around the shaft center of the control shaft 115a according to the rotation angle of the control shaft 115a. Accordingly, the roller 155a is engaged with one of the cam surfaces defined by the distal edge of the swing arm 152a. As described above, since the roller 155a is constantly urged towards the distal edge of the swing arm 152a by the spring member 156a, the swing arm 152a automatically returns to the neutral position, at which the roller 155a is engaged with the deepest part 193a, through a camming effect between the roller 155a and the cum surface 194a by releasing the control lever from the operational state where the roller 155a is engaged with the cum surface 194a.

Thus, the first neutral position return mechanism 150a performs so that the swash plate of the hydraulic pump 110a automatically returns to the neutral position in response to releasing the control lever 198a from the operational state.

The second neutral position return mechanism 150b has a similar arrangement. Accordingly, the right and left control levers 198a and 198b are controlled independently of each other, so that the first and second hydraulic pumps can have the swash plates tilted independently of each other. Both control levers 198a and 198b are released from the operational states to stop the vehicle without any delay.

As best illustrated in FIG. 3, the pump unit 100 further includes a power transmission mechanism 158 that is accommodated within the housing 120 to operatively connect the first hydraulic pump shaft 111a to the second hydraulic pump shaft 111b.

The power transmission mechanism 158 provided in the pump unit 100 can simultaneously drive both hydraulic pump shafts 111a and 111b only by connecting the power source 180 to either one of the first hydraulic pump shaft 111a and the second hydraulic pump shaft 111b, resulting in a simple transmission arrangement between the power source 180 and the pump unit 100.

In this embodiment, the power transmission mechanism 158 is in the form of a gear transmission device that includes a first gear 158a non-rotatably supported on the first hydraulic pump shaft 111a, and a second gear 158b non-rotatably supported on the second hydraulic pump shaft 111b in meshed engagement with the first gear 158a. Instead of the gear transmission device, any conventional power transmission mechanisms such as chain and belt may be used.

Figure 7:
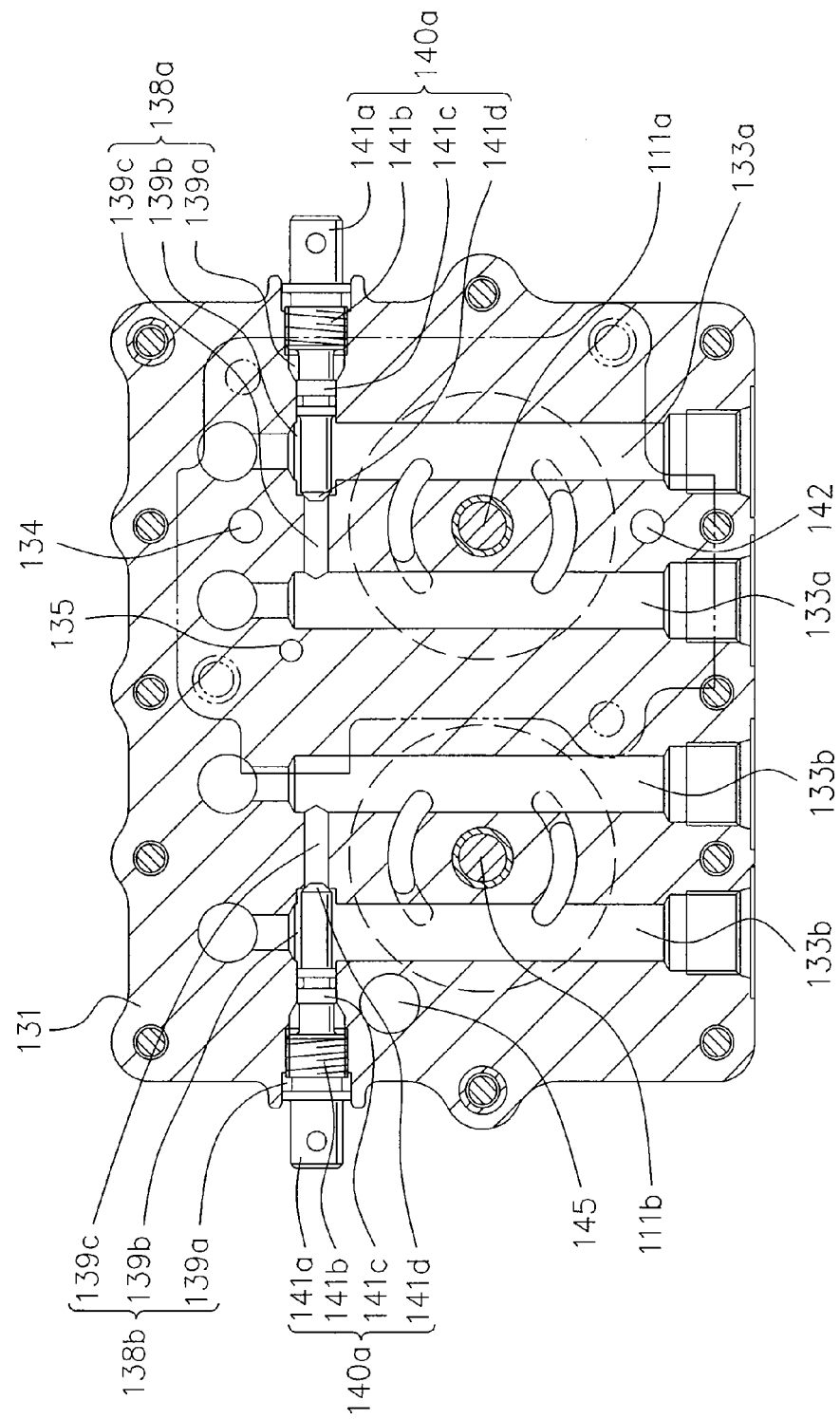
FIG. 7 is a cross section taken along line VII-VII in FIG. 3.

The pump case 120 is sealed in a liquid tight manner by the center section 130, thereby reserving the hydraulic fluid within the pump case 120. Specifically, the pump case 120 also serves as a part of a reservoir tank. The reference code 145 in FIGS. 4 and 7 represents a hole used along with a separately provided hydraulic fluid tank to communicate the inside of the pump case with the hydraulic fluid tank.

As illustrated in FIG. 3, the pump case 120 includes a first pump case 121 for accommodating the first and second hydraulic pumps 110a and 110b, and a second pump case 122 for accommodating the power transmission mechanism 158.

As best illustrated in FIGS. 3 and 5, the first pump case 121 has a box shape with a first side wall 121a disposed in either side along the longitudinal direction of the hydraulic pump shafts 111a and 111b, or in this embodiment in the front side of the vehicle, which will be hereinafter referred to simply as the front side, and a peripheral wall 121b extending from a peripheral edge of the first sidewall 121a to the opposite side of the pump unit 100 along the longitudinal direction of the hydraulic pump shafts 111a and 111b (i.e., the rear side of the vehicle in this embodiment, which will be referred to simply as the rear side). The first sidewall 121a forms bearing holes through which the first and second hydraulic pump shafts 111a and 111b respectively extend. The rear side has an end surface defining the opening 121c for receiving the first and second hydraulic pumps 110a and 110b. The opening of the pump case 121 is sealed by the center section 130 in a liquid tight manner.

The second pump case 122 has a box shape with a front sidewall 122a and a peripheral wall 122b extending from a peripheral edge of the front sidewall 122a to the rear side to form a box shape. The front sidewall 122a forms a bearing hole through which the front end portion of the first hydraulic pump shaft 111b extend, and a bearing portion for supporting the front end portion of the second hydraulic pump shaft 111b. The rear side of the second pump case 122 has an end surface forming an opening 122c for receiving the power transmission mechanism 150.

The second pump case 122 is connected to the first pump case 121 so that the opening 122c can be sealed by the first sidewall 121a of the first pump case 121 in a liquid tight manner, and forms an accommodation space of the power transmission mechanism 158 in cooperation with the first sidewall 121a of the first pump case 121.

In the thus arranged pump case 120, the first sidewall 121a of the first pump case 121 serves as a partition wall dividing the pump case accommodation space into a hydraulic pump accommodation chamber and a power transmission mechanism accommodation chamber. The partition wall thus defining the hydraulic pump accommodation chamber and the power transmission mechanism accommodation chamber can effectively prevent any foreign matters such as iron powder generated in the power transmission mechanism 158 from intruding into the hydraulic pump accommodation chamber, and hence damaging piston units 112a, 112b, cylinder blocks 113a, 113b and/or other parts. A seal ring, oil seal or the like may also be provided around the peripheral surface of the first and second hydraulic pump shafts 111a and 111b extending through the partition wall 121a to more securely prevent the intrusion of the foreign matters.

Portions of the pump case 120, through which the respective shafts 111a, 115a and 115b extend, are sealed by any suitable sealing means in a liquid tight manner, thereby allowing the pump case 120 to serve as a hydraulic fluid tank.

Figure 6:
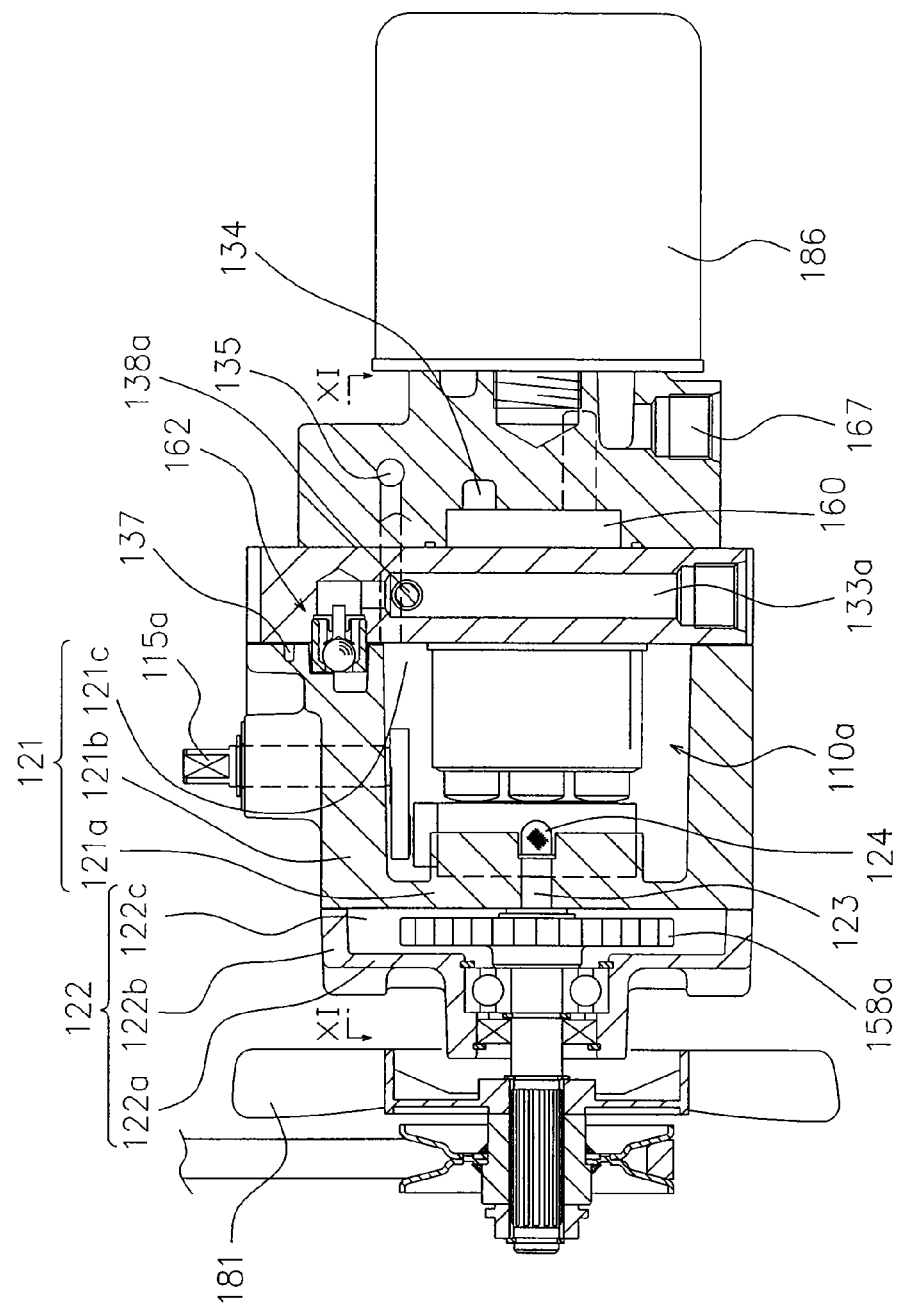
FIG. 6 is a cross section taken along line VI-VI in FIG. 3.

As illustrated in FIG. 6, the first sidewall 121a serving as the partition wall more preferably forms a hydraulic fluid communication hole 123 for communication between the hydraulic pump accommodation chamber and the power transmission mechanism accommodation chamber with a filter 124 provided in the hole for preventing the intrusion of the foreign matters into the hydraulic pump accommodation chamber. The thus formed hydraulic fluid communication hole 123 can omit the necessity of separately feeding lubricant to the power transmission mechanism 158, with the result that the power transmission mechanism 158 can be lubricated with the hydraulic fluid stored within the pump case 120. This permits low manufacturing cost and ease of maintenance.

Hydraulic fluid communication holes 123 are preferably and respectively be provided with the meshed point of the first gear 158a and the second gear 158b therebetween, and more particularly at the downstream and upstream sides with respect to the rotational direction of the first gear 158*a* and the second gear 158*b*. The thus arranged hydraulic fluid communication holes 123 achieve an efficient circulation of the hydraulic fluid between the hydraulic pump accommodation chamber and the power transmission mechanism accommodation chamber.

In this embodiment, the first and second angularly adjustable swash plates 114*a* and 114*b* are of a cradle type, as illustrated in FIG. 3. Therefore, when the partition wall 121*a* forms, on its side facing the hydraulic pumps 110*a*, 110*b*, spherical concave surfaces 126*a* and 126*b* respectively adapted to spherical convex surfaces 116*a* and 116*b* formed in the rear portions of the swash plates 114*a* and 114*b*, which rear portions being opposite to the surfaces facing the piston units 112*a* and 112*b*, the spherical concave surfaces 126*a* and 126*b* can slidingly guide the spherical convex surfaces 116*a* and 116*b* of the swash plates 114*a* and 114*b* thereon. The swash plates thus can be securely positioned on the spherical concave surfaces 126*a* and 126*b*.

Figure 14:
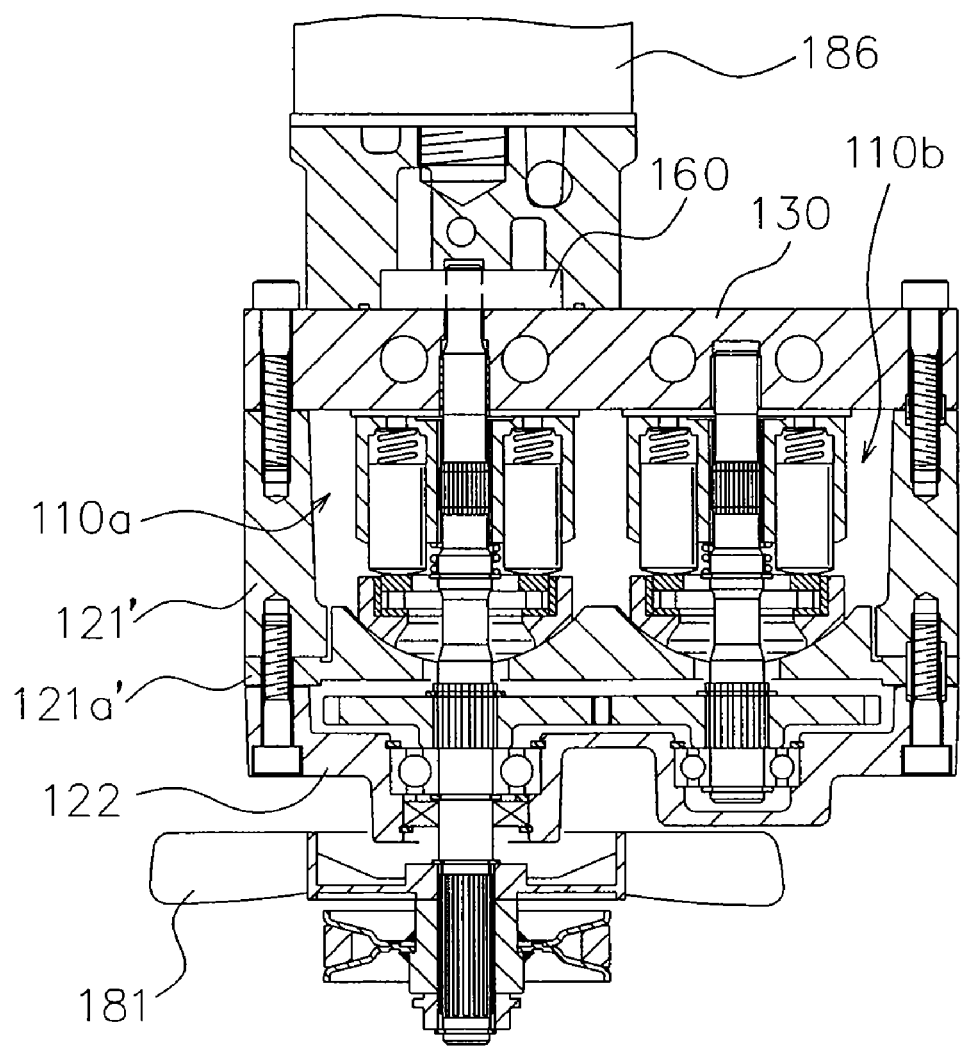
FIG. 14 is a cross sectional plan view illustrating a modified example of a pump case in the pump unit of FIGS. 2 and 3.

In this embodiment, the first sidewall 121*a* of the first pump case 121 serves as the partition wall. Alternatively, a partitioning means may take various forms, as long as it can produce the same effect. For example, a separately prepared partition wall 121*a*' may be mounted in a first pump case 121' having a simple box shape, as illustrated in FIG. 14. This arrangement is advantageous in that the spherical concave surfaces 116*a* and 116*b* can easily be formed.

Now, the description will be made for the center section 130. As best illustrated in FIGS. 3 and 5, the center section 130 includes a first center section 131 connected to the pump case 120 through direct contact to the rear side of the pump case 120 for sealing the opening 121, and a second center section 132 connected to the first center section 131 in such a manner as to surround a charge pump 160 operatively driven by the hydraulic pump shaft 111*a* of the first hydraulic pump 110*a*.

The center section 130, as illustrated in FIGS. 4, 5 and 7, forms a first pair of inlet/outlet passages 133*a* having first ends respectively communicating with inlet and outlet ports of the first hydraulic pump 110*a* and second ends opening to the outside of the center section 130 through a pump-case abutting surface 131*a* of the first center section 131, and a second pair of inlet/outlet passages 133*b* having first ends respectively communicating with inlet and outlet ports of the second hydraulic pump 110*b* and second ends opening to the outside of the center section 130 through the pump-case abutting surface 131*a* of the first center section 131. Both pairs of the passages 133*a* and 133*b* are disposed parallel with each other.

The center section 130 forms a first charging passage 134 having a first end communicating with an outlet port of the charge pump 160, and a second end formed in the pump-case abutting surface 131*a* of the first center section 131.

The first pair of inlet/outlet passages 133*a* constitutes a part of the first pair of hydraulic lines 184*a* communicating between the first hydraulic pump 110*a* and the first hydraulic motor 183*a*. On the other hand, the second pair of inlet/outlet passages 133*b* constitutes a part of the second pair of hydraulic lines 184*b* communicating between the second hydraulic pump 110*b* and the second hydraulic motor 183*b* (see FIG. 2).

As illustrated in FIG. 2, the center section 130 forms a pressure relief line 135 communicating with the first charging passage 134. The pressure relief line 135 is provided therein with a relief valve 161 for adjusting the hydraulic pressure of the first charging passage 134. In this embodiment, the relief valve 161 is disposed in the second center section 132, as illustrated in FIGS. 10 and 11.

At least one of the pump case 120 and the center section 130 forms a communication passage communicating between the first pair of inlet/outlet passages 133*a* and the second pair of inlet/outlet passages 133*b*, and the first charging passage 134 via their second ends.

Figure 8:
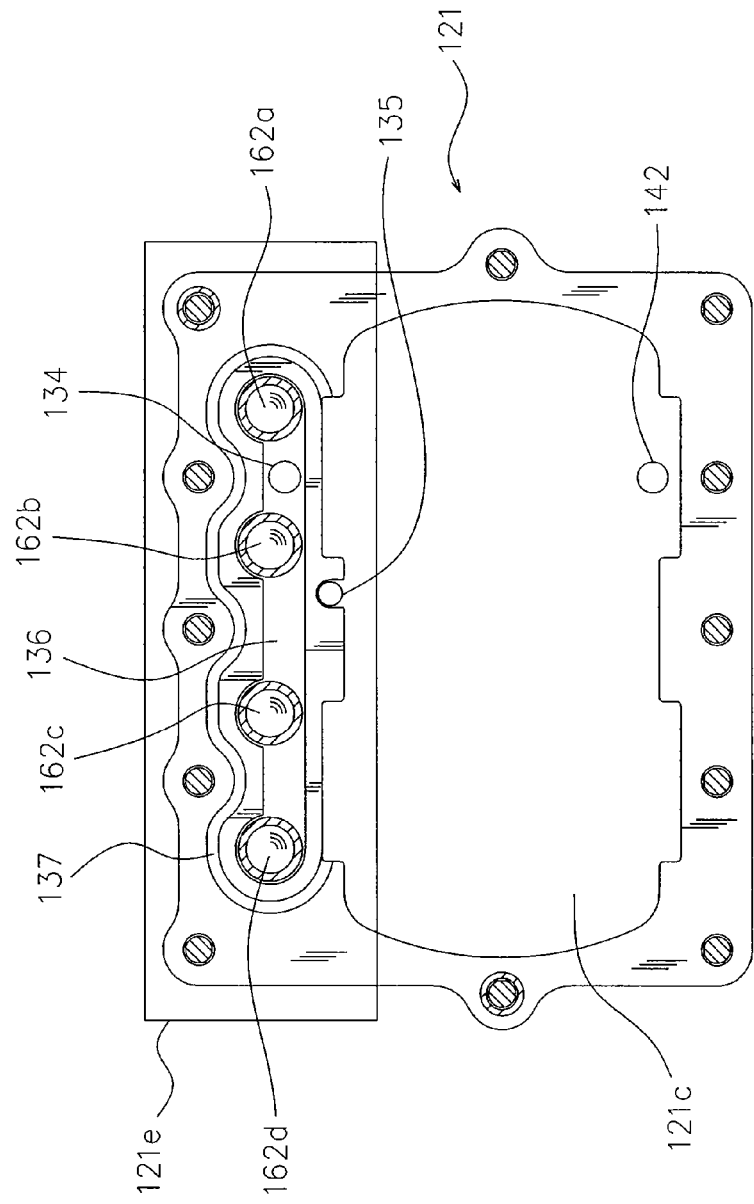
FIG. 8 is a cross section taken along line VIII-VIII in FIG. 3.
Figure 9:
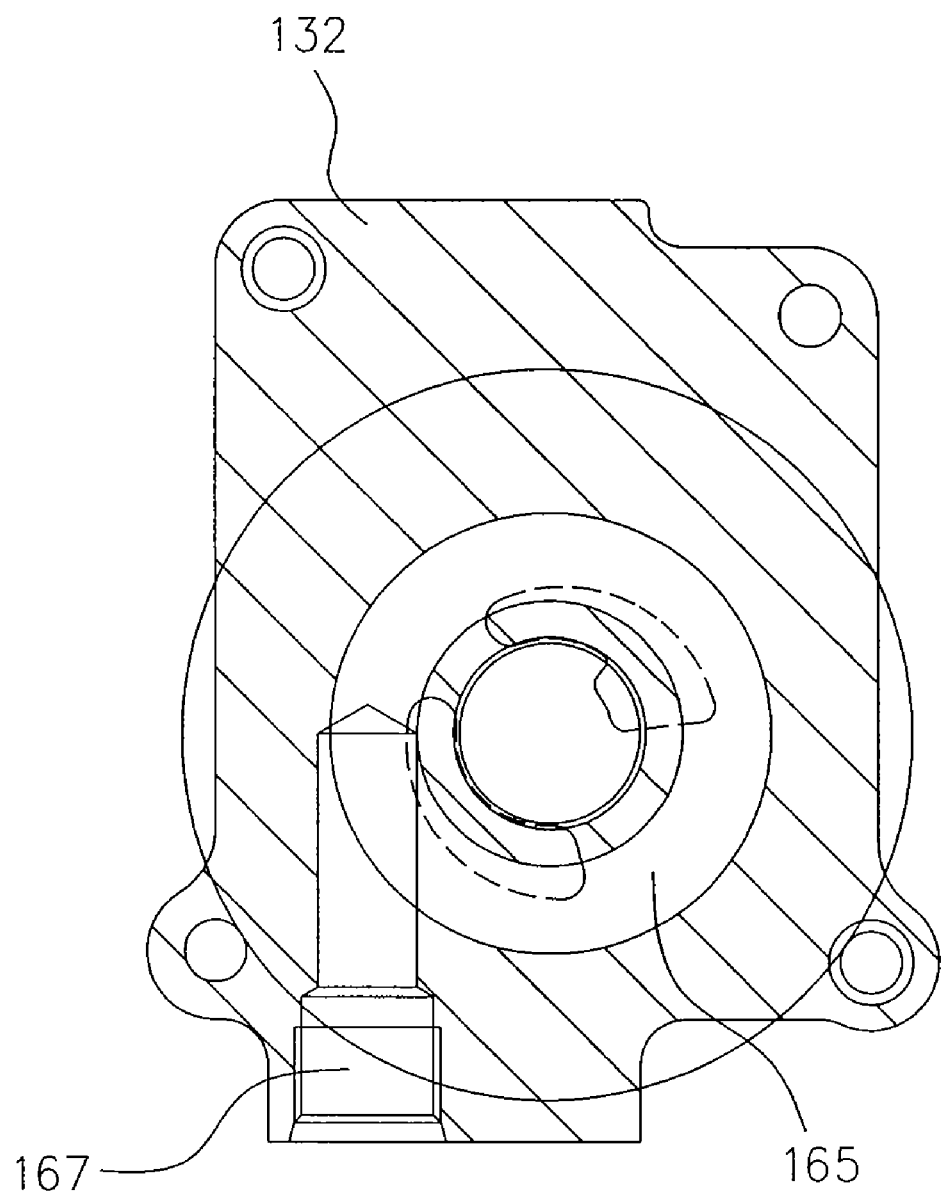
FIG. 9 is a cross section taken along line IX-IX in FIG. 3.

In this embodiment, a first center section abutting surface 121*e* of the first housing, as best illustrated in FIGS. 4 and 8, forms a single fluid groove 136 extending over the second ends of the first pair of inlet/outlet passages 133*a* and the second pair of inlet/outlet passages 133*b*. The first charging passage 134 has the second end communicating with the fluid passage groove 136.

Charging check valves 162*a*, 162*b*, 162*c* and 162*d* are provided in such a manner as to be installable through the abutting surface 131*a* of the first center section 131 or the abutting surface 121*e* of the first housing 121, as best illustrated in FIG. 4. These valves are designed to allow the flow of the hydraulic fluid from the first charging passage 134 to the first pair of inlet/outlet passages 133*a* and the second pair of inlet/outlet passages 133*b*, while preventing the reverse flow.

The installation of those charging check valves through the first center section abutting surface 121*e* of the first housing 121 or the first housing abutting surface of the first center section 131 produces the following effects.

Specifically, since a die pattern of the fluid passage groove 136 can be formed in a die for the first housing 121 or the first center section 121, it is not necessary to additionally bore holes for receiving the charging check valves 162*a* to 162*d*. This omits the necessity of a conventionally required machining process, resulting in a lower manufacturing cost.

Since the charging check valves 162 can be secured in position only by connecting the first housing 121 to the first center section 131, a covering member or other check valve fixing means can be omitted. This arrangement can reduce the number of parts, resulting in a lower manufacturing cost and an improved assembling efficiency.

As illustrated in FIGS. 4, 8 and 11, the center section abutting surface 121*e* of the pump case 120 forms an escape groove 137 surrounding the fluid passage groove 136 and having at least one terminal portion communicating with the inside of the pump case for the discharge of the leaked hydraulic fluid.

With the escape groove 137, the hydraulic fluid, which flows from the first charging passage 134 to the first pair of inlet/outlet passages 133*a* and the second pair of inlet/outlet passages 133*b* via the fluid passage groove 136, is prevented from leaking to the outside through the abutting portion between the first pump case 121 and the first center section 131. Specifically, the hydraulic fluid leaked out of the fluid passage groove 136 is held in the escape groove 137, and then returned to the inside of the pump case 120. Whereby, the leakage of the hydraulic fluid outwards of the case from the abutting portion between the first pump case 121 and the first center section 131 can effectively be prevented.

Leak lines 163*a* and 163*b* each having a throttle valve are preferably formed between the first charging passage 134 and at least one of the first pair of inlet/outlet passages 133*a*, and between the first charging passage 134 and at least one of the second pair of inlet/outlet passages 133*b* (see FIG. 2).

The leak lines 163*a* and 163*b* are designed to assure the neutralization of the hydraulic pumps 110*a* and 110*b*. Specifically, even if the swash plates 114*a* and 114*b* of the hydraulic pumps 110*a* and 110*b* tilt from the neutral positions by a small angle, there occurs the pressure difference between the first pair of hydraulic lines 184*a*, and/or between the second pair of hydraulic lines 184*b*. This pressure difference causes the rotation of the hydraulic motors 182a and 182b. That is, even a slight amount of the displacement between the actual neutral positions and the predetermined design positions of the swash plates 114a and 114b due to assembling error or the like causes an unintentional rotation of the hydraulic motors 182a and 182b. On the contrary, the leak lines 163a and 163b, as described above, allow the pressurized hydraulic fluid to leak therethrough from the first pair of hydraulic lines 184a or the second pair of hydraulic lines 184b. Thus, the swash plates can have the neutral positions of a broadened effective area by effectively limiting the pressure difference between the pair of first hydraulic lines 184a, and/or between the second pair of hydraulic lines 184b, thereby effectively avoiding the unintentional rotation of the hydraulic motors 182a and 182b, even for the swash plates 114a and 114b having the actual neutral position displaced from the design neutral position due to the assembling errors or the like.

In view of transmission efficiency between the hydraulic pumps 110a, 110b and the hydraulic motors 182a, 182b, the leakage of the pressurized hydraulic fluid from the first and second pairs of hydraulic lines 184a, 184b through the leak lines 163a, 163b is not preferable. Therefore, the leak lines 163a, 163b are preferably provided in portions from the first charging passage 133 to one of the first pair of inlet/outlet passages 133a, and to one of the second pair of inlet/outlet passages 133b, and more preferably to one of the first pair of inlet/outlet passages 133a which has a higher pressure during rearward movement of the vehicle. This is because the forward movement of the vehicle frequently occurs as compared with the rearward movement.

The first center section 131, as illustrated in FIGS. 2 and 7, forms a first bypass passage 138a for communication between the first pair of inlet/outlet passages 133a, and a second bypass passage 138b for communication between the second pair of inlet/outlet passages 133b. Although the following description will be made for the first bypass passage 138a, it is also applicable for the second bypass passage 138b.

In this embodiment, the first pair of inlet/outlet passages 133a are formed parallel to one another, and the first bypass passage 138a is formed orthogonal to the pair of first inlet/outlet passages, as best illustrated in FIG. 7. This arrangement achieves the communication between the first pair of inlet/outlet passages 133a by forming only a single hole.

The first bypass passage 138a includes a first bypass valve 140a adapted to take a communication position and a cutoff position respectively for bringing the first pair of inlet/outlet passages 133a into and out of communication with one another. The first bypass valve 140, as illustrated in FIG. 7, has a proximal end portion 141a extending to the outside of the first center section 131 to be operated from the outside of the first center section 131, allowing the first bypass valve 140a to take the communication position and the cutoff position.

Specifically, the first bypass passage 138a includes an inwardly threaded portion 139a having a proximal end opening to the outside of the first center section 131 and an inner threaded circumferential surface, a middle portion 139b extending inwardly from the inner end of the inwardly threaded portion 139a in such a manner as to straddle an adjacent one of the first pair of inlet/outlet passages 133a, a distal end portion 139c having a diameter smaller than the middle portion 139b with a stepped portion and communicating with a remote one of the first pair of inlet/outlet passages 133a.

On the other hand, the first bypass valve 140a includes a proximal end portion 141a lying outside of the first center section 131, an outwardly threaded portion 141b distally extending from the proximal end portion 141a and having an outer threaded circumferential surface for threaded engagement with the inner threaded circumferential surface 139a, a seal portion 141c distally extending from the outwardly threaded portion 141b and liquid-tightly engageable with the middle portion 139b at the proximal side with respect to the adjacent one of the first pair of inlet/outlet passages 133a, and an abutting portion 141d distally extending from the seal portion 141c and having a shape adapted to the stepped portion for sealed contact between the abutting portion and the stepped portion. The first bypass valve 140a thus can take the cutoff position with the abutting portion 141d abutting the stepped portion, and the communication position with the abutting portion 141d located away from the stepped portion, through the axial sliding motion of the first bypass valve 140a caused by the rotation of the first bypass valve 140a around the axis thereof via the proximal end portion 141a.

A release means including the first bypass passage 138a and the first bypass valve 140a, as well as the second bypass passage 138b and the second bypass valve 140b is designed to easily move the vehicle, when the vehicle must forcibly be moved or the vehicle wheels must forcibly be rotated by man power or the like due to the disorder of the power source 180, the hydraulic pumps 110a, 110b or the like. Specifically, when the vehicle wheels connected to the hydraulic motors 182a and 182b are forcibly rotated with the first pair of hydraulic lines 184a and/or the second pair of hydraulic lines 184b lying in the closing state, there occurs the pressure difference between the first pair of hydraulic lines 184a, and between the second pair of hydraulic lines 184b. As a result, the vehicle is hardly moved, or the vehicle wheels are hardly rotated. On the contrary, the release means can easily achieve the communications between the first pair of hydraulic lines 184a, and between the second pair of hydraulic lines 184b without the necessity of mechanically releasing all the check valves 162a to 162d. Whereby, the vehicle can easily be moved by man power or the like.

In this embodiment, the first pair of inlet/outlet passages 133a and the second pair of inlet/outlet passages 133b, as illustrated in FIG. 7, respectively have connecting ports formed in the same side of the first center section 31, resulting in an easy piping work between these connecting ports and the hydraulic motors 182a and 182b.

As illustrated in FIGS. 2 and 5, the first center section 131 and the second center section 132 forms a second charging passage 142 with a first end communication with the inside of the pump case 120 and a second end communicating with the first charging passage 134. The second charging passage 142 is designed to prevent the flow of the hydraulic fluid from the first charging passage 134 to the pump case 120, and feed an additional amount of the hydraulic fluid from the pump case 120 to the first and second pairs of hydraulic lines 184a and 184b when these lines have a reduced amount of the hydraulic fluid.

In this embodiment, the second charging passage 142 includes a check valve 143 for allowing the flow of the hydraulic fluid from the pump case 120 to the first charging passage 134 while preventing the reverse flow, thereby producing the above mentioned effect. Although the charge pump 160 may be somewhat deteriorated in operation efficiently, it is possible to employ a throttle valve instead of the check valve 143.

Providing the second charging passage 142 can effectively prevent the vehicle from being brought into a so-called free wheel phenomenon, which occurs when the vehicle stopping on a sloping road is accidentally moved downwardly, causing the rotation of the wheels. That is, for the stopped vehicle, the hydraulic pumps 110a and 110b have the swash plates lying at the neutral position. In this state, when the vehicle is stopped on, for example, a slopped road, the vehicle is subjected to a force possibly causing the rotation of the wheels through the vehicle weight, or the rotation of the motor shafts of the hydraulic motors 182a and 182b. Since the hydraulic pumps 110a and 110b are set in the neutral state, the hydraulic pumps 182a and 182b subjected to such force causes one of the first pair of hydraulic lines 184a and one of the second pair of hydraulic lines 184b to have a highly pressurized hydraulic fluid, and the remaining ones to have a low pressurized hydraulic fluid. The hydraulic fluid exceeding a predetermined pressure level in the hydraulic lines causes the leakage through a gap in cylinder blocks of the hydraulic pumps in communication with such highly pressurized hydraulic lines. Whereby, the amounts of the hydraulic fluids in the pairs of hydraulic lines are reduced, facilitating the free rotation of the motor shafts easier.

On the contrary, the second charging passage 142 of this embodiment sucks the hydraulic fluid within the pump case when the first pair of hydraulic lines 184a has reduced amount of the hydraulic fluid, resulting in a negative pressure in these lines. Specifically, the second charging passage 142 can prevent the pair of the hydraulic lines from having a reduced amount of the hydraulic fluid, and hence the motor shafts from being freely rotated.

As illustrated in FIGS. 3, 6, 9 and 10, the second center section 132 is provided at its rear end with a filter 186. The second center section 132 forms an inlet line 165 having a first end communication with the charge pump 160a through its inlet opening and a second end communicating with the filter 186, and a filter line 166 having a first end communicating with the filter 186 and a second end communicating with a hydraulic fluid tank (not shown), thereby allowing the hydraulic fluid fed from the tank and passing through the filter 186 and the filter line 166 to be sucked into the charge pump 160 through the inlet opening.

The pump unit 100 of this embodiment constitutes a single unit by unitedly connecting the first and second hydraulic pumps 110a and 110b, the center section 130 and the housing 120 together. Therefore, both first and second pumps 110a and 110b can be installed on the vehicle only by mounting the single unit on the vehicle, resulting in an improved efficiency in assembling the vehicle.

Second Embodiment

Figure 13:
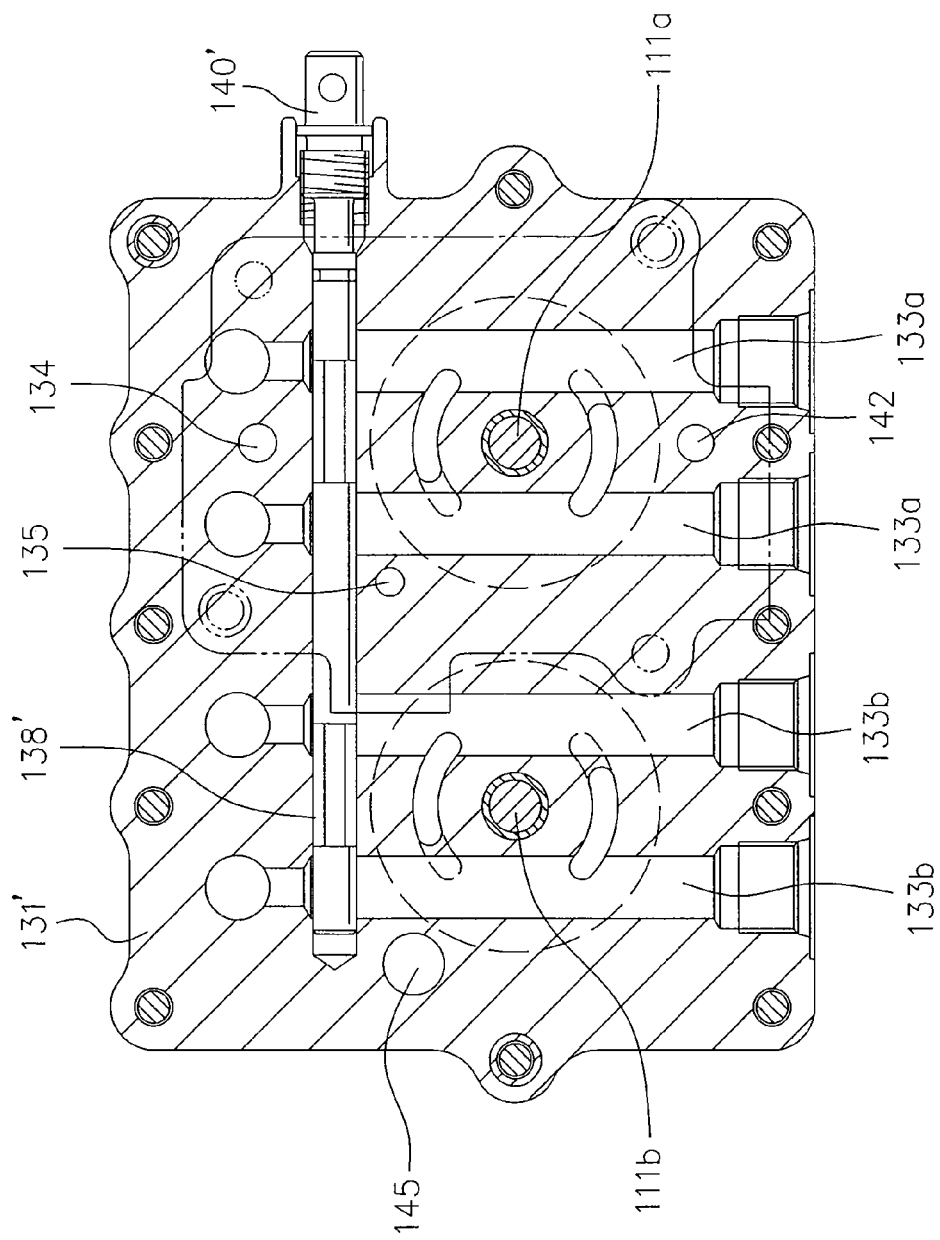
FIG. 13 is a longitudinal cross section of a first center section of a second embodiment of the pump unit according to the present invention.

The second embodiment of the present invention will be described with reference to FIG. 13. FIG. 13 is a longitudinal cross section of a first center section 131' of a pump unit 100 according to this embodiment, which figure corresponding to FIG. 7 illustrating the aforementioned first embodiment.

In this embodiment, the first bypass line 138a and the second bypass line 138b are replaced by a single common line 138. In the following description, corresponding or identical parts to those of the first embodiment have been given the same reference characters or those with primes (') to omit a detailed description thereof.

The common bypass line 138' has a proximal end portion opening outwardly and a distal end portion communicating with all the first and second pairs of inlet/outlet passages 133a and 133b.

The common bypass line 138' includes a single bypass valve 140' to be operated from the outside of the first center section 131' for the communication and the cutoff of the hydraulic fluid between the first pair of inlet/outlet passages 133a, and between the second pair of inlet/outlet passages 133b.

In addition to the desirable effects produced by the first embodiment, the pump unit of the second embodiment can achieve an effective boring operation and lower manufacturing cost through the reduction of the number of parts.

In each of the aforementioned embodiments, the description has been made for the case that a pair of hydraulic pumps is included. However, it is not necessary to limit the number of the hydraulic pumps to that of these embodiments. The present invention is applicable to the arrangement where a single hydraulic pump, or more than two hydraulic pumps are included.

Third Embodiment

Figure 15:
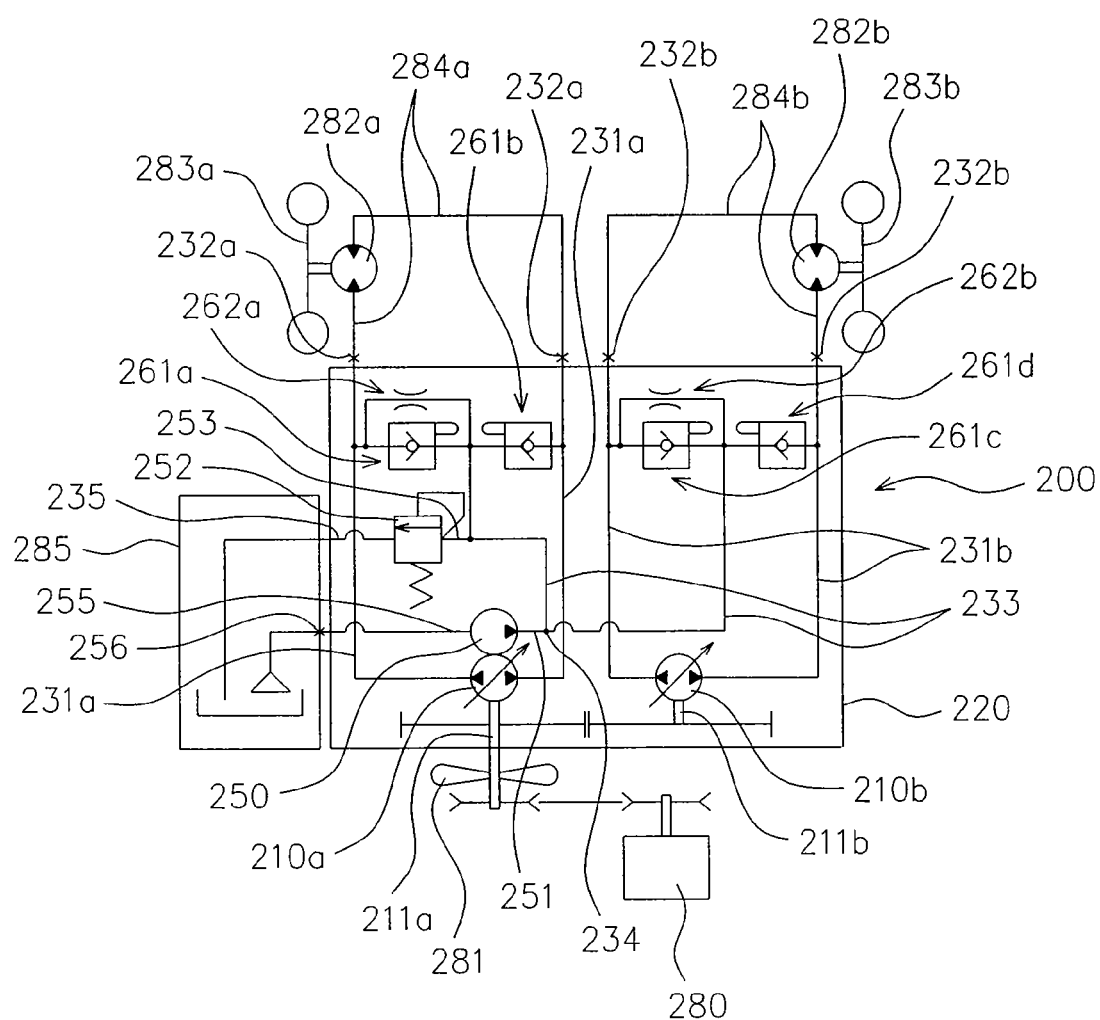
FIG. 15 is a hydraulic circuit diagram of the vehicle to which a pump unit according to a third embodiment of the present invention is applied.
Figure 16:
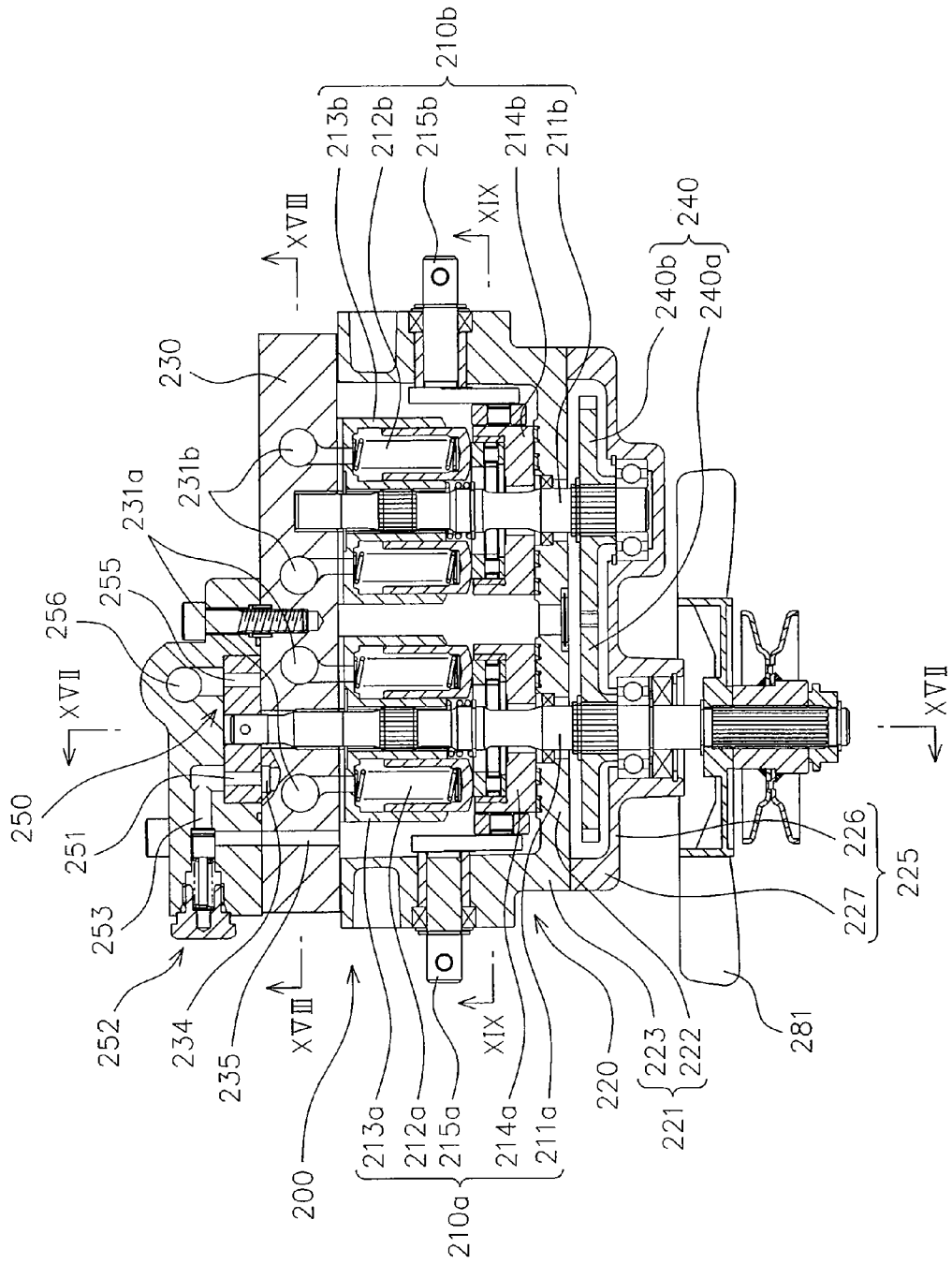
FIG. 16 is a longitudinal cross-sectional front view of the pump unit illustrated in FIG. 15.
Figure 17:
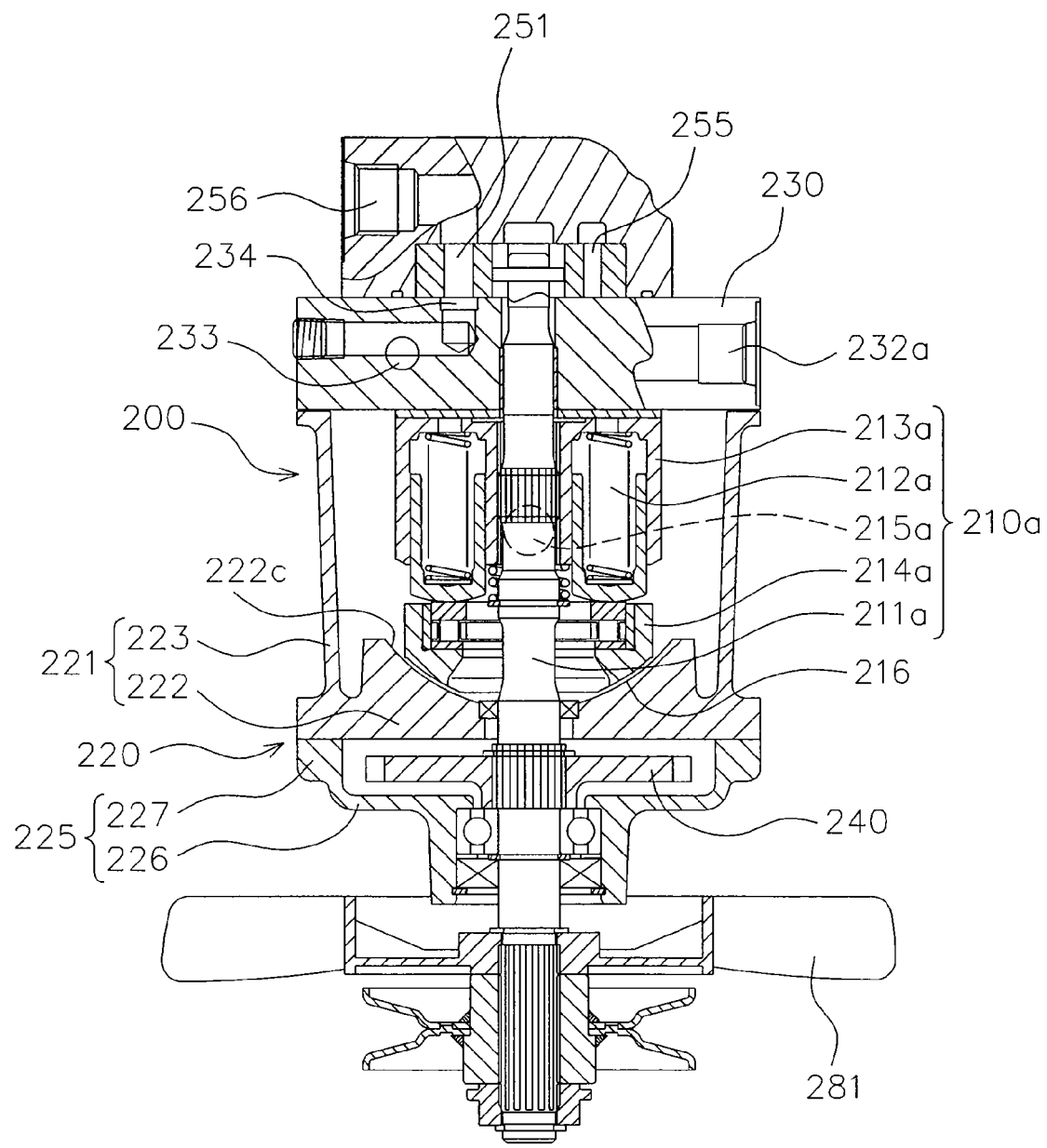
FIG. 17 is a cross section taken along line XVII-XVII in FIG. 16.
Figure 18:
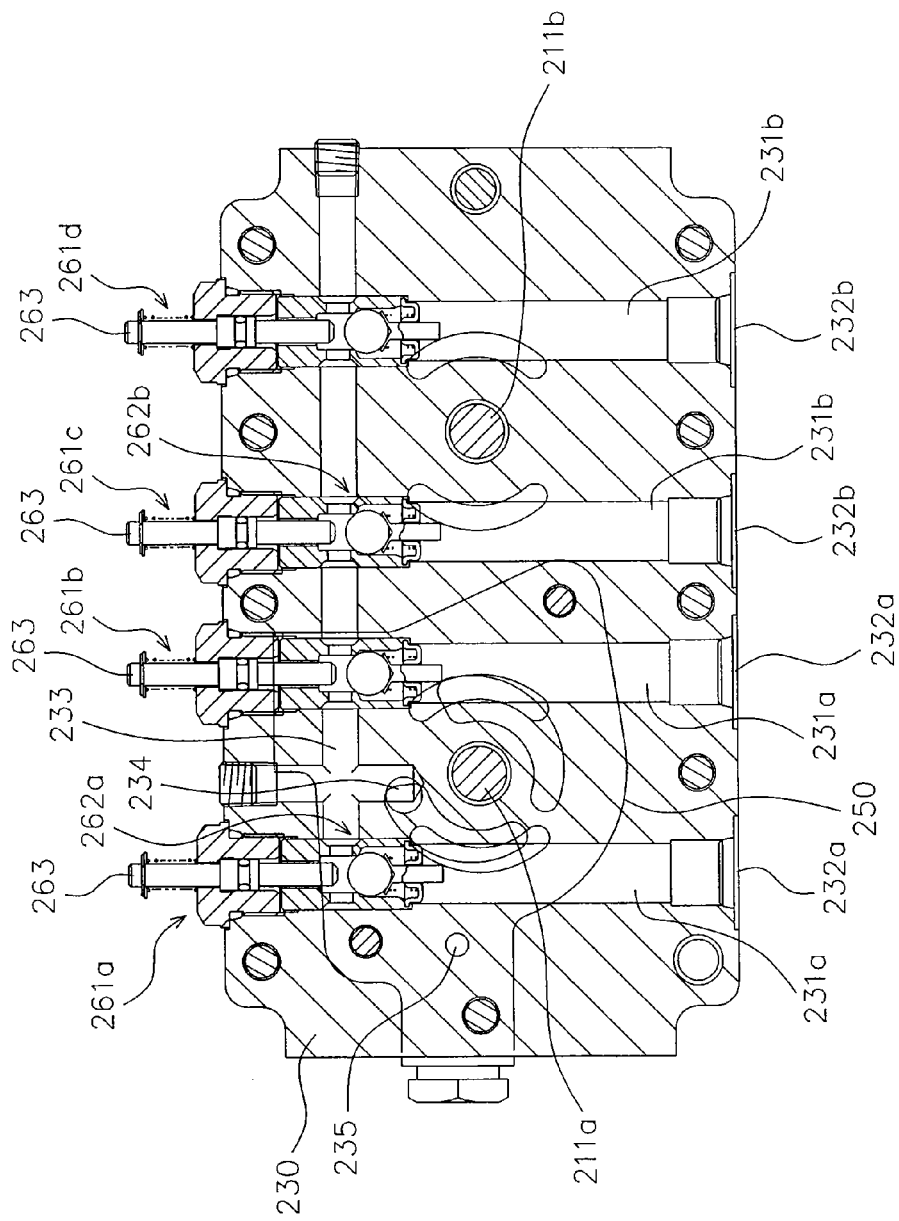
FIG. 18 is a cross section taken along line XVIII-XVIII in FIG. 16.
Figure 19:
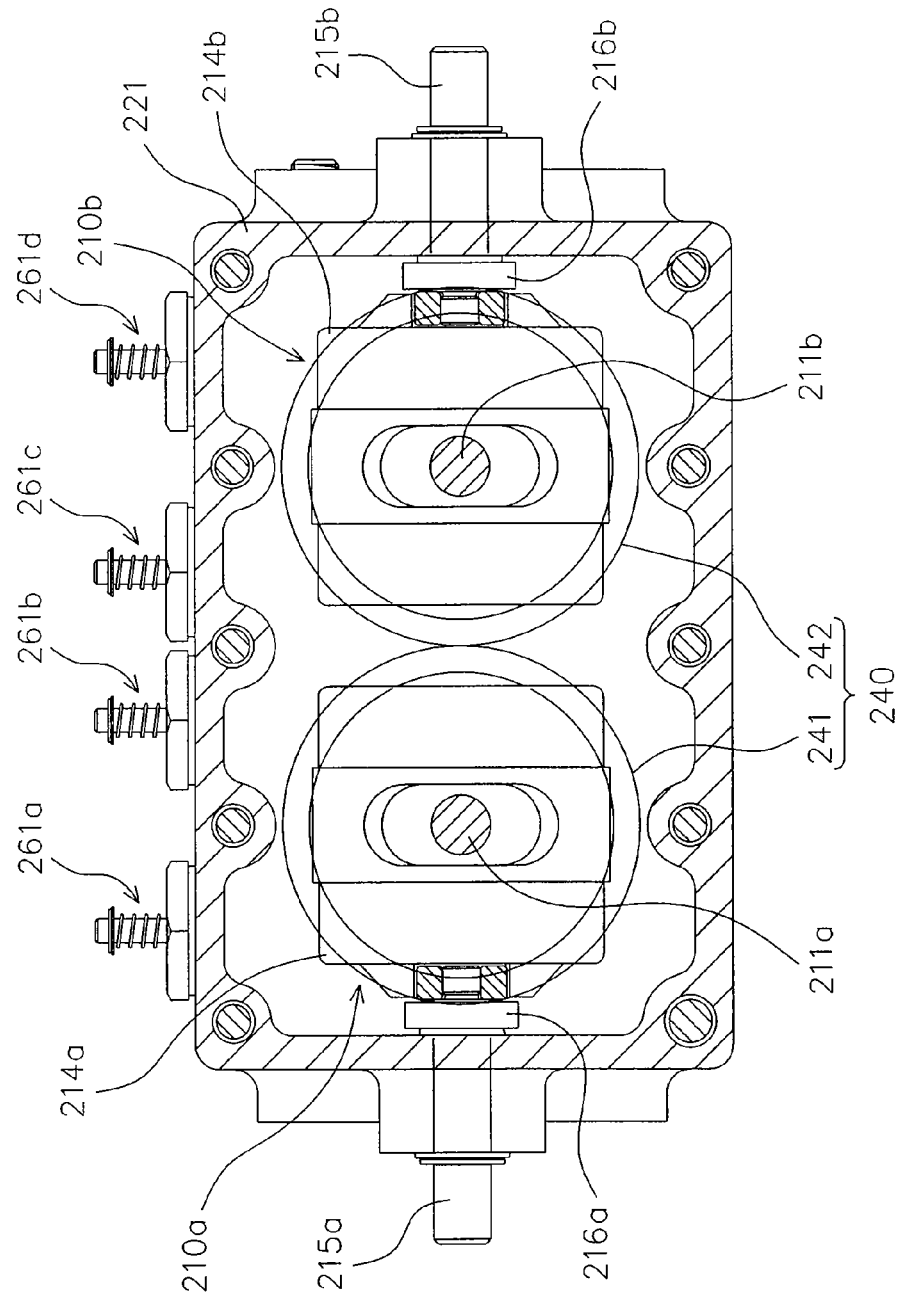
FIG. 19 is a cross section taken along line XIX-XIX in FIG. 16.

A pump unit according to a third embodiment of the present invention will be hereinafter described with reference to FIGS. 15 to 19. FIG. 15 is a hydraulic circuit diagram of the vehicle to which a pump unit 200 of this embodiment is applied. FIG. 16 is a longitudinal cross-sectional front view of the pump unit and its periphery. FIGS. 17 to 19 are respectively cross sections taken along lines XVII-XVII, XVIII-XVIII, and XIX-XIX.

As illustrated in FIGS. 15 to 17, the pump unit 200 is adapted to be used in a vehicle having right and left drive wheels 283a and 283b to which first and second hydraulic motors 282a and 282b are respectively connected, and includes a first hydraulic pump 210a and a second hydraulic pump 210b respectively connected to the first and second hydraulic motors 282a and 282b via a first pair of hydraulic lines 284a and a second pair of hydraulic lines 284b, and a common housing 220 for accommodating these hydraulic pumps 210a and 210b.

The connection form between the right and left drive wheels 283a and 283b, and the first and second hydraulic motors 282a and 282b meant in this embodiment includes the direct connection of the drive wheels respectively to those hydraulic motors, and also an operative connection of the drive wheels respectively to the hydraulic motors via a suitable power transmission mechanism. In FIG. 15, the reference codes 280, 281 and 285 respectively represent a power source, a cooling fan and a hydraulic fluid tank.

As illustrated in FIGS. 16, 17 and 19, the first hydraulic pump 210a and the second hydraulic pump 210b are axial piston pumps of a variable displacement type, and respectively include a first pump shaft 211a and a second pump shaft 211b that have vertical axes and are disposed parallel to one another in the vehicle width direction within the housing 220, a first piston unit 212a and a second piston unit 212b that are reciprocatingly movable according to the rotation of the pump shafts, a first cylinder block 213a and a second cylinder block 213b that reciprocably support the piston units, a first angularly adjustable swash plate 214a and a second angularly adjustable swash plate 214b that regulate the stroke length of the piston units by varying their tilting angles to vary the input/output flow rates of the piston units, and a first control shaft 215a and a second control shaft 215b that control the tilting angles of these swash plates.

The pump unit of this embodiment is of a vertical type with the first and second pump shafts 211a and 211b having the vertical axes. However, the present invention is not necessarily limited to this arrangement. It is a matter of course that the pump unit 200 can be of a horizontal type with the first and second pump shafts 211a and 211b having the horizontal axes.

As best illustrated in FIG. 16, the first and second angularly adjustable swash plates 214a and 214b of this embodiment are of a cradle type.

As illustrated in FIGS. 16 and 19, the first control shaft 215a and the second control shaft 215b extend away from one another in the vehicle width direction to respectively have oppositely positioned outer ends, and inner ends extending into the housing 220 to be respectively connected to arms 216a and 216b and hence the first and second swash plates 214a and 214b. The pump unit 200 with the thus arranged first and second control shafts 215a and 215b is advantageous when installed on the vehicle having push-pull control levers 198a and 198b as illustrated in FIG. 1, since the first and second control shafts 215a and 215b can have the rotating shaft centers disposed parallel to the longitudinal axis of the control levers, thereby achieving the simplification of a link mechanism between these control shafts and the control levers.

The first control shaft 215a and the second control shaft 215b are more preferably located at substantially the same position with respect to the vehicle longitudinal direction, as illustrated in FIG. 16. The thus arranged first and second control shafts 215a and 215b can be aligned with the control levers in the vehicle width direction, thereby achieving a more simplified structure of the link mechanism.

The pump unit 200 further includes a common center section 230 that supports the first and second hydraulic pumps 210a and 210b, and a power transmission mechanism 240 that is accommodated within the housing 220 to operatively connect the first and second hydraulic pump shafts 211a and 211b together. The pump unit 200 with the power transmission mechanism 240 permits the simultaneous rotation of both pump shafts 211a and 211b only by connecting the power source to either one of the first and second pump shafts 211a and 211b, or to the first pump shaft 211a in this embodiment, thereby achieving the simplified structure for the power transmission from the power source to the pump unit 200. In this embodiment, the power transmission mechanism 240 is in the form of a gear transmission device that includes a first gear 240a non-rotatably supported on the lower side of the first pump shaft 211a, and a second gear 240b non-rotatably supported on the lower side of the second pump shaft 211b in meshed engagement with the first gear 240a. Instead of the gear transmission device, any conventional power transmission mechanisms such as chain and belt may be used.

The housing 220, as illustrated in FIGS. 16 and 17, includes a first housing 221 for accommodating the first and second hydraulic pumps 210a and 210b, and a second housing 225 for accommodating the power transmission mechanism 240.

The first housing 221 has a box shape with a first sidewall 222 disposed in the upper or lower side of the pump shafts 211a and 211b along the longitudinal direction thereof, or in this embodiment in the lower side of the pump shafts 211a and 211b, which will be hereinafter referred to simply as the lower side, and a peripheral wall 223 extending from a peripheral edge of the first sidewall 222 to the opposite side of the pump shafts 211a and 211b along the longitudinal direction thereof (i.e., the upper side of the pump shafts 211a and 211b in this embodiment, which will be referred to simply as the upper side). The first sidewall 222 forms bearing holes through which the first and second pump shafts 211a and 211b respectively extend. The upper side of the first housing 221 has an end surface forming an opening through which the first and second hydraulic pumps 210a and 210b can be placed into the first housing 221. The opening of the first housing 221 is sealed by the center section 230 in a liquid tight manner. That is, the center section 230 of this embodiment constitutes a part of the first housing 221. The first and second control shafts 215a and 215b extend away from one another in the vehicle width direction to respectively have outer ends protruding from the peripheral wall 223 of the first housing 221.

The second housing 225 is disposed in the lower side, and has a box shape with a lower sidewall 226 forming a bearing hole through which the lower end of the first pump shaft 211a extends and a bearing portion for receiving the lower end of the second pump shaft 211b, and a peripheral wall 227 extending upwardly from a peripheral edge of the lower sidewall 226. The upper side of the second housing 225 forms an opening through which the power transmission mechanism 240 can be placed into the second housing 225.

The second housing 225 is connected to the first housing 221 in such a manner as to have the opening sealed in a liquid tight manner by the first sidewall 222 of the first housing 221, and form an accommodation space of the power transmission mechanism 240 in cooperation with the first sidewall 222 of the first housing 221.

In the thus arranged housing 220, the first sidewall 222 of the first housing 221 serves as a partition wall dividing the accommodation space of the housing into a hydraulic pump accommodation chamber and a power transmission mechanism accommodation chamber. The partition wall thus defining the hydraulic pump accommodation chamber and the power transmission mechanism accommodation chamber can effectively prevent any foreign matters such as iron powder generated in the power transmission mechanism 240 from intruding into the hydraulic pump accommodation chamber, and hence damaging piston units 212a, 212b, cylinder blocks 213a, 213b, and/or other parts. In addition to this foreign matters prevention measure, the first and second pump shafts 211a and 211b, which extend through the partition wall 222, may have circumferential peripheries with seal rings thereon to more securely prevent the intrusion of the foreign matters.

Portions of the housing 220, through which the respective shafts 211a, 215a and 215b extend, are sealed by any suitable sealing means in a liquid tight manner, thereby allowing the housing 220 to serve as the hydraulic fluid tank 285.

The first sidewall 222 serving as the partition wall preferably forms a hydraulic fluid communication hole 222a for communication between the hydraulic pump accommodation chamber and the power transmission mechanism accommodation chamber with a filter 222b provided in the hole for preventing the intrusion of the foreign matters into the hydraulic pump accommodation chamber. The thus formed hydraulic fluid communication hole 222a can omit the necessity of separately feeding the lubricant to the power transmission mechanism 240, with the result that the power transmission mechanism 240 can be lubricated with the hydraulic fluid stored within the housing. This permits low manufacturing cost and ease of maintenance.

In this embodiment, the first and second angularly adjustable swash plates 214a and 214b are of a cradle type, as illustrated in FIG. 17. Therefore, when the partition wall 222 forms, on its side facing the hydraulic pumps 210a, 210b, spherical concave surfaces 222c respectively adapted to spherical convex surfaces 216 formed in the rear sides of the swash plates 214a and 214b, which rear sides being opposite to the surfaces facing the piston units 212a and 212b, the spherical concave surfaces 222c can slidingly guide the spherical convex surfaces 216 of the swash plates 214a and 214b. The swash plates thus can securely rest on the spherical concave surfaces 222c. Although FIG. 17 illustrates only the portion of the partition wall 222 corresponding to the first angularly adjustable swash plate 214a, it is a matter of course that the portion of the partition wall 222 corresponding to the second angularly adjustable swash plate 214b forms the spherical concave surface 222c.

In this embodiment, the first sidewall 222 of the first housing 221 serves as the partition wall. Alternatively, a partitioning means may take various forms, as long as it can produce the same effect as described above. For example, a separately prepared partition wall may be mounted in a housing having a simple cylindrical box shape (see FIG. 14).

Now, the description will be made for the center section 230. As illustrated in FIG. 18, the center section 230 forms a first pair of hydraulic passages 231a for the first hydraulic pump communicating with the first piston unit. The first pair of hydraulic passages 231a respectively have first ends opening to the outside of the center section 230 to form a first pair of inlet/outlet ports 232a serving as connection ports for connection with the first pair of hydraulic lines 284a extending between the first hydraulic motor and the center section 230 (see FIG. 15).

Similarly, the center section 230 forms a second pair of hydraulic passages 231b for the second hydraulic pump communicating with the second piston unit. The second pair of hydraulic passages 231b respectively have first ends forming a second pair of inlet/outlet ports 232b serving as connection ports for connection with the second pair of hydraulic lines 284b (see FIG. 15).

As described above, the common center section 230 thus forms all the first and second pairs of inlet/outlet ports 232a and 232b serving as the connection ports for connection with the first and second pairs of hydraulic lines 284a and 284b. Whereby, the piping work between the hydraulic pumps 210a and 210b, and the hydraulic motors 282a and 282b can be facilitated. The first and second pairs of inlet/outlet ports are more preferably formed in the same side of the center section 230, as illustrated in FIG. 18, thereby further facilitating the piping work.

The center section 230 also forms a common charging passage 233 for feeding a pressurized hydraulic fluid to the first pair of hydraulic lines 284a and the second pair of hydraulic lines 284b. The charging passage 233 has a first end opening to the outside of the center section 230 to form an inlet port for charging 234. In this embodiment, the first pump shaft 211a, as illustrated in FIG. 16, has an extension extending further from the upper end thereof to be located above the center section 230, thereby supporting a charge pump 250 via the extension, and connecting an outlet port 251 of the charge pump 250 to the inlet port 234. The outlet port 251 of the charge pump also communicates with a pressure relief line 253 having a charge relief valve 252 therein. The charge relief valve 252 is designed to adjust the hydraulic pressure in the charging passage 233 (see FIG. 15). The pressure relief line 253 has a rear end communicating via a drain port 235 formed in the center section 230 with the housing 220 serving also as the hydraulic fluid tank 285. The reference codes 255 and 256 in FIGS. 16 and 17 respectively represent an inlet port of the charge pump, and an inlet port communicating with the inlet port of the charge pump and connected to the hydraulic fluid tank 285 through a suitable conduit.

On the other hand, the charging passage 233, as illustrated in FIG. 18, has a second end communicating with the first pair of hydraulic passages 231a and the second pair of hydraulic passages 231b via check valves 261a, 261b, 261c and 261d so as to allow the pressurized hydraulic fluid to be fed from the common charging passage 233 into a lower pressure line of the first pair of hydraulic lines 284a and a lower pressure line of the second pairs of hydraulic lines 284b, while preventing the pressurized hydraulic fluid from flowing in the reverse direction.

Bypass lines 262a and 262b having throttle valves are formed between at least one of the first pair of hydraulic passages 231a and the charging passage 233, and between at least one of the second pair of hydraulic passages 231b and the charging passage 233 (see FIGS. 15 and 18).

The bypass lines 262a and 262b are designed to assure the neutralization of the hydraulic pumps 210a and 210b. Specifically, even if the swash plates 214a and 214b of the hydraulic pumps 210a and 210b tilt from the neutral positions by a small angle, there occurs the pressure difference between the first pair of hydraulic lines 284a, and/or between the second pair of hydraulic lines 284b. This pressure difference causes the rotation of the hydraulic motors 282a and 282b. That is, even a slight amount of the displacement between the actual neutral positions and the predetermined design positions of the swash plates 214a and 214b due to assembling errors or the like causes an unintentional rotation of the hydraulic motors 282a and 282b. On the contrary, the bypass lines 262a and 262b, as described above, allow the pressurized hydraulic fluid to leak therethrough from the first pair of hydraulic lines 284a and the second pair of hydraulic lines 284b. Thus, the pressure difference between the pair of first hydraulic lines 284a and/or between the second pair of hydraulic lines 284b can effectively be limited, thereby effectively avoiding the unintentional rotation of the hydraulic motors 282a and 282b, even for the swash plates 214a and 214b having the actual neutral position displaced from the design neutral position due to the assembling errors or the like.

In view of transmission efficiency between the hydraulic pumps 210a, 210b and the hydraulic motors 282a, 282b, the leakage of the pressurized hydraulic fluid from the first and second pairs of hydraulic lines 284a, 284b through the bypass lines 262a, 262b is not preferable. Therefore, the bypass lines 262a, 262b are preferably provided in portions from the charging passage 233 to one of the first pair of hydraulic passages 231a, and to one of the second pair of hydraulic passages 231b.

The check valves 261a, 261b, 261c and 261d are more preferably provided with release means 262 to forcibly bring the first pair of hydraulic passages 231a into communication with one another, and the second pair of hydraulic passages 231b into communication with one another, if an emergency arises, as illustrated in FIG. 18. The release means 262 are designed to easily move the vehicle, when the vehicle must forcibly be moved or the vehicle wheels must forcibly be rotated by man power or the like due to the disorder of the power source 280, the hydraulic pumps 210a, 210b or the like. Specifically, when the vehicle wheels connected to the hydraulic motors 282a and 282b are forcibly rotated with the first pair of hydraulic lines 284a and/or the second pair of hydraulic lines 284b lying in the closing state, there occurs the pressure difference between the first pair of hydraulic lines 284a, and between the second pair of hydraulic lines 284b. As a result, the vehicle is hardly moved, or the vehicle wheels are hardly rotated. On the contrary, the release means can easily achieve the communications between the first pair of hydraulic passages 231a, and between the second pair of hydraulic passages 231b by mechanically releasing all the check valves 261a to 261d. Whereby, the vehicle can easily be moved by man power or the like.

As illustrated in FIG. 18, all the release means 263 are preferably disposed in the same side of the center section 230, so that the link mechanism linking these release means 263 for operation of the same can have a simplified structure.

The pump unit of this embodiment includes the charge pump 250 to forcibly feed the pressurized hydraulic fluid into the inlet port for charging 234. As an alternative to the arrangement using the charge pump, the pump unit may have an arrangement where the inlet port 234 is connected to the hydraulic fluid tank, thereby allowing the hydraulic fluid to spontaneously flow into the inlet port 234 when the pressure in a lower pressure line of the first pair of hydraulic lines 284a and/or the pressure in a lower pressure line of the second pair of hydraulic lines 284b drops from a predetermined value.

Fourth Embodiment

A pump unit according to a fourth embodiment of the present invention will be hereinafter described with reference to FIGS. 20 to 23. In the following description, corresponding or identical parts to those of the third embodiment have been given the same reference characters or those with primes (') to omit a detailed description thereof.

Figure 20:
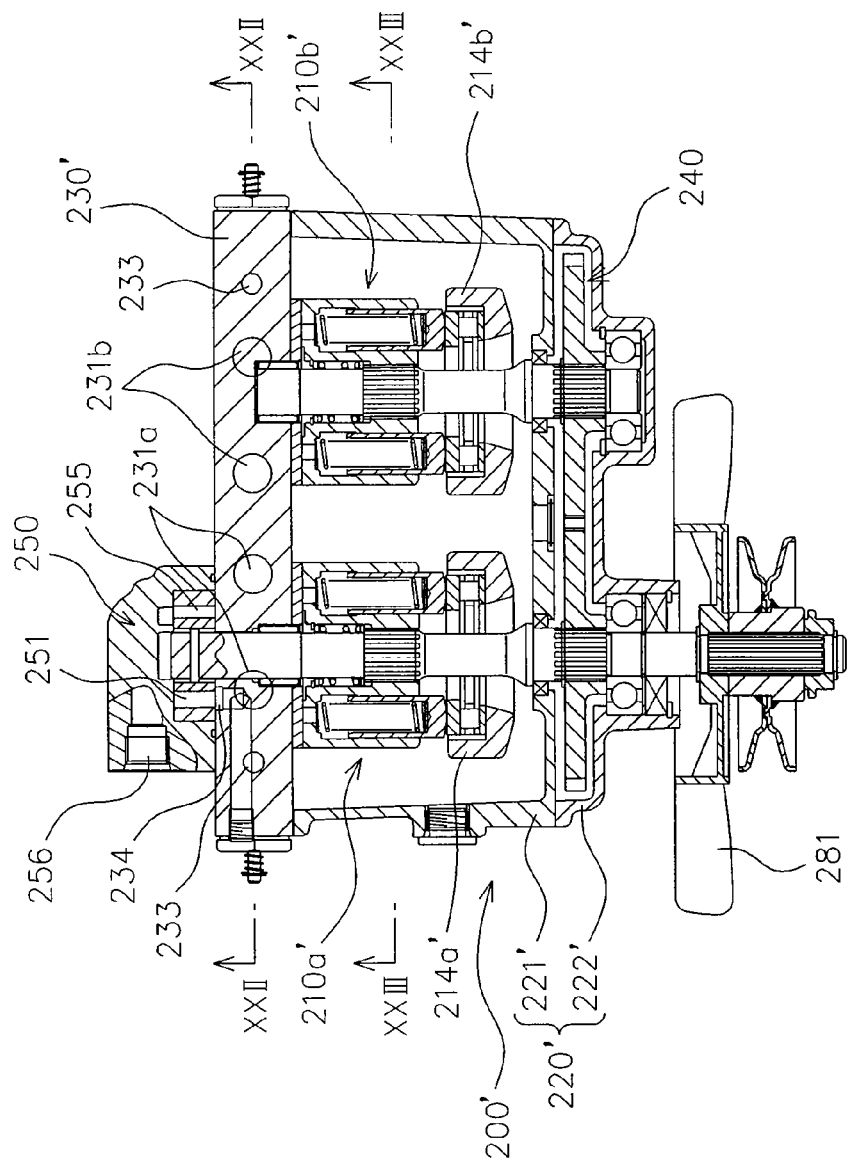
FIG. 20 is a longitudinal cross-sectional side view of a pump unit according to a fourth embodiment of the present invention.
Figure 21:
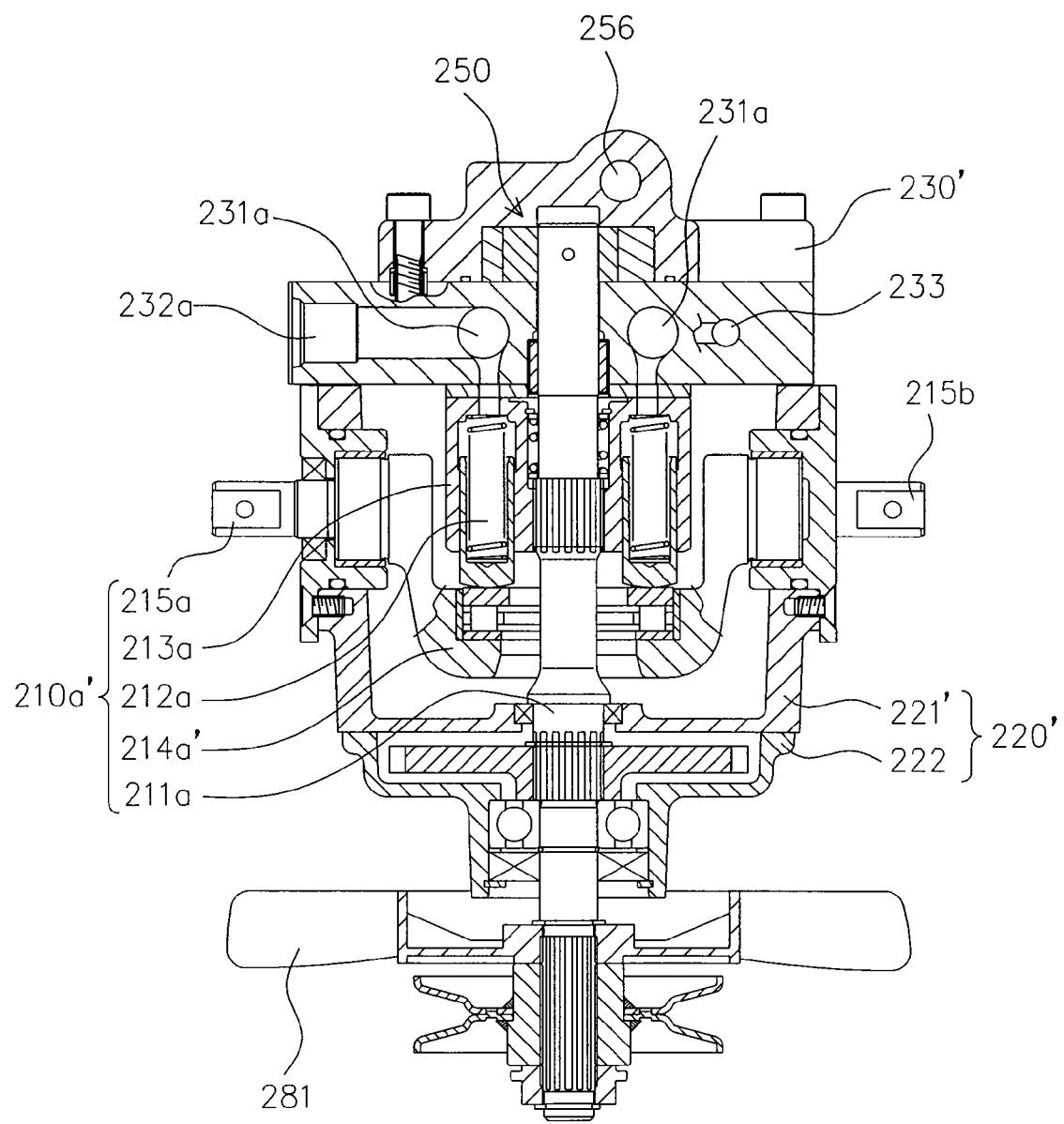
FIG. 21 is a longitudinal cross-sectional front view of the pump unit illustrated in FIG. 20.
Figure 22:
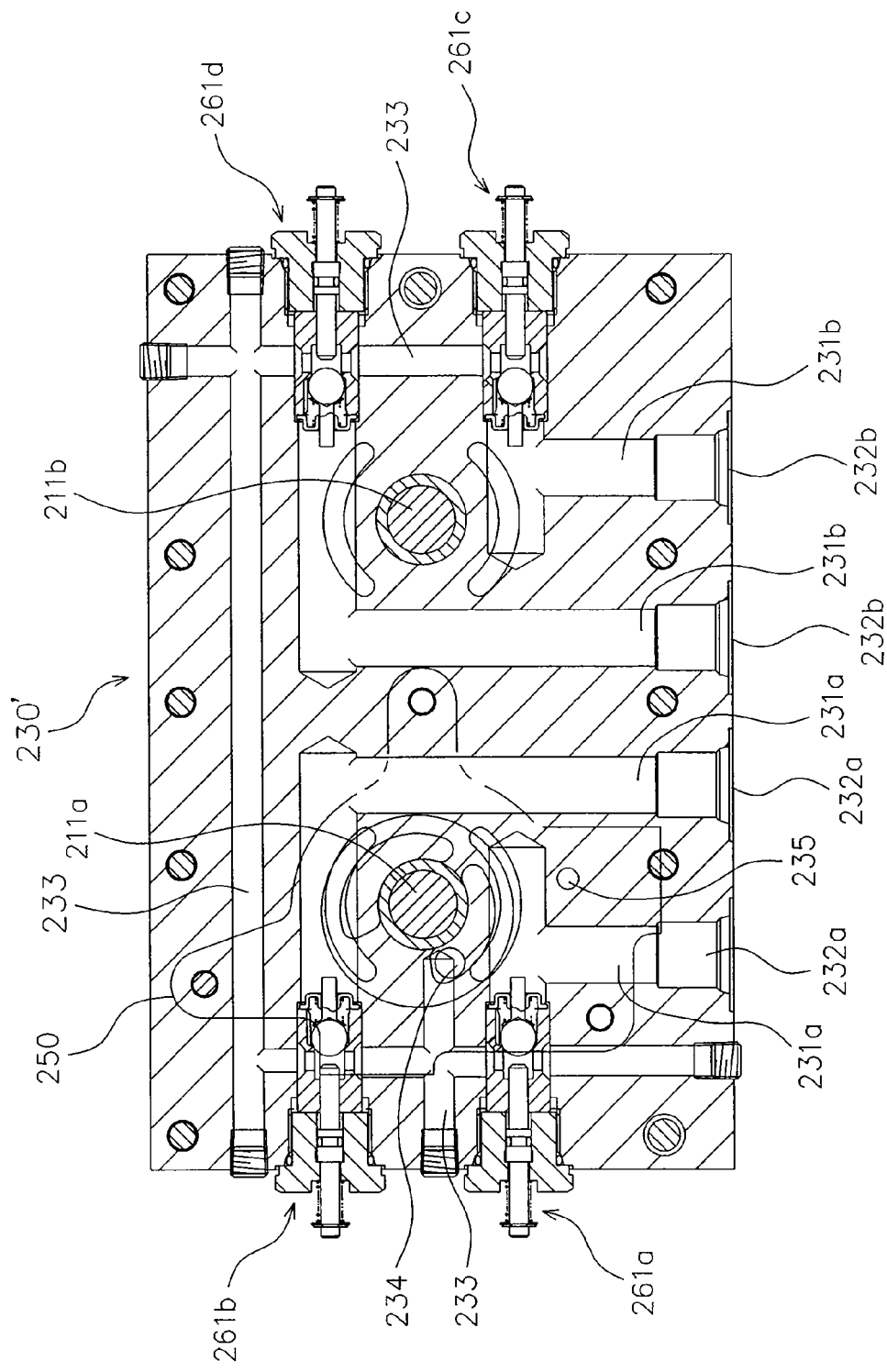
FIG. 22 is a cross section taken along line XXII-XXII in FIG. 20.
Figure 23:
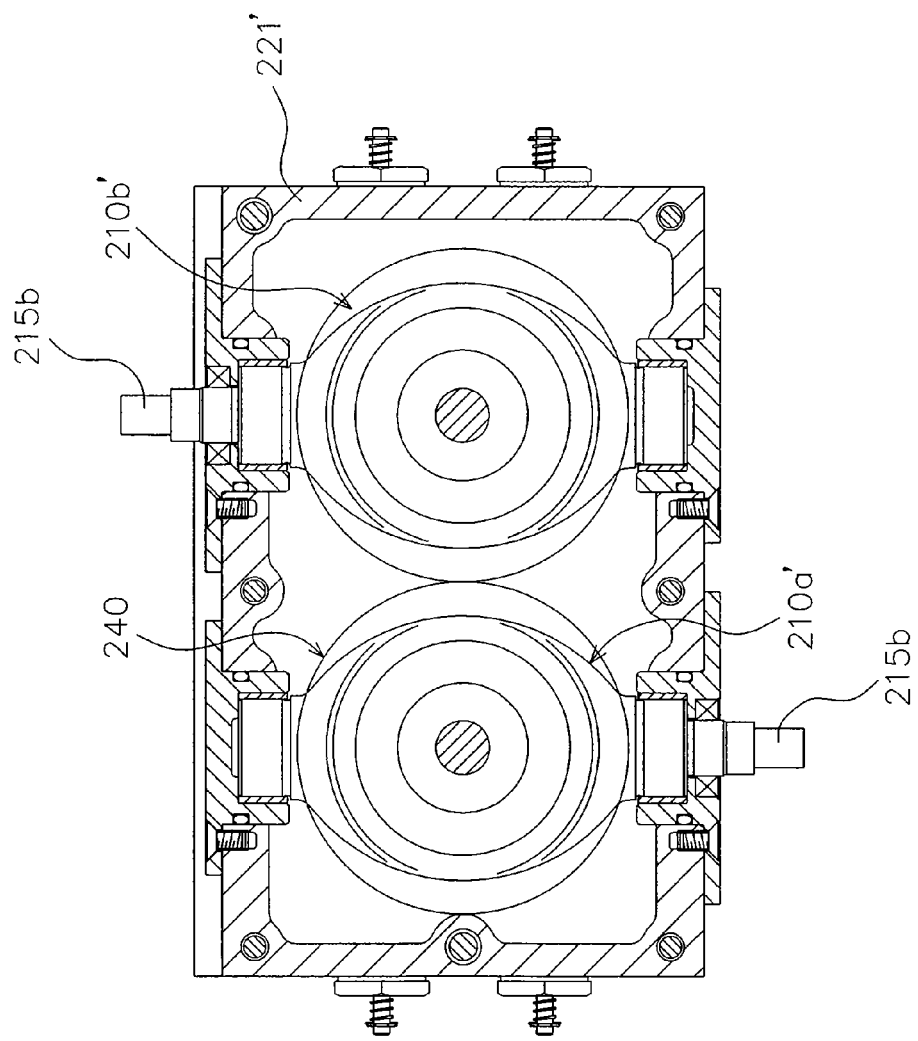
FIG. 23 is a cross section taken along line XXII-XXII in FIG. 20.

FIGS. 20 and 21 are respectively a longitudinal cross-sectional side view, and a longitudinal cross-sectional front view of the pump unit according to this embodiment. FIGS. 22 and 23 are respectively cross sections taken along lines XXII-XXII and XXIII-XXIII in FIG. 20.

As illustrated in FIGS. 20 and 21, the pump unit 200' of this embodiment includes the first hydraulic pump 210a' and the second hydraulic pump 210b', both of which are disposed parallel to one another along the vehicle longitudinal direction, and the first and second hydraulic pumps 210a' and 210b' respectively having the angularly adjustable swash plates 214a' and 214b' of trunnion type.

As illustrated in FIGS. 21 and 23, the first control shaft 215a and the second control shaft 215b extend away from one another along the vehicle width direction, in the same manner as those of the aforementioned embodiments.

As illustrated in FIG. 22, both first and second pairs of inlet/outlet ports 232a and 232b are formed in the same side of the center section 230'. The pump unit of this embodiment is also arranged so that the pressurized hydraulic fluid can be fed into the first pair of hydraulic passages 231a and the second pair of hydraulic passages 231b via the inlet port for charging 234 and the charging passage 233 communicating with the port 234.

The pump unit 200' having the first and second hydraulic pumps 210a' and 210b' arranged parallel to one another along the longitudinal direction has the first control shaft 215a displaced from the second control shaft 215b with respect to the vehicle longitudinal direction, as illustrated in FIG. 23. This displacement can be easily compensated by using arms or other suitable linking means.

The pump unit 200' having the above arrangement also produces the same effects as those of the third embodiment.

Fifth Embodiment

Figure 24:
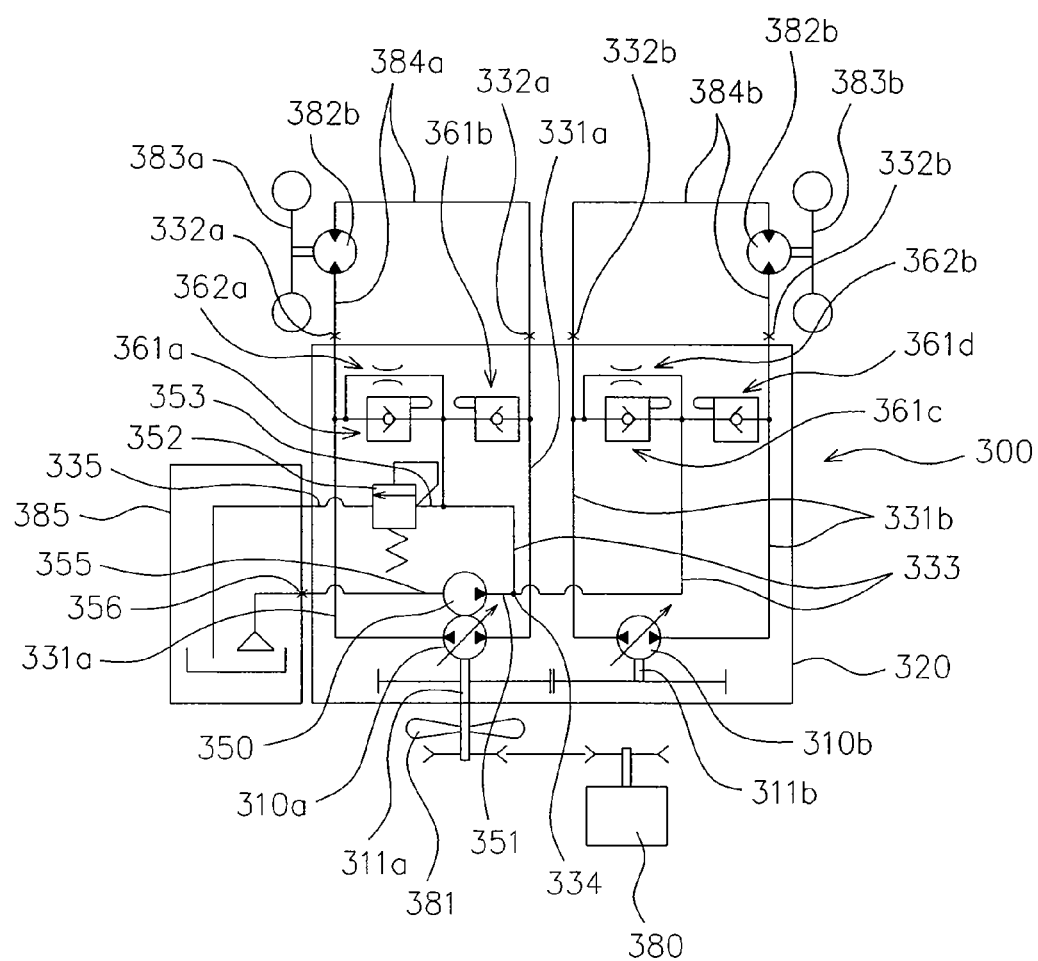
FIG. 24 is a hydraulic circuit diagram of a vehicle to which a pump unit according to a fifth embodiment of the present invention is applied.
Figure 25:
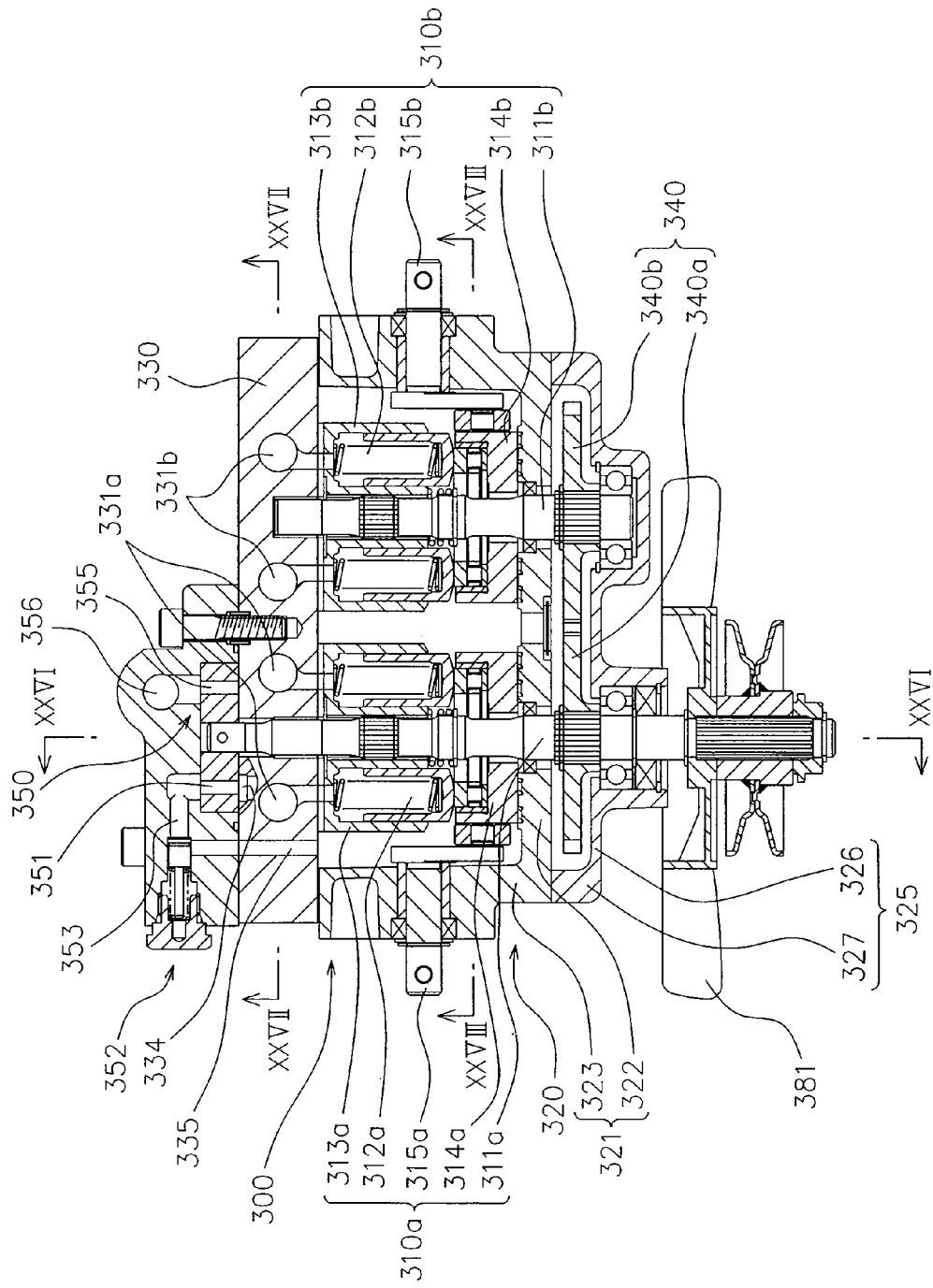
FIG. 25 is a longitudinal cross-sectional front view of the pump unit illustrated in FIG. 24.
Figure 26:
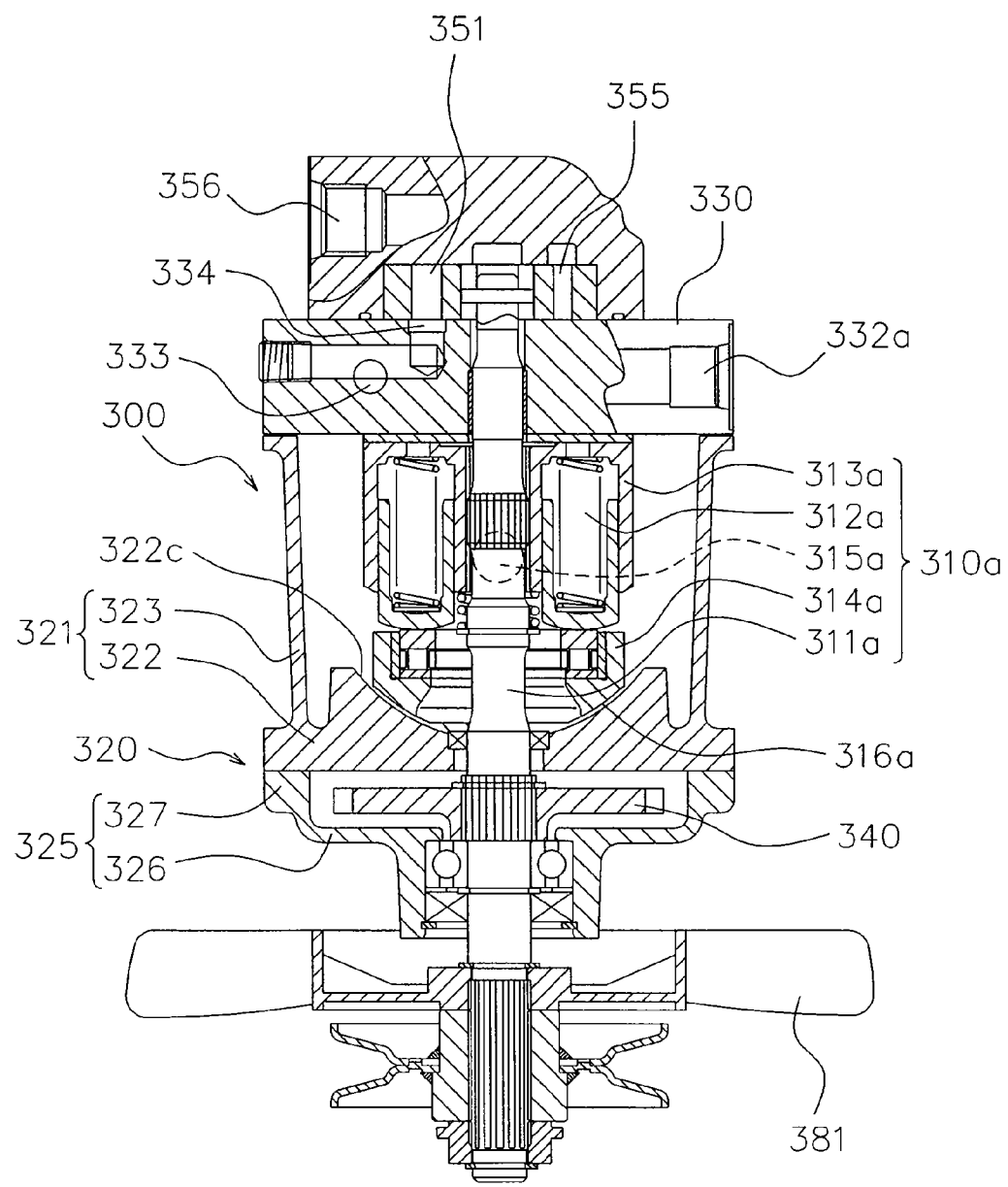
FIG. 26 is a cross section taken along line XXVI-XXVI in FIG. 25.
Figure 27:
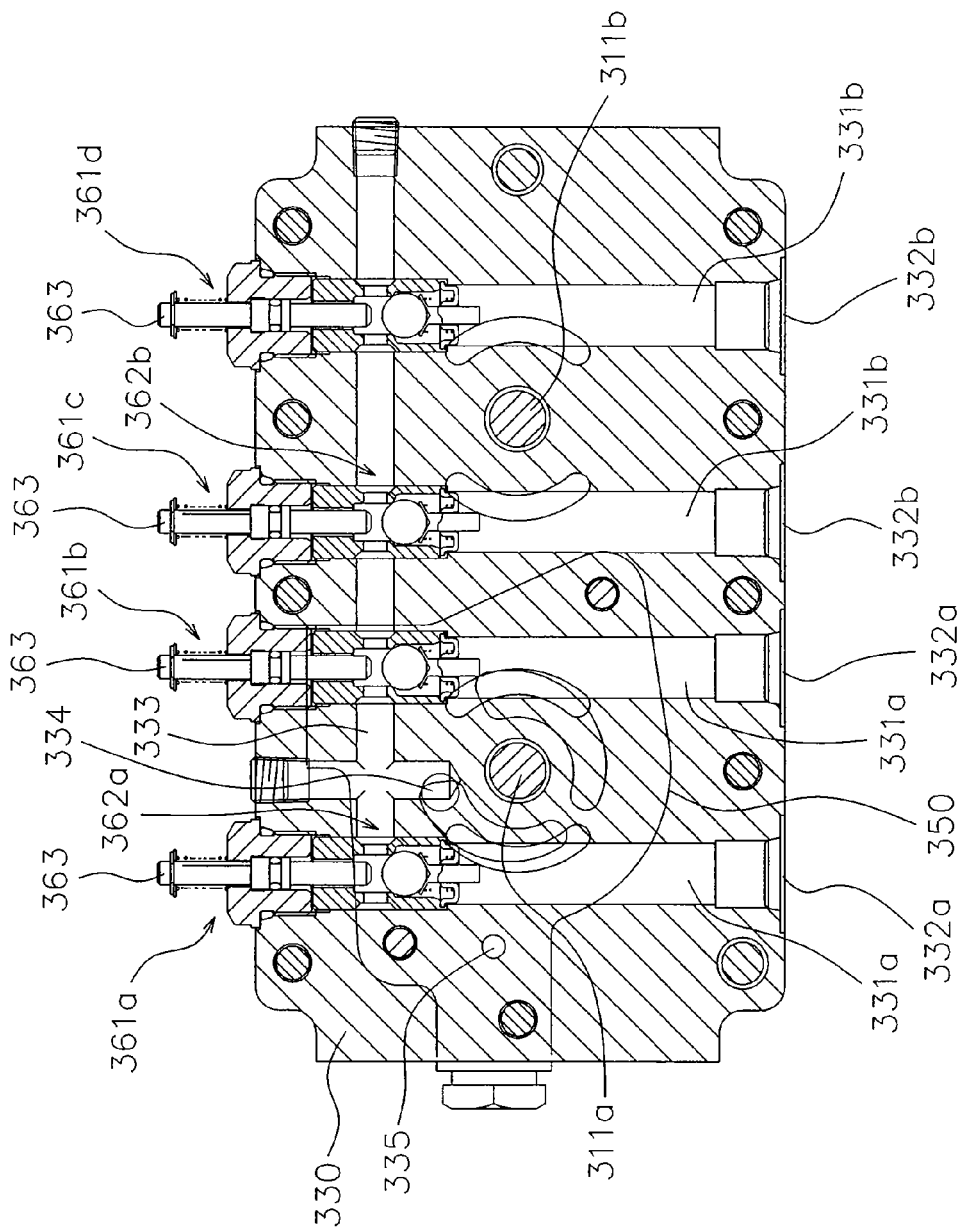
FIG. 27 is a cross section taken along line XXVII-XXVII in FIG. 25.
Figure 28:
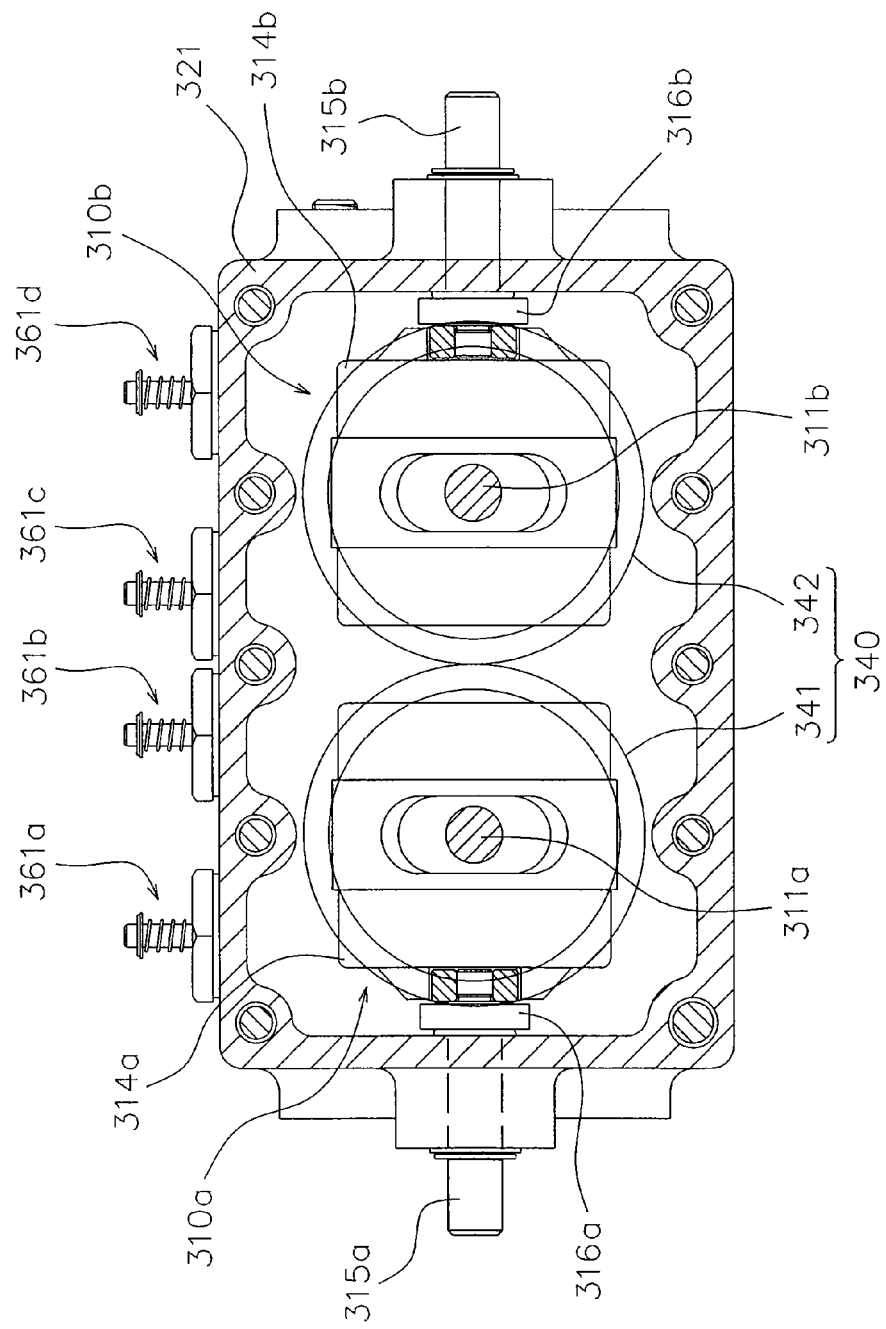
FIG. 28 is a cross section taken along line XXVIII-XXVIII in FIG. 25.

A pump unit according to a fifth embodiment of the present invention will be hereinafter described with reference to FIGS. 24 to 28. FIG. 24 is a hydraulic circuit diagram of the vehicle to which a pump unit 300 of this embodiment is applied. FIG. 25 is a longitudinal cross-sectional front view of the pump unit and its periphery. FIGS. 26 to 28 are respectively cross sections taken along lines XXVI-XXVI, XXVII-XXVII and XXVIII-XXVIII in FIG. 25.

As illustrated in FIGS. 24 to 26, the pump unit 300 is adapted to be used in a vehicle having right and left drive wheels 383a and 383b to which first and second hydraulic motors 382a and 382b are respectively connected, and includes a first hydraulic pump 310a and a second hydraulic pump 310b respectively connected to the first and second hydraulic motors 382a and 382b via a first pair of hydraulic lines 384a and a second pair of hydraulic lines 384b, and a common housing 320 for accommodating these hydraulic pumps 310a and 310b.

The connection form between the right and left drive wheels 383a and 383b, and the first and second hydraulic motors 382a and 382b meant in this embodiment includes the direct connection of the drive wheels respectively to those hydraulic motors, and also an operative connection of the drive wheels respectively to the hydraulic motors via a suitable power transmission mechanism. In FIG. 24, the reference codes 380, 381 and 385 respectively represent a power source, a cooling fan and a hydraulic fluid tank.

As illustrated in FIGS. 25, 26 and 28, the first hydraulic pump 310a and the second hydraulic pump 310b are axial piston pumps of a variable displacement type, and respectively include a first pump shaft 311a and a second pump shaft 311b that have vertical axes and are disposed parallel to one another in the vehicle width direction within the housing 320, a first piston unit 312a and a second piston unit 312b that are reciprocatingly movable according to the rotation of the pump shafts, a first cylinder block 313a and a second cylinder block 313b that reciprocably support the piston units, a first angularly adjustable swash plate 314a and a second angularly adjustable swash plate 314b that regulate the stroke length of the piston units by varying their tilting angles to vary the input/output flow rates of the piston units, and a first control shaft 315a and a second control shaft 315b that control the tilting angles of these swash plates.

The pump unit of this embodiment is of a vertical type with the first and second pump shafts 311a and 311b having the vertical axes. However, the present invention is not necessarily limited to this arrangement. It is a matter of course that the pump unit 300 can be of a horizontal type with the first and second pump shafts 311a and 311b having the horizontal axes.

As best illustrated in FIG. 25, the first and second angularly adjustable swash plates 314a and 314b of this embodiment are of a cradle type.

As illustrated in FIGS. 25 and 28, the first control shaft 315a and the second control shaft 315b extend away from one another in the vehicle width direction to respectively have oppositely positioned outer ends, and inner ends extending into the housing 320 to be respectively connected to arms 316a and 316b and hence the first and second swash plates 314a and 314b. The pump unit 300 with the thus arranged first and second control shafts 315a and 315b is advantageous when installed on the vehicle having push-pull control levers 198a and 198b as illustrated in FIG. 1, since the first and second control shafts 315a and 315b can have the rotating shaft centers disposed parallel to the longitudinal axis of the control levers, thereby achieving the simplification of a link mechanism between these control shafts and the control levers.

The first control shaft 315a and the second control shaft 315b are more preferably located at the same position with respect to the vehicle longitudinal direction, as illustrated in FIG. 25. The thus arranged first and second control shafts 315a and 315b can be aligned with the control levers in the vehicle width direction, thereby achieving a more simplified structure of the link mechanism.

The pump unit 300 further includes a common center section 330 that supports the first and second hydraulic pumps 310a and 310b, and a power transmission mechanism 340 that is accommodated within the housing 320 to operatively connect the first and second hydraulic pump shafts 311a and 311b together.

The pump unit 300 with the power transmission mechanism 340 permits the simultaneous rotation of both pump shafts 311a and 311b only by connecting the power source to either one of the first and second pump shafts 311a and 311b, or to the first pump shaft 311a in this embodiment, thereby achieving the simplified structure for the power transmission from the power source to the pump unit 300. In this embodiment, the power transmission mechanism 340 is in the form of a gear transmission device that includes a first gear 340a non-rotatably supported on the lower side of the first pump shaft 311a, and a second gear 340b non-rotatably supported on the lower side of the second pump shaft 311b in meshed engagement with the first gear 340a. Instead of the gear transmission device, any conventional power transmission mechanisms such as chain and belt may be used.

The housing 320, as illustrated in FIGS. 25 and 26, includes a first housing 321 for accommodating the first and second hydraulic pumps 310a and 310b, and a second housing 325 for accommodating the power transmission mechanism 340.

The first housing 321 has a box shape with a first side wall 322 disposed in the upper or lower side of the pump shafts 311a and 311b along the longitudinal direction thereof, or in this embodiment in the lower side of the pump shafts 311a and 311b, which will be hereinafter referred to simply as the lower side, and a peripheral wall 323 extending from a peripheral edge of the first sidewall 322 to the opposite side of the pump shafts 311a and 311b along the longitudinal direction thereof (i.e., the upper side of the pump shafts 311a and 311b in this embodiment, which will be referred to simply as the upper side). The first sidewall 322 forms bearing holes through which the first and second pump shafts 311a and 311b respectively extend. The upper side of the first housing 321 has an end surface forming an opening through which the first and second hydraulic pumps 310a and 310b can be placed into the first housing 321. The opening of the first housing 321 is sealed by the center section 330 in a liquid tight manner. That is, the center section 330 of this embodiment constitutes a part of the first housing 321. The first and second control shafts 315a and 315b extend away from one another in the vehicle width direction to respectively have outer ends protruding from the peripheral wall 323 of the first housing 321.

The second housing 325 is disposed in the lower side, and has a box shape with a lower sidewall 326 forming a bearing hole through which the lower end of the first pump shaft 311a extends and a bearing portion for receiving the lower end of the second pump shaft 311b, and a peripheral wall 327 extending upwardly from a peripheral edge of the lower sidewall 326. The upper side of the second housing 325 forms an opening through which the power transmission mechanism 340 can be placed into the second housing 325.

The second housing 325 is connected to the first housing 321 in such a manner as to have the opening sealed in a liquid tight manner by the first sidewall 322 of the first housing 321, and form an accommodation space of the power transmission mechanism 340 in cooperation with the first sidewall 322 of the first housing 321.

In the thus arranged housing 320, the first sidewall 322 of the first housing 321 serves as a partition wall dividing the accommodation space of the housing into a hydraulic pump accommodation chamber and a power transmission mechanism accommodation chamber. The partition wall thus defining the hydraulic pump accommodation chamber and the power transmission mechanism accommodation chamber can effectively prevent any foreign matters such as iron powder generated in the power transmission mechanism 340 from intruding into the hydraulic pump accommodation chamber, and hence damaging piston units 312a, 312b, cylinder blocks 313a, 313b, and/or other parts. In addition to this foreign matters prevention measure, the first and second pump shafts 311a and 311b, which extend through the partition wall 322, may have circumferential peripheries with seal rings thereon to more securely prevent the intrusion of the foreign matters.

Portions of the housing 320, through which the respective shafts 311a, 315a and 315b extend, are sealed by any suitable sealing means in a liquid tight manner, thereby allowing the housing 320 to serve as the hydraulic fluid tank 385.

The first sidewall 322 serving as the partition wall preferably forms a hydraulic fluid communication hole 322a for communication between the hydraulic pump accommodation chamber and the power transmission mechanism accommodation chamber with a filter 322b provided in the hole for preventing the intrusion of the foreign matters into the hydraulic pump accommodation chamber. The thus formed hydraulic fluid communication hole 322a can omit the necessity of separately feeding the lubricant to the power transmission mechanism 340, with the result that the power transmission mechanism 340 can be lubricated with the hydraulic fluid stored within the housing. This permits low manufacturing cost and ease of maintenance.

In this embodiment, the first and second angularly adjustable swash plates 314a and 314b are of a cradle type, as illustrated in FIG. 26. Therefore, when the partition wall 322 forms, on its side facing the hydraulic pumps 310a, 310b, spherical concave surfaces 322c respectively adapted to spherical convex surfaces 316 formed in the rear sides of the swash plates 314a and 314b, which rear sides being opposite to the surfaces facing the piston units 312a and 312b, the spherical concave surfaces 322c can slidingly guide the spherical convex surfaces 316 of the swash plates 314a and 314b. The swash plates thus can securely rest on the spherical concave surfaces 322c. Although FIG. 26 illustrates only the portion of the partition wall 322 corresponding to the first angularly adjustable swash plate 314a, it is a matter of course that the portion of the partition wall 322 corresponding to the second angularly adjustable swash plate 314b forms the spherical concave surface 322c.

In this embodiment, the first sidewall 322 of the first housing 321 serves as the partition wall. Alternatively, a partitioning means may take various forms, as long as it can produce the same effect. For example, a separately prepared partition wall may be mounted in a housing having a simple cylindrical box shape (see FIG. 14).

Now, the description will be made for the center section 330. As illustrated in FIG. 27, the center section 330 forms a first pair of hydraulic passages 331a for the first hydraulic pump communicating with the first piston unit. The first pair of hydraulic passages 331a respectively have first ends opening to the outside of the center section 330 to form a first pair of inlet/outlet ports 332a serving as connection ports for connection with the first pair of hydraulic lines 384a extending between the first hydraulic motor and the center section 330 (see FIG. 24).

Similarly, the center section 330 forms a second pair of hydraulic passages 331b for the second hydraulic pump communicating with the second piston unit. The second pair of hydraulic passages 331b respectively have first ends forming a second pair of inlet/outlet ports 332b serving as connection ports for connection with the second pair of hydraulic lines 384b (see FIG. 24).

As described above, the common center section 330 thus forms all the first and second pairs of inlet/outlet ports 332a and 332b serving as the connection ports for connection with the first and second pairs of hydraulic lines 384a and 384b. Whereby, the conduit work between the hydraulic pumps 310a and 310b, and the hydraulic motors 382a and 382b can be facilitated. The first and second pairs of inlet/outlet ports are more preferably formed in the same side of the center section 330, as illustrated in FIG. 27, thereby further facilitating the conduit work.

The center section 330 also forms a common charging passage 333 for feeding a pressurized hydraulic fluid to the first pair of hydraulic lines 384a and the second pair of hydraulic lines 384b. The charging passage 333 has a first end opening to the outside of the center section 330 to form an inlet port for charging 334. In this embodiment, the first pump shaft 311a, as illustrated in FIG. 25, has an extension extending further from the upper end thereof to be located above the center section 330, thereby supporting a charge pump 350 via the extension, and connecting an outlet port 351 of the charge pump 350 to the inlet port 334. The outlet port 351 of the charge pump also communicates with a pressure relief line 353 having a charge relief valve 352 therein. The charge relief valve 352 is designed to adjust the hydraulic pressure in the charging passage 333 (see FIG. 24). The pressure relief line 353 has a rear end communicating via a drain port 335 formed in the center section 330 with the housing 320 serving also as the hydraulic fluid tank 385. The reference codes 355 and 356 in FIGS. 25 and 26 respectively represent an inlet port of the charge pump, and an inlet port communicating with the inlet port of the charge pump and connected to the hydraulic fluid tank 385 through a suitable conduit.

On the other hand, the charging passage 333, as illustrated in FIG. 27, has a second end communicating with the first pair of hydraulic passages 331a and the second pair of hydraulic passages 331b via check valves 361a, 361b, 361c and 361d so as to allow the pressurized hydraulic fluid to be fed from the common charging passage 333 into a lower pressure line of the first pair of hydraulic lines 384a and a lower pressure line of the second pair of hydraulic lines 384b, while preventing the pressurized hydraulic fluid from flowing in the reverse direction.

Bypass lines 362a and 362b having throttle valves are formed between at least one of the first pair of hydraulic passages 331a and the charging passage 333, and between at least one of the second pair of hydraulic passages 331b and the charging passage 333 (see FIGS. 24 and 27).

The bypass lines 362a and 362b are designed to assure the neutralization of the hydraulic pumps 310a and 310b. Specifically, even if the swash plates 314a and 314b of the hydraulic pumps 310a and 310b tilt from the neutral positions by a small angle, there occurs the pressure difference between the first pair of hydraulic lines 384a, and/or between the second pair of hydraulic lines 384b. This pressure difference causes the rotation of the hydraulic motors 383a and 383b. That is, even a slight amount of the displacement between the actual neutral positions and the predetermined design positions of the swash plates 314a and 314b due to assembling errors or the like causes an unintentional rotation of the hydraulic motors 383a and 383b. On the contrary, the bypass lines 362a and 362b, as described above, allow the pressurized hydraulic fluid to leak therethrough from the first pair of hydraulic lines 384a and the second pair of hydraulic lines 384b. Thus, the pressure difference between the pair of first hydraulic lines 384a and/or between the second pair of hydraulic lines 384b can effectively be limited, thereby effectively avoiding the unintentional rotation of the hydraulic motors 382a and 382b, even for the swash plates 314a and 314b having the actual neutral position displaced from the design neutral position due to the assembling errors or the like.

In view of transmission efficiency between the hydraulic pumps 310a, 310b and the hydraulic motors 382a, 382b, the leakage of the pressurized hydraulic fluid from the first and second pairs of hydraulic lines 384a, 384b through the bypass lines 362a, 362b is not preferable. Therefore, the bypass lines 362a, 362b are preferably provided in portions from the charging passage 333 to one of the first pair of hydraulic passages 331a, and to one of the second pair of hydraulic passages 331b.

The check valves 361a, 361b, 361c and 361d are more preferably provided with release means 362 to forcibly bring the first pair of hydraulic passages 331 into communication with one another, and the second pair of hydraulic passages 331b into communication with one another, if an emergency arises, as illustrated in FIG. 27. The release means 362 are designed to easily move the vehicle, when the vehicle must forcibly be moved or the vehicle wheels must forcibly be rotated by man power or the like due to the disorder of the power source 380, the hydraulic pumps 310a, 310b or the like. Specifically, when the vehicle wheels connected to the hydraulic motors 382a and 382b are forcibly rotated with the first pair of hydraulic lines 384a and/or the second pair of hydraulic lines 384b lying in the closing state, there occurs the pressure difference between the first pair of hydraulic lines 331a, and between the second pair of hydraulic lines 331b. As a result, the vehicle is hardly moved, or the vehicle wheels are hardly rotated. On the contrary, the release means can easily achieve the communications between the first pair of hydraulic lines 384a, and between the second pair of hydraulic lines 384b by mechanically releasing all the check valves 361a to 361d. Whereby, the vehicle can easily be moved by man power or the like.

As illustrated in FIG. 27, all the release means 363 are preferably disposed in the same side of the center section 330, so that the link mechanism for linking these release means 363 can have a simplified structure.

The pump unit of this embodiment includes the charge pump 350 to forcibly feed the pressurized hydraulic fluid into the inlet port for charging 334. As an alternative to the arrangement using the charge pump, the pump unit may have an arrangement where the inlet port 334 is connected to the hydraulic fluid tank, thereby allowing the hydraulic fluid to spontaneously flow into the inlet port 334 when the pressure in a lower pressure line of the first pair of hydraulic lines 384a and/or the pressure in a lower pressure line of the second pair of hydraulic lines 384b drops from a predetermined value.

Sixth Embodiment

A pump unit according to a sixth embodiment of the present invention will be hereinafter described with reference to FIGS. 29 to 32. In the following description, corresponding or identical parts to those of the fifth embodiment have been given the same reference characters or those with primes (') to omit a detailed description thereof.

Figure 29:
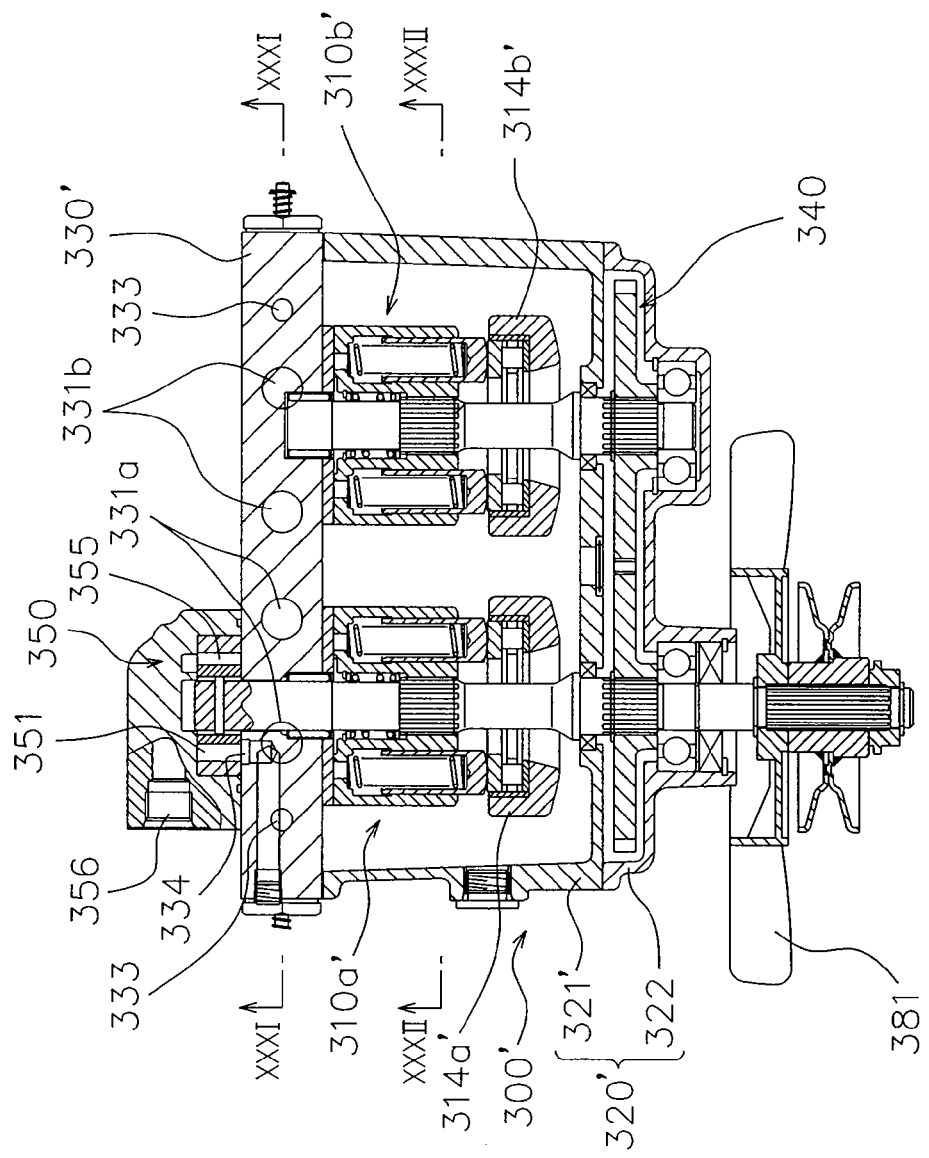
FIG. 29 is a longitudinal cross-sectional side view of a pump unit according to a sixth embodiment of the present invention.
Figure 30:
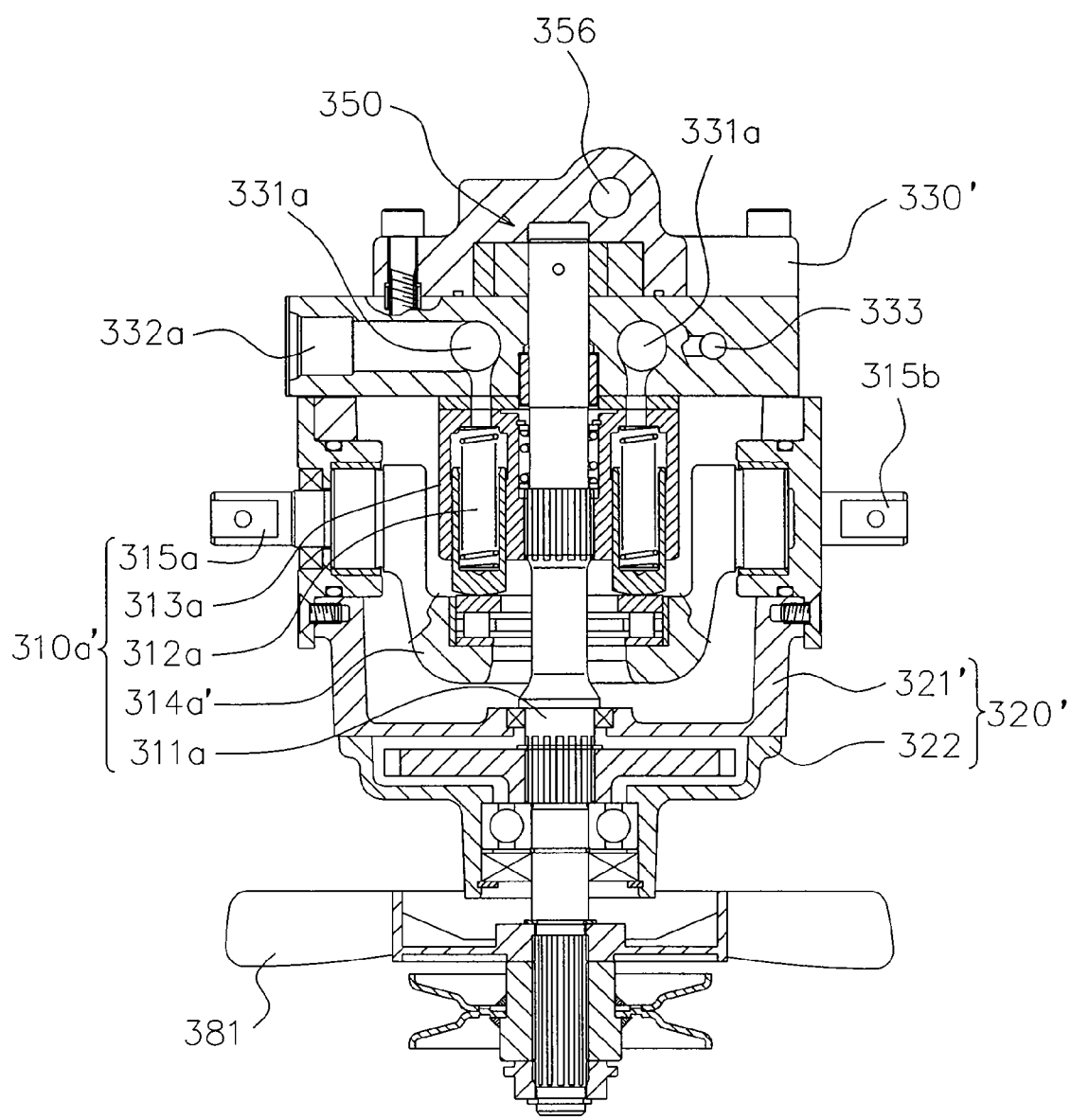
FIG. 30 is a longitudinal cross-sectional front view of the pump unit illustrated in FIG. 29.
Figure 31:
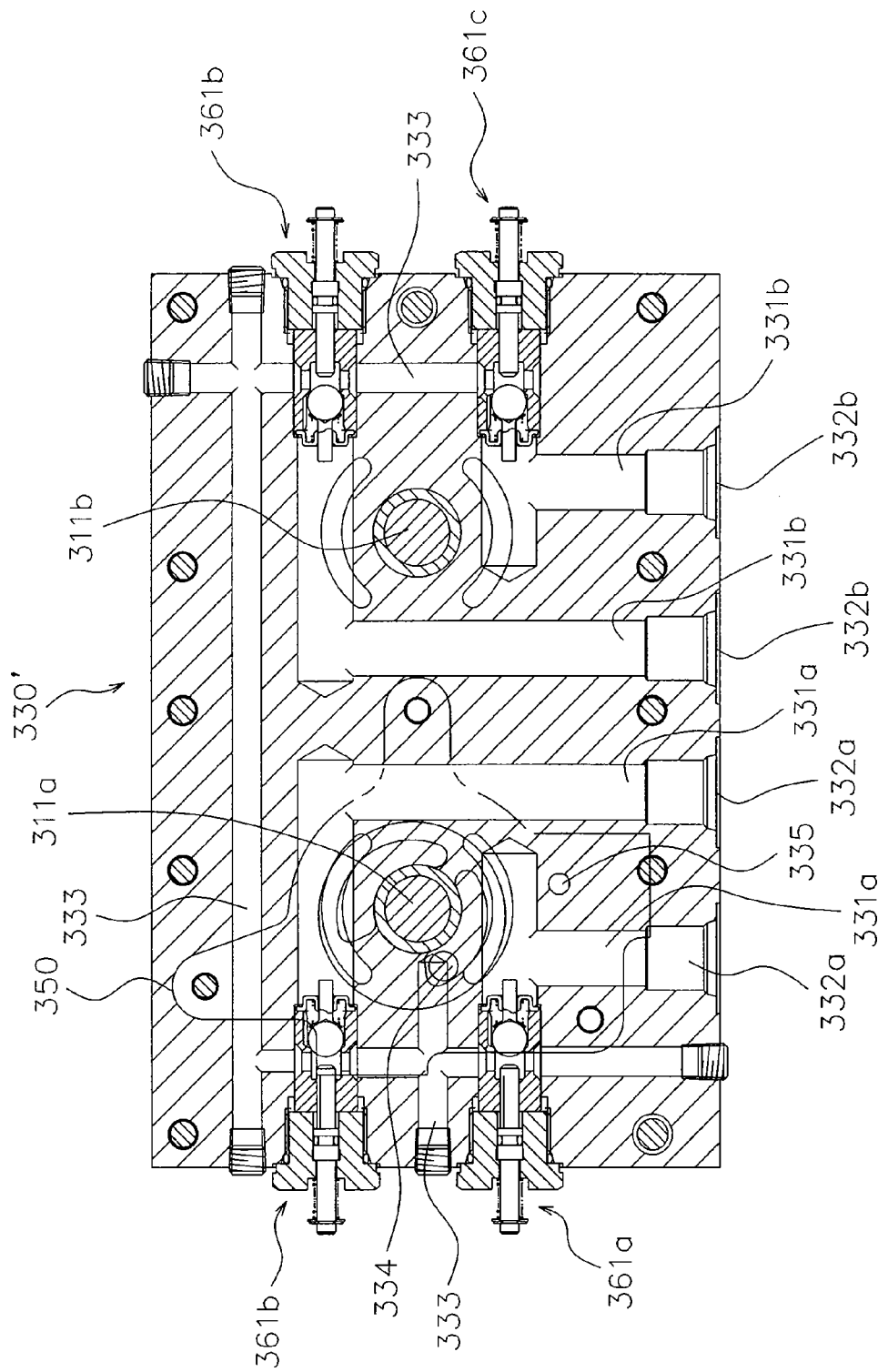
FIG. 31 is a cross section taken along line XXXI-XXXI in FIG. 29.
Figure 32:
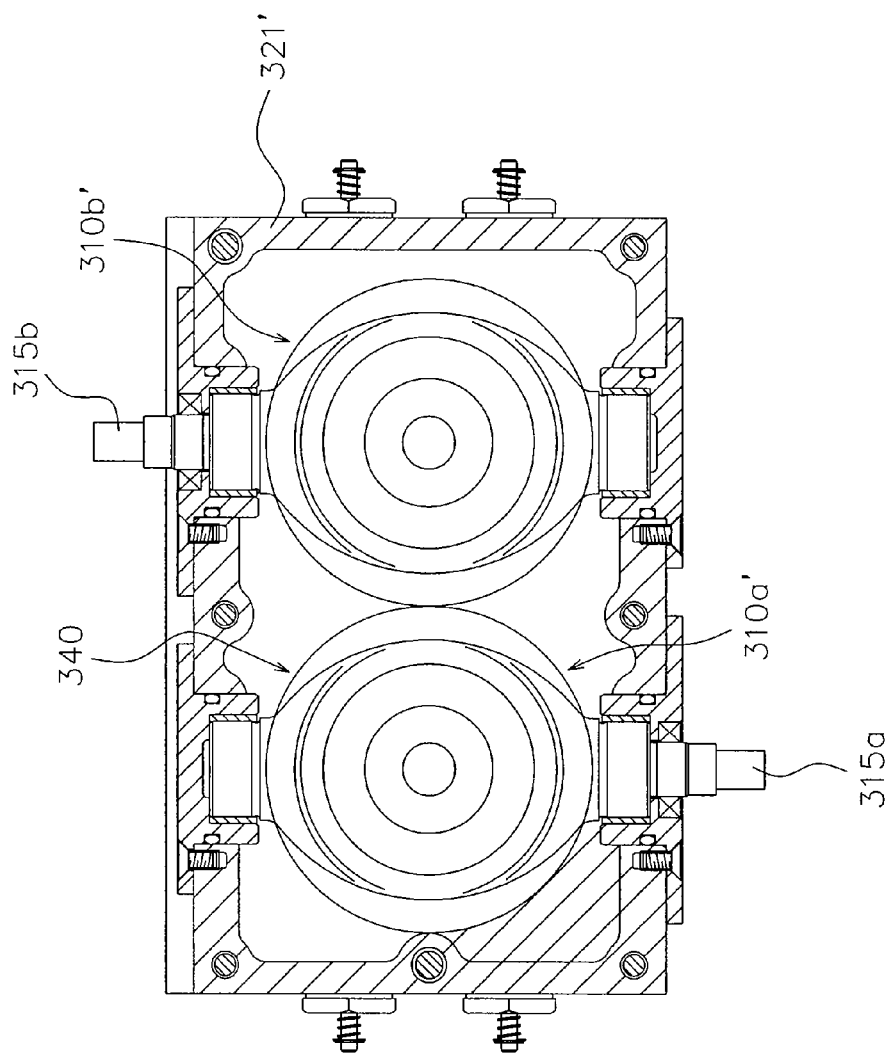
FIG. 32 is a cross section taken along line XXXII-XXXII in FIG. 29.

FIGS. 29 and 30 are respectively a longitudinal cross-sectional side view, and a longitudinal cross-sectional front view of the pump unit according to this embodiment. FIGS. 31 and 32 are respectively cross sections taken along lines XXXI-XXXI, and XXXII-XXXII in FIG. 29.

As illustrated in FIGS. 29 and 30, the pump unit 300' of this embodiment includes the first hydraulic pump 310a' and the second hydraulic pump 310b', both of which are disposed parallel to one another along the vehicle longitudinal direction, and the first and second hydraulic pumps 310a' and 310b' respectively having the angularly adjustable swash plates 314a' and 314b' of trunnion type.

As illustrated in FIGS. 30 and 32, the first control shaft 315a and the second control shaft 315b extend away from one another along the vehicle width direction, in the same manner as those of the aforementioned embodiments.

As illustrated in FIG. 31, both first and second pairs of inlet/outlet ports 332a and 332b are formed in the same side of the center section 330'. The pump unit of this embodiment is also arranged so that the pressurized hydraulic fluid can be fed into the first pair of hydraulic passages 331a and the second pair of hydraulic passages 331b via the inlet port for charging 334 and the charging passage 333 communicating with the port 334.

The pump unit 300' having the first and second hydraulic pumps 310a' and 310b' arranged parallel to one another along the longitudinal direction has the first control shaft 315a displaced from the second control shaft 315b with respect to the vehicle longitudinal direction, as illustrated in FIG. 32. This displacement can be easily compensated by using arms or other suitable linking means.

The pump unit 300' having the above arrangement also produces the same effects as those of the fifth embodiment.

Seventh Embodiment

Figure 33:
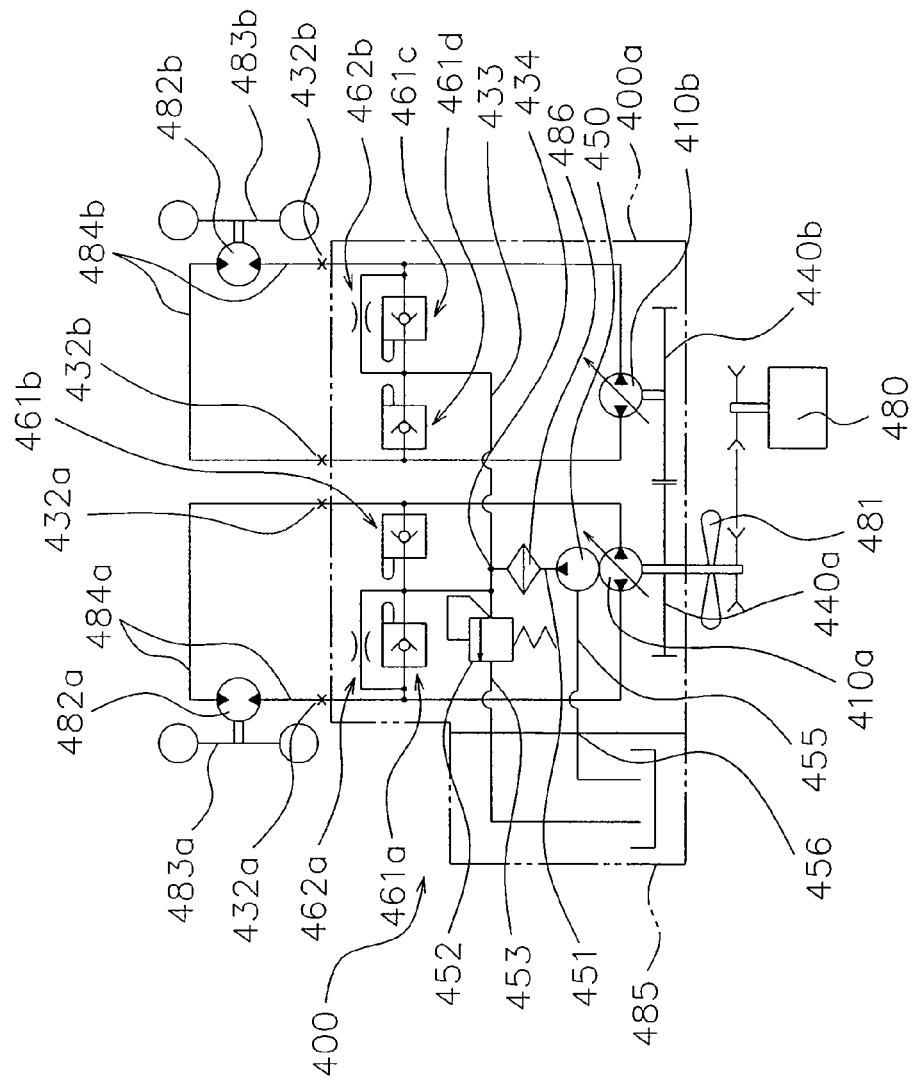
FIG. 33 is a hydraulic circuit diagram of a vehicle to which a pump unit according to a seventh embodiment of the present invention is applied.
Figure 34:
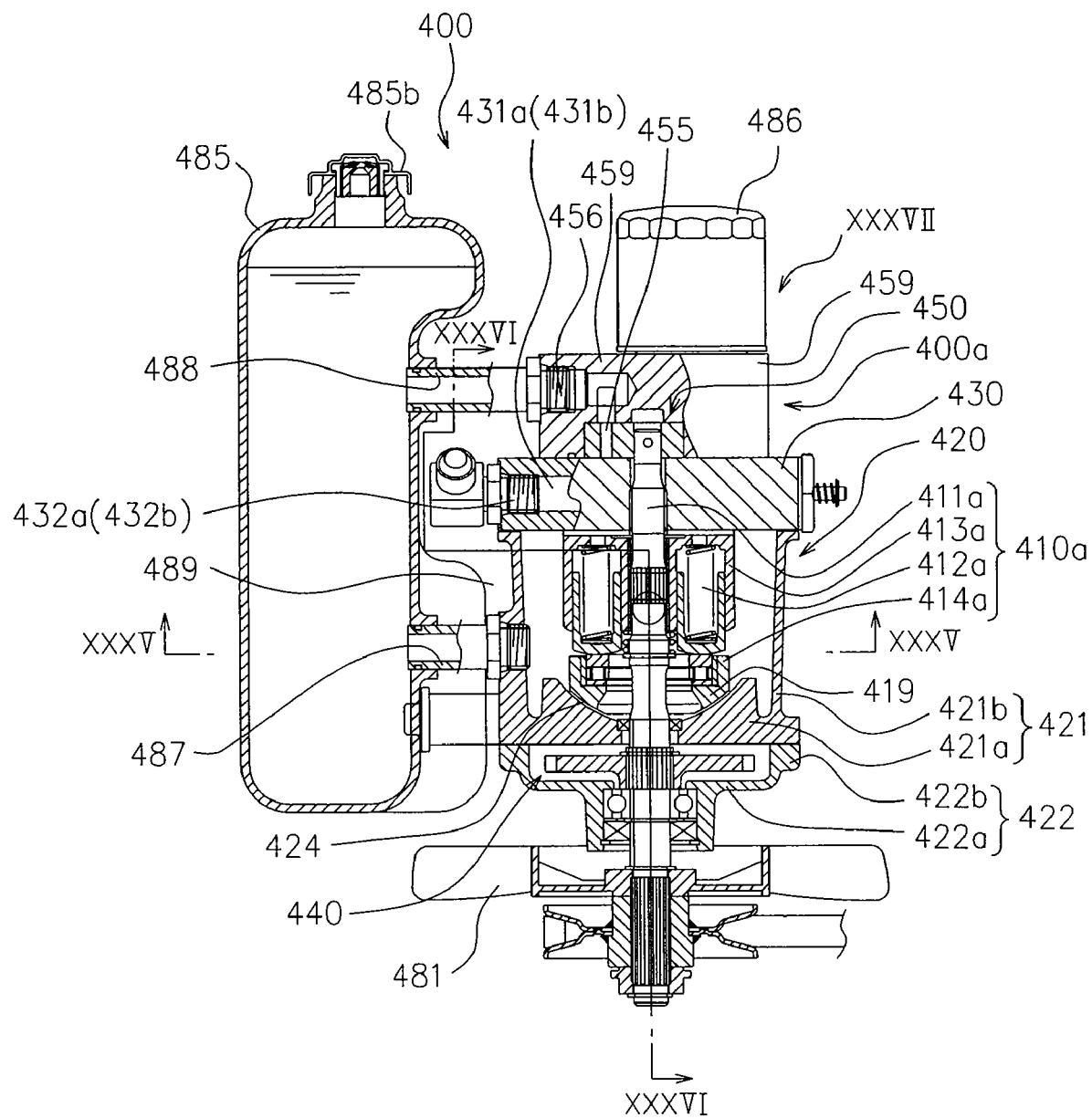
FIG. 34 is a longitudinal cross-sectional side view of the pump unit illustrated in FIG. 33.
Figure 35:
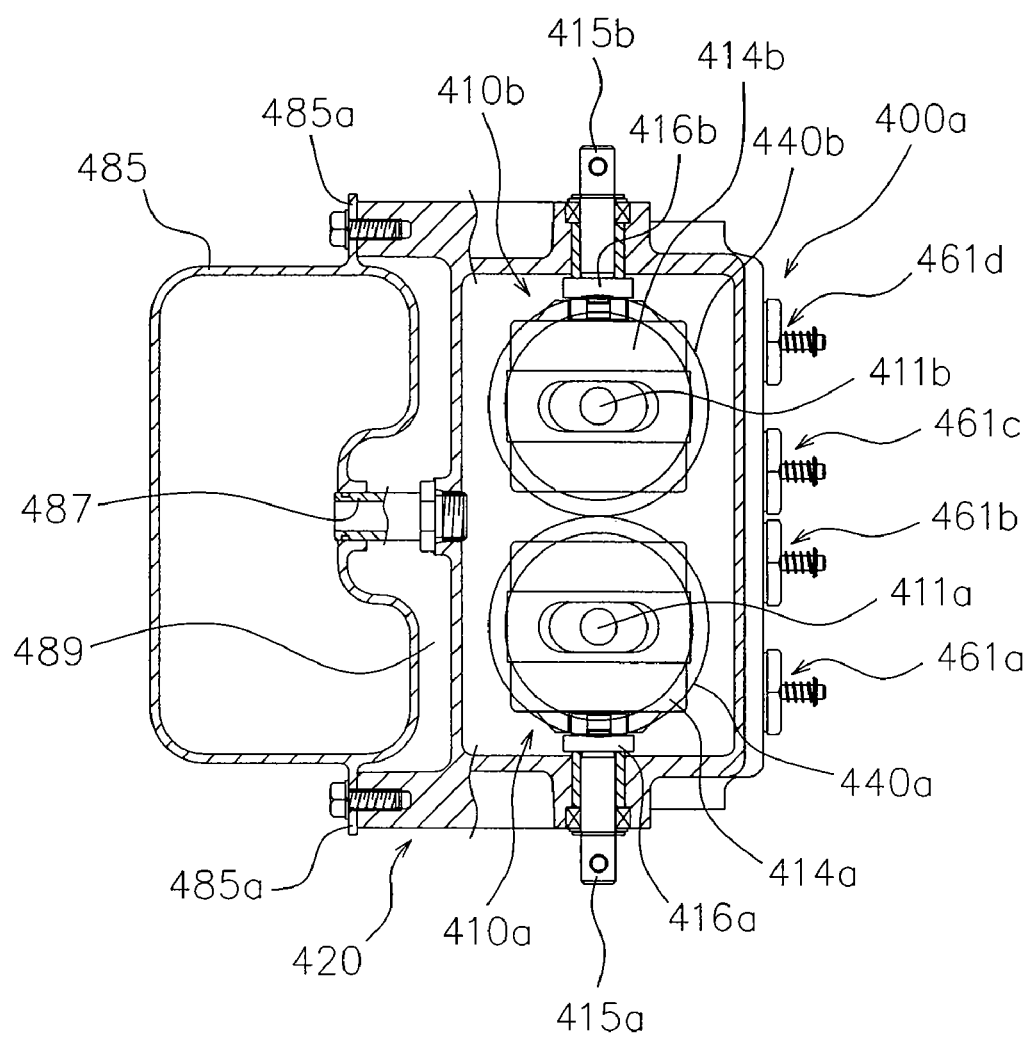
FIG. 35 is a cross section taken along line XXXV-XXXV in FIG. 34.
Figure 36:
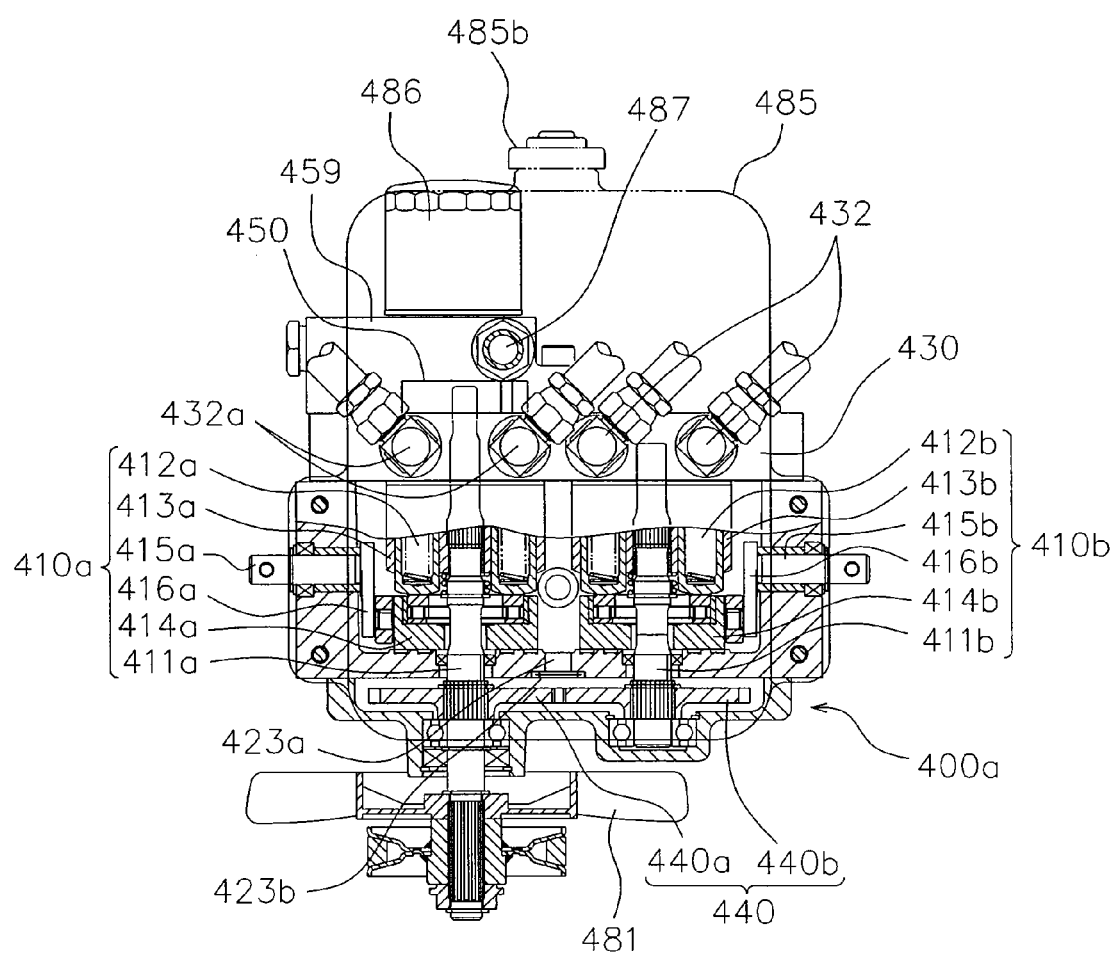
FIG. 36 is a cross section taken along line XXXVI-XXXVI in FIG. 34.

A pump unit according to a seventh embodiment of the present invention will be hereinafter described with reference to the accompanying drawings. FIG. 33 is a hydraulic circuit diagram of the vehicle to which a pump unit 400 of this embodiment is applied. FIG. 34 is a longitudinal cross-sectional side view of the pump unit and its periphery. FIGS. 35 and 36 are respectively cross sections taken along lines XXXV-XXXV, and XXXVI-XXXVI.

As illustrated in FIGS. 33 to 35, the pump unit 400 is adapted to be used in a vehicle having right and left drive wheels 483a and 483b to which first and second hydraulic motors 482a and 482b are respectively connected, and includes a first hydraulic pump 410a and a second hydraulic pump 410b respectively connected to the first and second hydraulic motors 482a and 482b via a first pair of hydraulic lines 484a and a second pair of hydraulic lines 484b, and a common housing 420 for accommodating these hydraulic pumps 410a and 410b.

The connection form between the right and left drive wheels 483a and 483b, and the first and second hydraulic motors 482a and 482b meant in this embodiment includes the direct connection of the drive wheels respectively to those hydraulic motors, and also an operative connection of the drive wheels respectively to the hydraulic motors via a suitable power transmission mechanism. In FIG. 33, the reference codes 480, 481 and 486 respectively represent a power source, a cooling fan and a filter.

As illustrated in FIGS. 34 to 36, the first hydraulic pump 410a and the second hydraulic pump 410b are axial piston pumps of a variable displacement type, and respectively include a first pump shaft 411a and a second pump shaft 411b that have vertical axes and are disposed parallel to one another in the vehicle width direction within the housing 420, a first piston unit 412a and a second piston unit 412b that are reciprocatingly movable according to the rotation of the pump shafts, a first cylinder block 413a and a second cylinder block 413b that reciprocably support the piston units, a first angularly adjustable swash plate 414a and a second angularly adjustable swash plate 414b that regulate the stroke length of the piston units by varying their tilting angles to vary the input/output flow rates of the piston units, and a first control shaft 415a and a second control shaft 415b that control the tilting angles of these swash plates.

The pump unit of this embodiment is of a vertical type with the first and second pump shafts 411a and 411b having the vertical axes. However, the present invention is not necessarily limited to this arrangement. It is a matter of course that the pump unit 400 can be of a horizontal type with the first and second pump shafts 411a and 411b having the horizontal axes.

As best illustrated in FIG. 34, the first and second angularly adjustable swash plates 414a and 414b of this embodiment are of a cradle type.

As illustrated in FIGS. 35 and 36, the first control shaft 415a and the second control shaft 415b extend away from one another in the vehicle width direction to respectively have oppositely positioned outer ends, and inner ends extending into the housing 420 to be respectively connected to arms 416a and 416b and hence the first and second swash plates 414a and 414b. The pump unit 400 with the thus arranged first and second control shafts 415a and 415b is advantageous when installed on the vehicle having push-pull control levers 198a and 198b as illustrated in FIG. 1, since the first and second control shafts 415a and 415b can have the rotating shaft centers disposed parallel to the longitudinal axis of the control levers, thereby achieving the simplification of a link mechanism between these control shafts and the control levers.

The first control shaft 415a and the second control shaft 415b are more preferably located at substantially the same position with respect to the vehicle longitudinal direction, as illustrated in FIG. 34. The thus arranged first and second control shafts 415a and 415b can be aligned with the control levers in the vehicle width direction, thereby achieving a more simplified structure of the link mechanism.

The pump unit 400 further includes a common center section 430 that supports the first and second hydraulic pumps 410a and 410b, and a power transmission mechanism 440 that is accommodated within the housing 420 to operatively connect the first and second hydraulic pump shafts 411a and 411b together.

The pump unit 400 with the power transmission mechanism 440 permits the simultaneous rotation of both pump shafts 411a and 411b only by connecting the power source to either one of the first and second pump shafts 411a and 411b, or to the first pump shaft 411a in this embodiment, thereby achieving the simplified structure for the power transmission from the power source to the pump unit 400. In this embodiment, the power transmission mechanism 440 is in the form of a gear transmission device that includes a first gear 440a non-rotatably supported on the lower side of the first pump shaft 411a, and a second gear 440b non-rotatably supported on the lower side of the second pump shaft 411b in meshed engagement with the first gear 440a. Instead of the gear transmission device, any conventional power transmission mechanisms such as chain and belt may be used.

The housing 420, as illustrated in FIGS. 34 and 35, includes a first housing 421 for accommodating the first and second hydraulic pumps 410a and 410b, and a second housing 422 for accommodating the power transmission mechanism 440.

The first housing 421 has a box shape with a first sidewall 421a disposed in the upper or lower side of the pump shafts 411a and 411b along the longitudinal direction thereof, or in this embodiment in the lower side of the pump shafts 411a and 411b, which will be hereinafter referred to simply as the lower side, and a peripheral wall 421b extending from a peripheral edge of the first sidewall 421a to the opposite side of the pump shafts 411a and 411b along the longitudinal direction thereof (i.e., the upper side of the pump shafts 411a and 411b in this embodiment, which will be referred to simply as the upper side). The first sidewall 421a forms bearing holes through which the first and second pump shafts 411a and 411b respectively extend. The upper side of the first housing 421 has an end surface forming an opening through which the first and second hydraulic pumps 410a and 410b can be placed into the first housing 421. The opening of the first housing 421 is sealed by the center section 430 in a liquid tight manner. That is, the center section 430 of this embodiment constitutes a part of the first housing 421. The first and second control shafts 415a and 415b extend away from one another in the vehicle width direction to respectively have outer ends protruding from the peripheral wall 421b of the first housing 421.

The second housing 422 is disposed in the lower side, and has a box shape with a lower sidewall 422a forming a bearing hole through which the lower end of the first pump shaft 411a extends and a bearing portion for receiving the lower end of the second pump shaft 411b, and a peripheral wall 422b extending upwardly from a peripheral edge of the lower sidewall 422a. The upper side of the second housing 422 forms an opening through which the power transmission mechanism 440 can be placed into the second housing 422.

The second housing 422 is connected to the first housing 421 in such a manner as to have the opening sealed in a liquid tight manner by the first sidewall 421a of the first housing 421, and form an accommodation space of the power transmission mechanism 440 in cooperation with the first sidewall 421a of the first housing 421.

In the thus arranged housing 420, the first sidewall 421a of the first housing 421 serves as a partition wall dividing the accommodation space of the housing into a hydraulic pump accommodation chamber and a power transmission mechanism accommodation chamber. The partition wall thus defining the hydraulic pump accommodation chamber and the power transmission mechanism accommodation chamber can effectively prevent any foreign matters such as iron powder generated in the power transmission mechanism 440 from intruding into the hydraulic pump accommodation chamber, and hence damaging piston units 412a, 412b, cylinder blocks 413a, 413b, and/or other parts. In addition to this foreign matters prevention measure, the first and second pump shafts 411a and 411b, which extend through the partition wall 421a, may have circumferential peripheries with seal rings thereon to more securely prevent the intrusion of the foreign matters.

Portions of the housing 420, through which the respective shafts 411a, 415a and 415b extend, are sealed by any suitable sealing means in a liquid tight manner, thereby allowing the housing 420 to serve as the hydraulic fluid tank.

The first sidewall 421a serving as the partition wall preferably forms a hydraulic fluid communication hole 423a for communication between the hydraulic pump accommodation chamber and the power transmission mechanism accommodation chamber with a filter 423b provided in the hole for preventing the intrusion of the foreign matters into the hydraulic pump accommodation chamber. The thus formed hydraulic fluid communication hole 423a can omit the necessity of separately feeding the lubricant to the power transmission mechanism 440, with the result that the power transmission mechanism 440 can be lubricated with the hydraulic fluid stored within the housing. This permits low manufacturing cost and ease of maintenance.

In this embodiment, the first and second angularly adjustable swash plates 414a and 414b are of a cradle type, as illustrated in FIG. 34. Therefore, when the partition wall 421a forms, on its side facing the hydraulic pumps 410a, 410b, spherical concave surfaces 424 respectively adapted to spherical convex surfaces 419 formed in the rear sides of the swash plates 414a and 414b, which rear sides being opposite to the surfaces facing the piston units 412a and 412b, the spherical concave surfaces 424 can slidingly guide the spherical convex surfaces 419 of the swash plates 414a and 414b. The swash plates thus can securely rest on the spherical concave surfaces 424. Although FIG. 34 illustrates only the portion of the partition wall 421a corresponding to the first angularly adjustable swash plate 414a, it is a matter of course that the portion of the partition wall 421a corresponding to the second angularly adjustable swash plate 414b forms the spherical concave surface 424.

In this embodiment, the first sidewall 421a of the first housing 421 serves as the partition wall. Alternatively, a partitioning means may take various forms, as long as it can produce the same effect as described above. For example, a separately prepared partition wall may be mounted in a housing having a simple cylindrical box shape (see FIG. 14).

Figure 37:
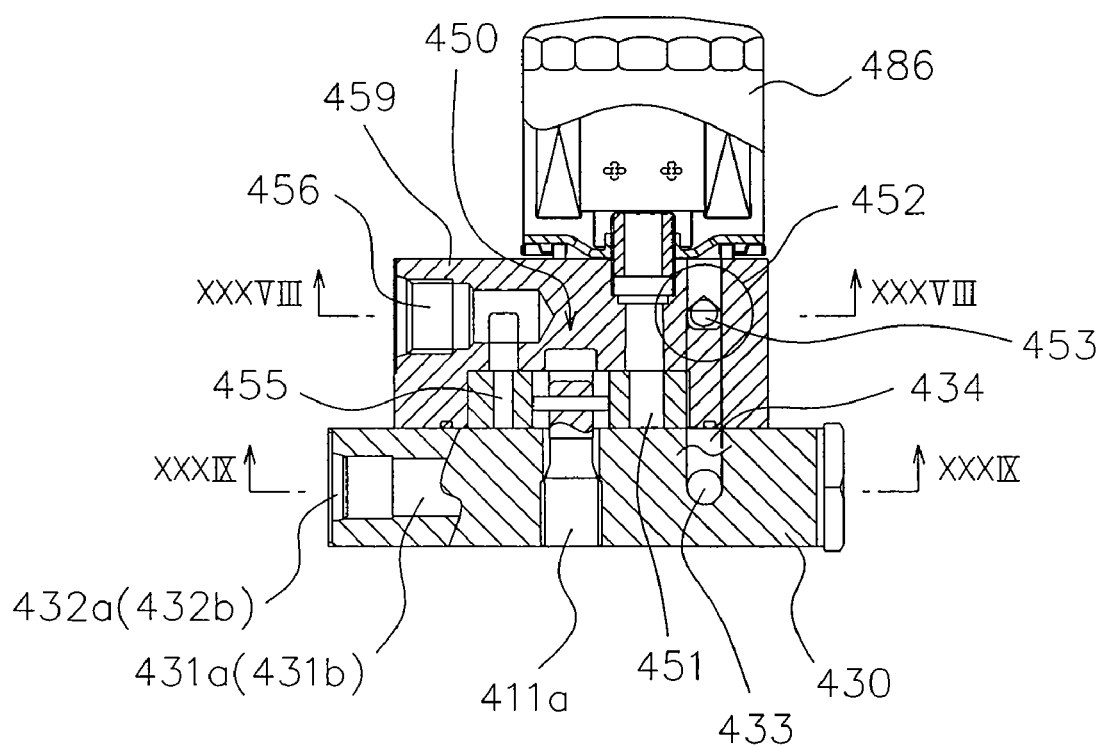
FIG. 37 is an enlarged view of a portion XXXVII in FIG. 34.
Figure 38:
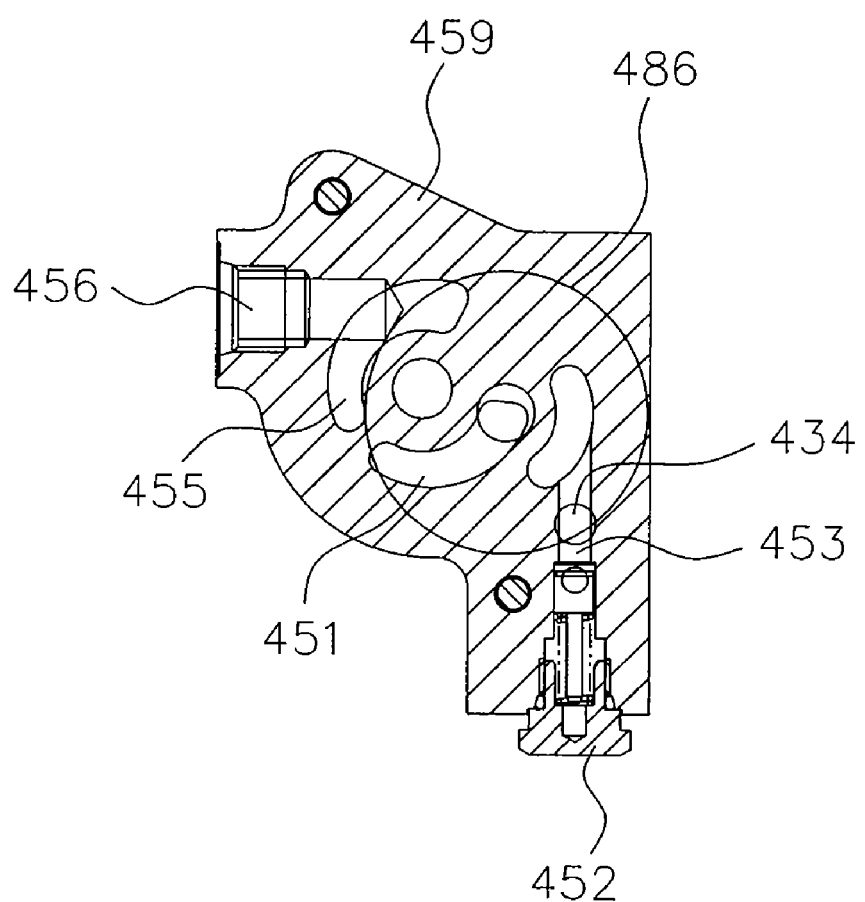
FIG. 38 is a cross section taken along line XXXVIII-XXXVIII in FIG. 37.
Figure 39:
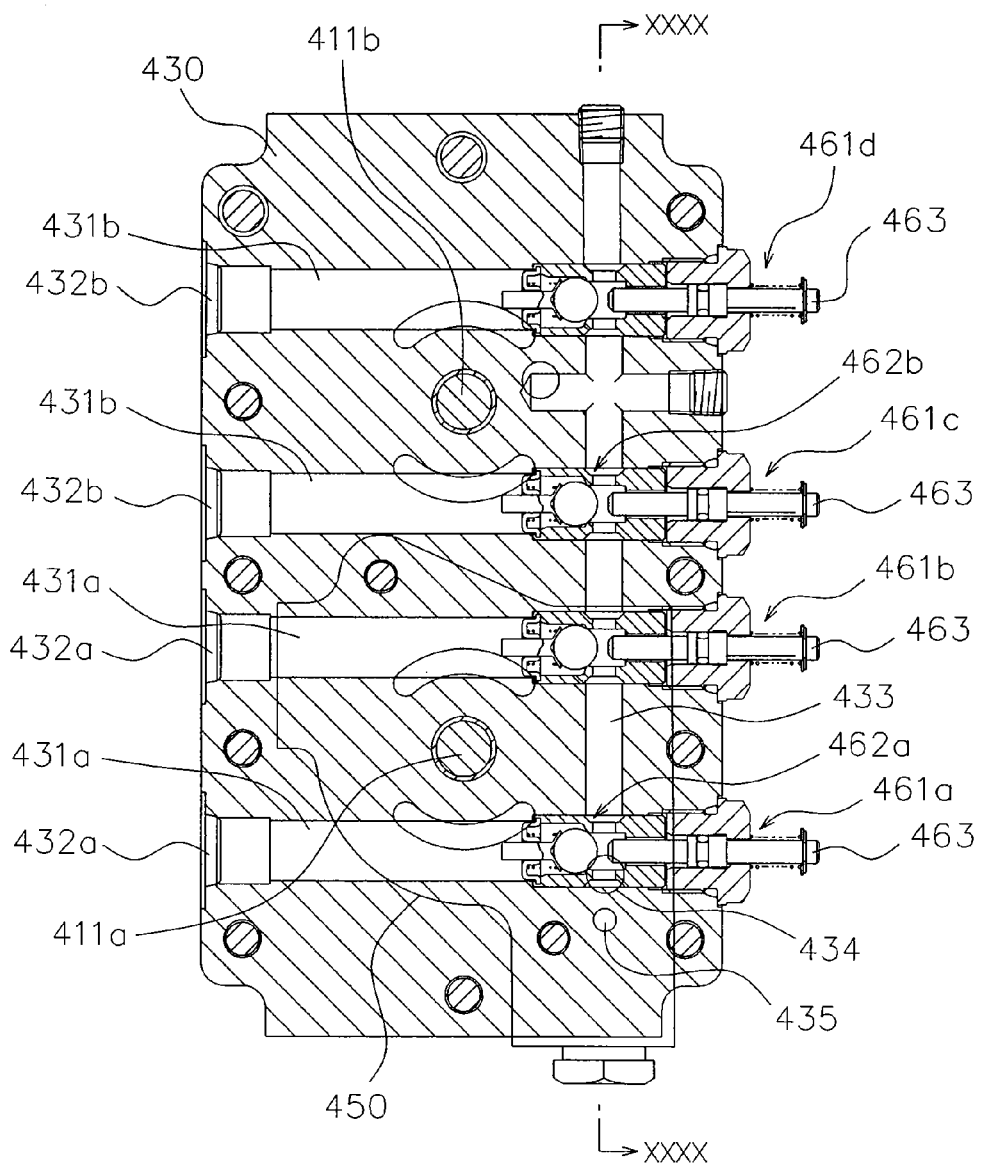
FIG. 39 is a cross section taken along line XXXIX-XXXIX in FIG. 37.
Figure 40:
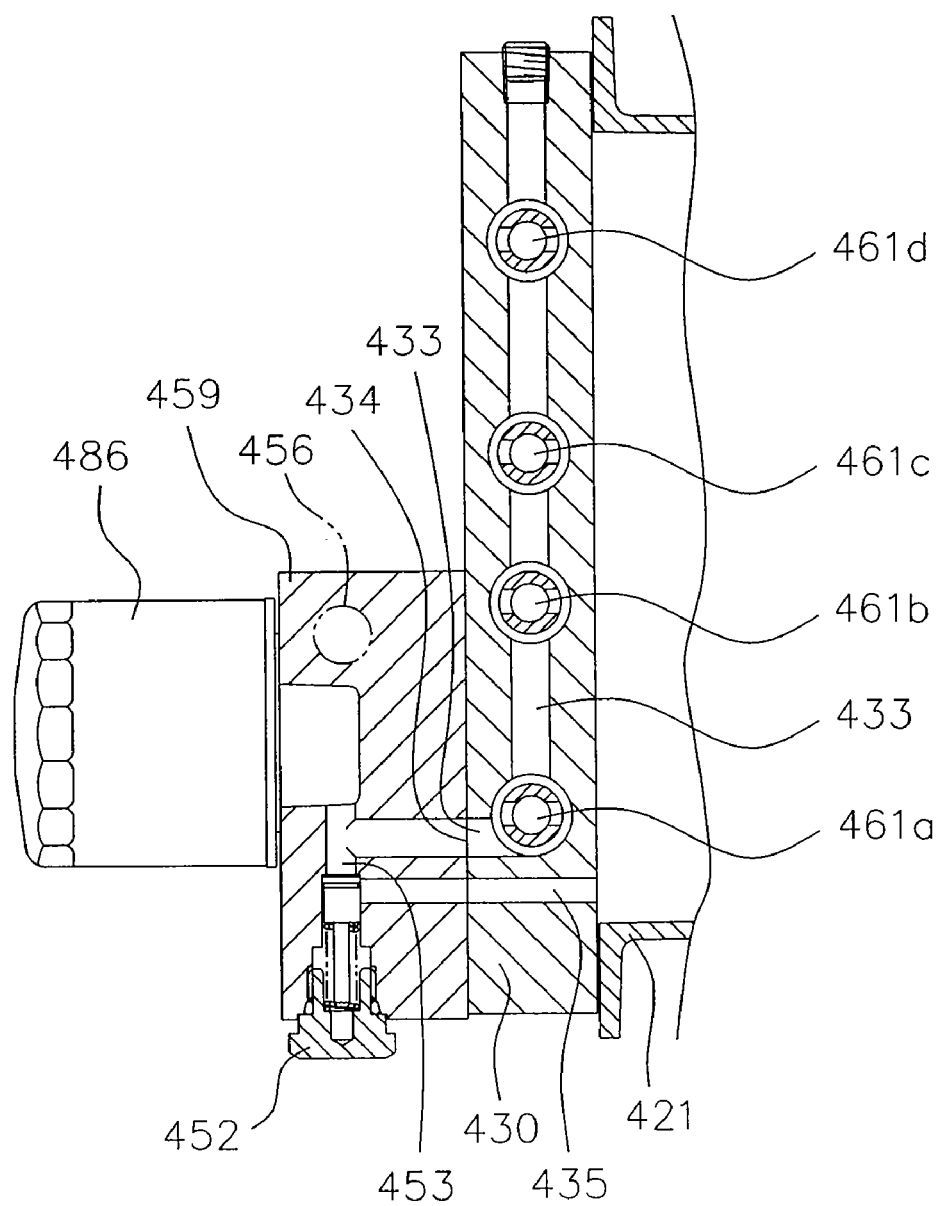
FIG. 40 is a cross section taken along line XXXX-XXXX in FIG. 39.

Now, the description will be made for the center section 430. FIG. 37 is an enlarged view of a portion XXXVII in FIG. 34. FIGS. 38 and 39 are respectively cross sections taken along lines XXXVIII-XXXVIII, and XXXIX-XXXIX in FIG. 37. FIG. 40 is a cross section taken along lines XXXX-XXXX in FIG. 39.

As best illustrated in FIG. 39, the center section 430 forms a first pair of hydraulic passages 431a respectively having first ends communicating with the first piston unit and second ends opening to the outside of the center section 430 to form a first pair of inlet/outlet ports 432a serving as connection ports for connection with the first pair of hydraulic lines 484a (see FIG. 33).

The center section 430 also forms a second pair of hydraulic passages 431b having first ends communicating with the second piston unit and second ends opening to the outside of the center section 430 to form a second pair of inlet/outlet ports 432b serving as connection ports for connection with the second pair of hydraulic lines 484b (see FIG. 33).

As described above, the common center section 430 thus forms all the first and second pairs of inlet/outlet ports 432a and 432b serving as the connection ports for connection with the first and second pairs of hydraulic lines 484a and 484b. Whereby, the piping work between the hydraulic pumps 410a and 410b, and the hydraulic motors 482a and 482b can be facilitated. The first and second pairs of inlet/outlet ports 432a and 432b are more preferably formed in the same side of the center section 430, as illustrated in FIGS. 39 and 40, thereby further facilitating the piping work.

The center section 430, as illustrated in FIGS. 37 to 40, also forms a common charging passage 433 having a first end opening to the outside of the center section 430 to form an inlet port for charging 434 serving as an inlet for the hydraulic fluid to be replenished, and a second end communicating with the first pair of hydraulic passages 431a and the second pair of hydraulic passages 431b via check valves 461a, 461b, 461c and 461d.

In this embodiment, the first pump shaft 411a, as best illustrated in FIGS. 34 and 37, has an extension extending upwards from the upper end thereof to be located above the center section 430, thereby supporting a charge pump 450 via the extension. The charge pump 450 has an upper surface with a cartridge filter 486 detachably mounted thereto, through which the pressurized hydraulic fluid is fed from an outlet port 451 of the charge pump 450 to the inlet port for charging 434.

The cartridge filter 486 can be provided at the suction side of the charge pump 450.

The charging passage 433 is connected via a relief valve 452 to a pressure relief line 453 communicating with the housing. The relief valve 452 regulates the hydraulic pressure of the charging passage 433 (see FIGS. 33 and 40).

In this embodiment, the pressure relief line 453 is formed in a charge pump casing 459 mounted on the upper surface of the center section 430 to be communicated with the first housing 421 via a drain port 435 formed in the center section 430. However, the present invention is not necessarily limited to this arrangement. That is, the pressure relief line 453 can be formed in the center section 430.

Reference codes 455, and 456 in FIGS. 34, 35 and 38 respectively represent an inlet port of the charge pump, and an inlet port communicating with the inlet port 455 of the charge pump.

As described above, the charging passage 433 has the second end communicating with the first pair of hydraulic passages 431a and the second pair of hydraulic passages 431b via the check valves 461a, 461b, 461c and 461d so as to allow the pressurized hydraulic fluid to be fed from the common charging passage 433 into a lower pressure line of the first pair of hydraulic lines 484a and a lower pressure line of the second pairs of hydraulic lines 484b, while preventing the pressurized hydraulic fluid from flowing in the reverse direction.

Further, bypass lines 462a and 462b having throttle valves are formed between at least one of the first pair of hydraulic passages 431a and the charging passage 433, and between at least one of the second pair of hydraulic passages 431b and the charging passage 433 (see FIGS. 33 and 39).

The bypass lines 462a and 462b are designed to assure the neutralization of the hydraulic pumps 410a and 410b. Specifically, even if the swash plates 414a and 414b of the hydraulic pumps 410a and 410b tilt from the neutral positions by a small angle, there occurs the pressure difference between the first pair of hydraulic lines 484a, and/or between the second pair of hydraulic lines 484b. This pressure difference causes the rotation of the hydraulic motors 482a and 482b. That is, even a slight amount of the displacement between the actual neutral positions and the predetermined design positions of the swash plates 414a and 414b due to assembling errors or the like causes an unintentional rotation of the hydraulic motors 482a and 482b. On the contrary, the bypass lines 462a and 462b, as described above, allow the pressurized hydraulic fluid to leak therethrough from the first pair of hydraulic lines 484a and the second pair of hydraulic lines 484b. Thus, the pressure difference between the pair of first hydraulic lines 484a and/or between the second pair of hydraulic lines 484b can effectively be limited, thereby effectively avoiding the unintentional rotation of the hydraulic motors 482a and 482b, even for the swash plates 414a and 414b having the actual neutral position displaced from the design neutral position due to the assembling errors or the like.

In view of transmission efficiency between the hydraulic pumps 410a, 410b and the hydraulic motors 482a, 482b, the leakage of the pressurized hydraulic fluid from the first and second pairs of hydraulic lines 484a, 484b through the bypass lines 462a, 462b is not preferable. Therefore, the bypass lines 462a, 462b are preferably provided in portions from the charging passage 433 to one of the first pair of hydraulic passages 431a, and to one of the second pair of hydraulic passages 431b.

The check valves 461a, 461b, 461c and 461d are more preferably provided with release means 462 to forcibly bring the first pair of hydraulic passages 431a into communication with one another, and the second pair of hydraulic passages 431b into communication with one another, if an emergency arises, as illustrated in FIG. 36. The release means 462 are designed to easily move the vehicle, when the vehicle must forcibly be moved or the vehicle wheels must forcibly be rotated by man power or the like due to the disorder of the power source 480, the hydraulic pumps 410a, 410b or the like. Specifically, when the vehicle wheels connected to the hydraulic motors 482a and 482b are forcibly rotated with the first pair of hydraulic lines 484a and/or the second pair of hydraulic lines 484b lying in the closing state, there occurs the pressure difference between the first pair of hydraulic lines 484a, and between the second pair of hydraulic lines 484b. As a result, the vehicle is hardly moved, or the vehicle wheels are hardly rotated. On the contrary, the release means can easily achieve the communications between the first pair of hydraulic passages 431a, and between the second pair of hydraulic passages 431b by mechanically releasing all the check valves 461a to 461d. Whereby, the vehicle can easily be moved by man power or the like.

As illustrated in FIG. 39, all the release means 463 are preferably disposed in the same side of the center section 430, so that the link mechanism linking these release means 463 for operation of the same can have a simplified structure.

As described above, the pump unit 400 of this embodiment includes the first and second hydraulic pumps 410a and 410b, the center section 430 and the housing 420, all of which are integrally connected together to constitute a single unit 400a. Accordingly, both first and second hydraulic pumps 410a and 410b can be installed on the vehicle only by mounting the single unit 400a on the vehicle, thereby achieving an improved efficiency in assembling the vehicle.

The pump unit 400 of this embodiment also includes a reservoir tank 485 supportingly connected to the single unit 400a, as illustrated in FIGS. 34 to 36. The reservoir tank 485 is designed to reserve the hydraulic fluid to be replenished to the first pair of hydraulic passages 431a and the second pair of hydraulic passages 431b. In this embodiment, the reservoir tank 485 has right and left sides respectively forming mounting ribs 485a, through which the reservoir tank 485 is connected to the single unit 400a.

The above arrangement where the reservoir tank 485 is supportingly connected to the single unit 400a can omit external conduits for feeding the hydraulic fluid from the reservoir tank 485 to the charge pump 450, and external conduits for returning the hydraulic fluid from the single unit 400a to the reservoir tank 485, thereby achieving ease of assembly, lower manufacturing cost, improved efficiency in replenishing the hydraulic fluid through the decrease of the resistance force between the hydraulic fluid and the conduit wall, and producing other desirable effects.

The reservoir tank 485 preferably communicates with the housing 420 via a hydraulic fluid communication passage 487 such as a pipe, as illustrated in FIGS. 34 and 35. This hydraulic communication allows both reservoir tank 485 and housing 420 to be used as a hydraulic fluid tank, and hence the reservoir tank itself to have a reduced size. In this arrangement, the reservoir tank is preferably located so that the upper level of the hydraulic fluid within the reservoir tank can be higher than the upper end of the housing. This arrangement produces an additional desirable effect, and more specifically allows the complete filling of the hydraulic fluid within the housing 420, thereby effectively avoiding the air entrained in the hydraulic fluid. In addition, variation in volume of the hydraulic fluid within the housing 420 due to variation in temperature of this hydraulic fluid can be properly compensated by the reservoir tank 485 communicating with the housing.

The reservoir tank 485 can be connected to the inlet port for charging 434 via a hydraulic fluid replenishing passage 488 such as a pipe. According to the pump unit of this embodiment, which includes the charge pump 450 serving as the hydraulic fluid feeding means, as described above, the reservoir tank 485 communicates, via the hydraulic fluid replenishing passage 488, with the inlet port 456 communicating with the inlet port 455 of the charge pump 450, and the outlet port 451 of the charge pump 450 communicates with the inlet port for charging 434 via the cartridge filter 486 (see FIGS. 34 and 37).

The communications between the reservoir tank 485 and the inlet port 434 via the hydraulic fluid replenishing passage 488, and between the reservoir tank 485 and the housing 420 via the hydraulic fluid communication passage 487 can reduce the number of the conduits required respectively between the first and second hydraulic pumps, and the first and second hydraulic motors to substantially four conduits only, specifically the first pair of hydraulic lines 484a and the second pair of hydraulic lines 484b. Thus, as compared with the conventional arrangements as disclosed in the above cited U.S. Pat. No. 4,920,733, the pump unit of this embodiment can achieve a lower manufacturing cost, an improved assembling efficiency and an excellent workability in maintenance.

The pump unit 400 more preferably includes a cooling fan 481 disposed near the single unit 400a and the reservoir tank 485 and operatively driven by the power source 480. According to this arrangement with the cooling fan 481, the reservoir tank 485 is connected to the single unit 400a in such a manner as to form between the reservoir tank 485 and the single unit 400a a clearance 489 into which a cooling air stream is drawn from the cooling fan 481. The hydraulic fluid replenishing passage 488 and/or the hydraulic fluid communication passage 487 traverses the clearance 489. In this arrangement, the hydraulic fluid replenishing passage 488 and the hydraulic fluid communication passage 487 each may have the right and left sides surrounded by a cooling air duct or shroud to effectively guide the cooling air stream from the cooling fan to the clearance 489.

The thus arranged pump unit 400 can limit the increase in temperature of the hydraulic fluid stored in the reservoir tank 485 and the housing 420, and also effectively limit the increase in temperature of the hydraulic fluid flowing through the hydraulic fluid replenishing passage 488 and the hydraulic fluid communication passage 487. Thus, the transmission efficiency between the hydraulic pumps and the hydraulic motors can be improved.

The hydraulic fluid replenishing passage and the hydraulic fluid communication passage each more preferably has an outer circumference provided with fins (not shown) to obtain an enlarged heat radiating area, and hence an improved cooling efficiency. The fins can also be provided on the reservoir tank 485 itself.

Preferably, the reservoir tank 485 is made of a semitransparent resin material to afford a visual observation of the level of the hydraulic fluid from the outside of the tank. The reservoir tank 485 can also include a tank cap 485b with an air release mechanism on the top of the tank.

In this embodiment, the charge pump 450 is provided to forcibly feed the pressurized hydraulic fluid to the inlet port for charging 434. Alternative to this arrangement with the charge pump 450, the inlet port for charging 434 may be directly connected to the reservoir tank 485 via the hydraulic fluid replenishing passage 488, thereby allowing the hydraulic fluid to spontaneously flow into the inlet port 434 when the pressure in a lower pressure line of the first pair of hydraulic lines 484a and/or the pressure in a lower pressure line of the second pair of hydraulic lines 484b drops from a predetermined value.

Eighth Embodiment

Figure 41:
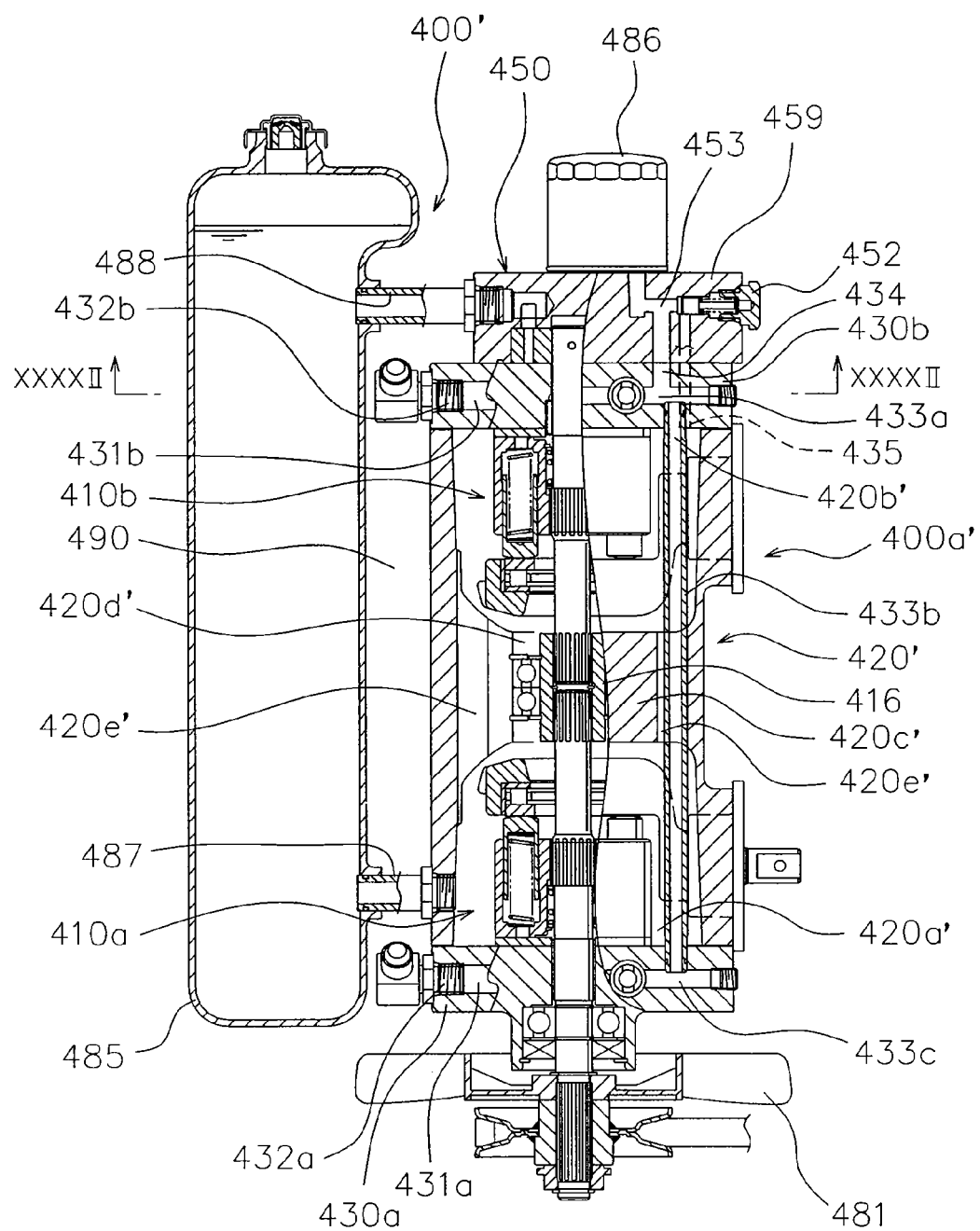
FIG. 41 is a longitudinal cross-sectional side view of a pump unit according to an eighth embodiment of the present invention.
Figure 42:
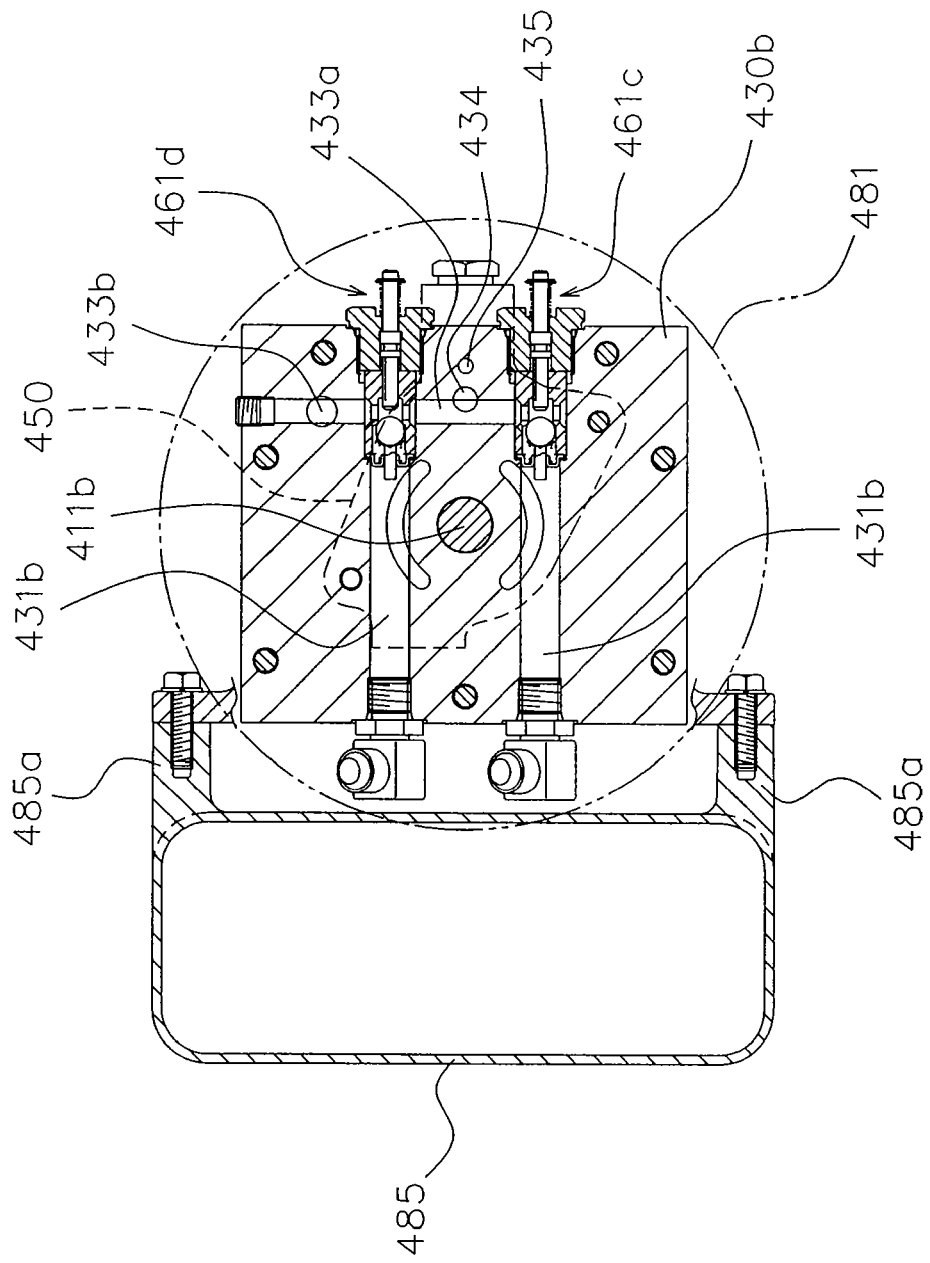
FIG. 42 is a cross section taken along line XXXXII-XXXXII in FIG. 41.

A pump unit according to an eighth embodiment of the present invention will be hereinafter described with reference to FIGS. 41 and 42. FIG. 41 is a longitudinal cross-sectional side view of the pump unit 400', and FIG. 42 is a cross section taken along lines XXXXII-XXXXII in FIG. 41.

As illustrated in FIG. 41, the pump unit 400' of this embodiment is a tandem pump unit with the first hydraulic pump 410a connected in series with the second hydraulic pump 410b. In the following description, corresponding or identical parts to those of the seventh embodiment have been given the same reference characters or those with primes (') to omit a detailed description thereof.

As illustrated in FIG. 41, the pump unit 400' includes the common housing 420' for accommodating the first hydraulic pump 410a and the second hydraulic pump 410b, and the first center section 430a and the second center section 430b respectively supporting the first hydraulic pump 410a and the second hydraulic pump 410b.

The common housing 420' has the first end (the lower end in this embodiment), and the second end (the upper end in this embodiment) along the axial direction thereof respectively defining the first opening 420a' for receiving the first hydraulic pump 410a and the second opening 420b' for receiving the second hydraulic pump 410b.

The common housing 420' also forms the partition wall 420c' at substantially the center in the direction of the pump shaft to divide the common housing into the first pump accommodation chamber and the second pump accommodation chamber. The partition wall 420c' includes a bearing portion for supporting the connection portion between the first pump shaft 411a and the second pump shaft 411b. Specifically, the partition wall 420c' includes a connection member 416 non-rotatably fixed around the downstream end or the upper end of the first pump shaft 411a and the upstream end or the lower end of the second pump shaft 411b, and rotatably supported in the bearing hole 420d' formed in the partition wall. The partition wall 420c' may form a plurality of hydraulic fluid communication passages 420e' for communication between the first pump accommodation chamber and the second pump accommodation chamber. These communication passages enable the entire housing to be used as the hydraulic fluid tank.

The first center section 430a supports on the upper surface thereof the first hydraulic pump 410a, and is connected to the housing 420' in such a manner as to seal the first opening 420a' of the housing. The first pump shaft 411a of the first hydraulic pump 410a has the upstream end or the lower end extending downwardly through the first center section 430a to form a lower extension through which the power is inputted to drive the hydraulic pump units and the cooling fan 481.

On the other hand, the second center section 430b supports on the lower surface thereof the second hydraulic pump 410b, and is connected to the housing 420' in such a manner as to seal the second opening 420b' of the housing 420'. The second pump shaft 411b of the second hydraulic pump 410b has the downstream end or the upper end extending upwardly through the second center section 430b to form an upper extension through which the charge pump 450 is driven.

The first center section 430a, as illustrated in FIGS. 33 and 41, forms a first pair of hydraulic passages 431a for the first hydraulic pump, respectively having first ends opening to the outside of the first center section through the surface facing the first piston unit 412a (the upper surface) to respectively communicate with the inlet/outlet ports of the first piston unit, and second ends opening to the outside of the first center section. The second ends of the first pair of hydraulic passages 431a opening to the outside forms a first pair of inlet/outlet ports 432a respectively serving as connection ports for connection with the first pair of hydraulic lines 484a extending to the first hydraulic motor 482a.

Similarly, the second center section 430b, as illustrated in FIGS. 33, 41 and 41, forms a second pair of hydraulic passages 431b for the second hydraulic pump, respectively having first ends opening to the outside of the second center section through the surface facing the second piston unit 412b to respectively communicate with the inlet/outlet ports of the second piston unit, and second ends opening to the outside of the second center section. The second ends of the second pair of hydraulic passages 431b opening to the outside forms a second pair of inlet/outlet ports 432b respectively serving as connection ports for connection with the second pair of hydraulic lines 484b extending to the second hydraulic motor 482b.

Similarly to the seventh embodiment, the pump unit 400' of this embodiment includes the common charging passage 433 disposed therein, having a first end opening to the outside of the pump unit to form the inlet port for charging 434, and the second end communicating with the first and second pairs of hydraulic passages.

The common charging passage 433, as illustrated in FIGS. 41 and 42, includes a first bore portion 433a, a conduit portion 433b and a second bore portion 433c. The first bore portion 433a is formed in the second center section 430b to have a first end opening to the outside of the second center section through the upper surface thereof to form the inlet port for charging 434 and a second end communicating with the second pair of hydraulic passages 431b via the check valves 461c and 461d and opening to the second pump accommodation chamber. The conduit portion 433b is disposed to have a first end connected to the second end of the first bore portion 433a and a second end extending through the second pump accommodation chamber, the partition wall 420c and the first pump accommodation chamber to the first center section 430a. The second bore portion 433c is formed in the first center section 430a to have a first end connected to the second end of the conduit portion 433b and a second end communicating with the first pair of hydraulic passages 431a via the check valves 461a and 461b. The conduit portion 433b can be extended through the partition wall 420c' by disposing the conduit portion 433b within one of the plurality of hydraulic fluid communication passages 420e'.

Connected to the common charging passage 433 is a pressure relief line 453 communicating with the housing via a relief valve 452. The pressure relief line 453, similarly to the seventh embodiment, is formed in the charge pump casing 459 to communicate with the housing 420' via the drain port 435 formed in the second center section 430b.

The thus arranged pump unit 400' of this embodiment also produces the same effects as those of the seventh embodiment.

Alternative to the conduit portion 433b', it is possible to form in the peripheral wall of the common housing 420a communication hole having a first end connected to the second end of the first bore portion 433a' and a second end connected to the first end of the second bore portion 433c'.

Ninth Embodiment

Figure 43:
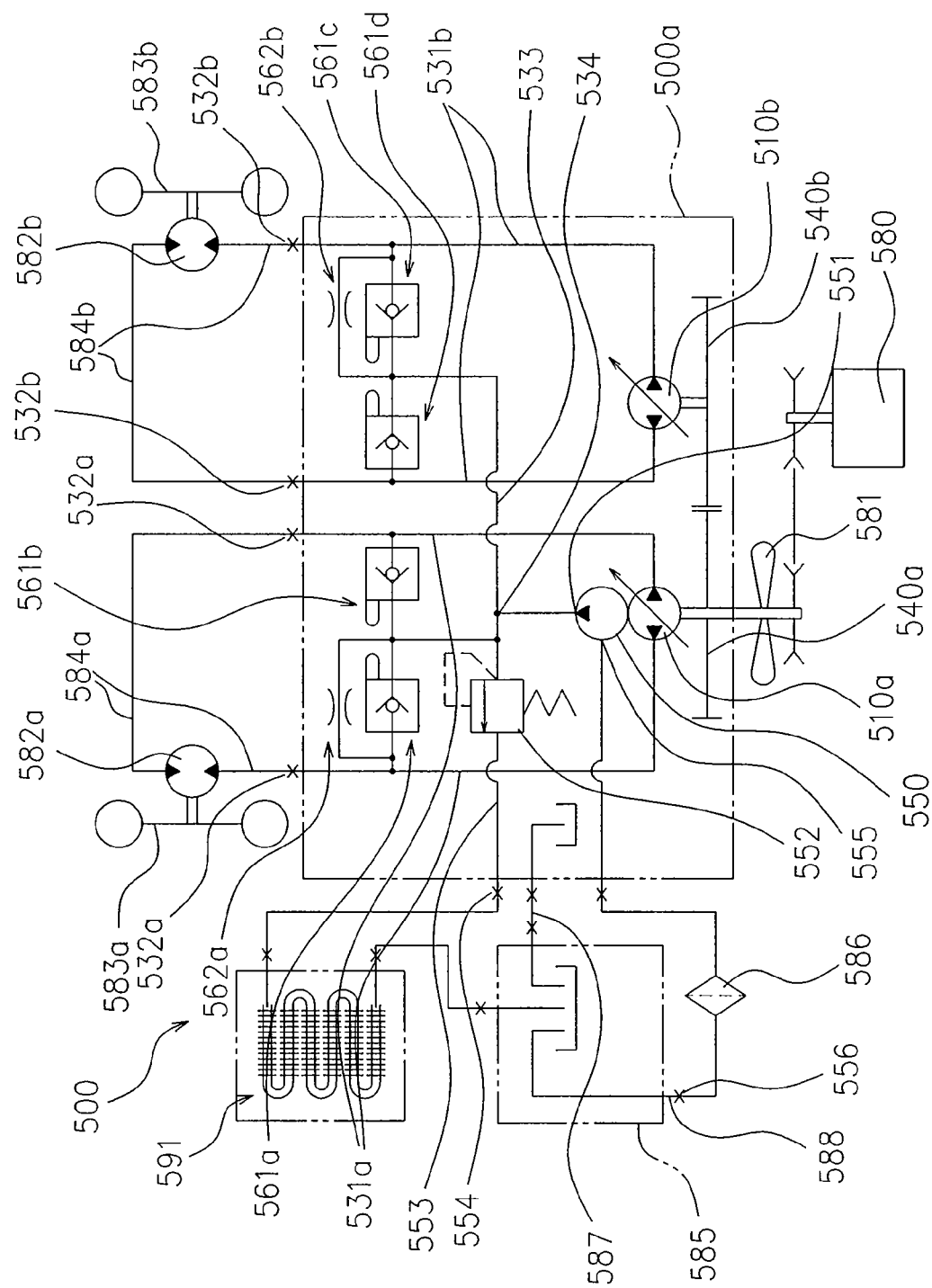
FIG. 43 is a hydraulic circuit diagram of the vehicle to which a pump unit according to a ninth embodiment of the present invention is applied.
Figure 44:
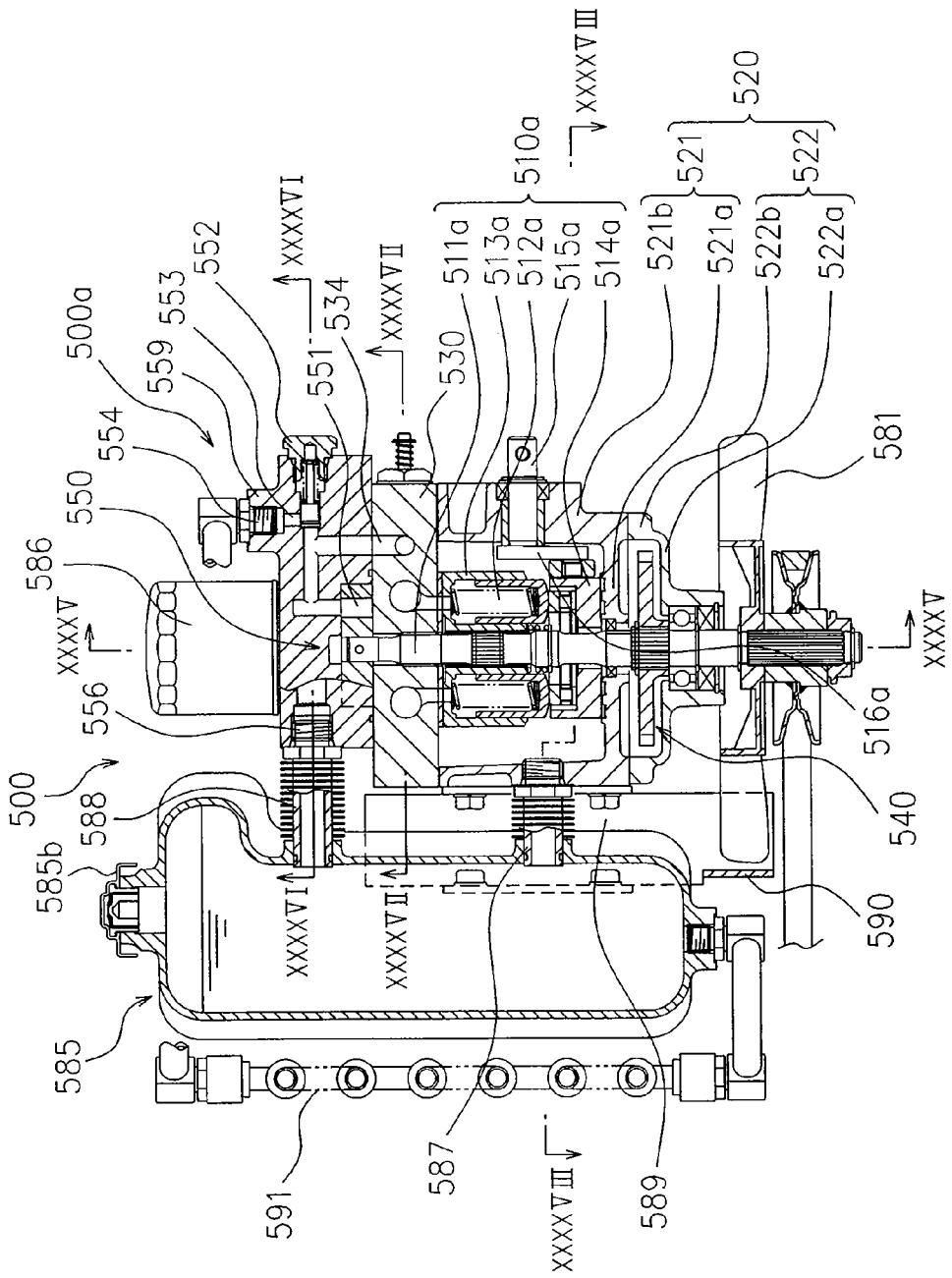
FIG. 44 is a longitudinal cross-sectional side view of the pump unit illustrated in FIG. 43.

A pump unit according to a ninth embodiment of the present invention will be hereinafter described with reference to the accompanying drawings. FIG. 43 is a hydraulic circuit diagram of the vehicle to which a pump unit 500 of this embodiment is applied. FIG. 44 is a longitudinal cross-sectional side view of the pump unit and its periphery. FIGS. 45 to 48 are respectively cross sections taken along lines XXXXV-XXXXV, XXXXVI-XXXXVI, XXXXVII-XXXXVII, and XXXXVIII-XXXXVIII.

Figure 45:
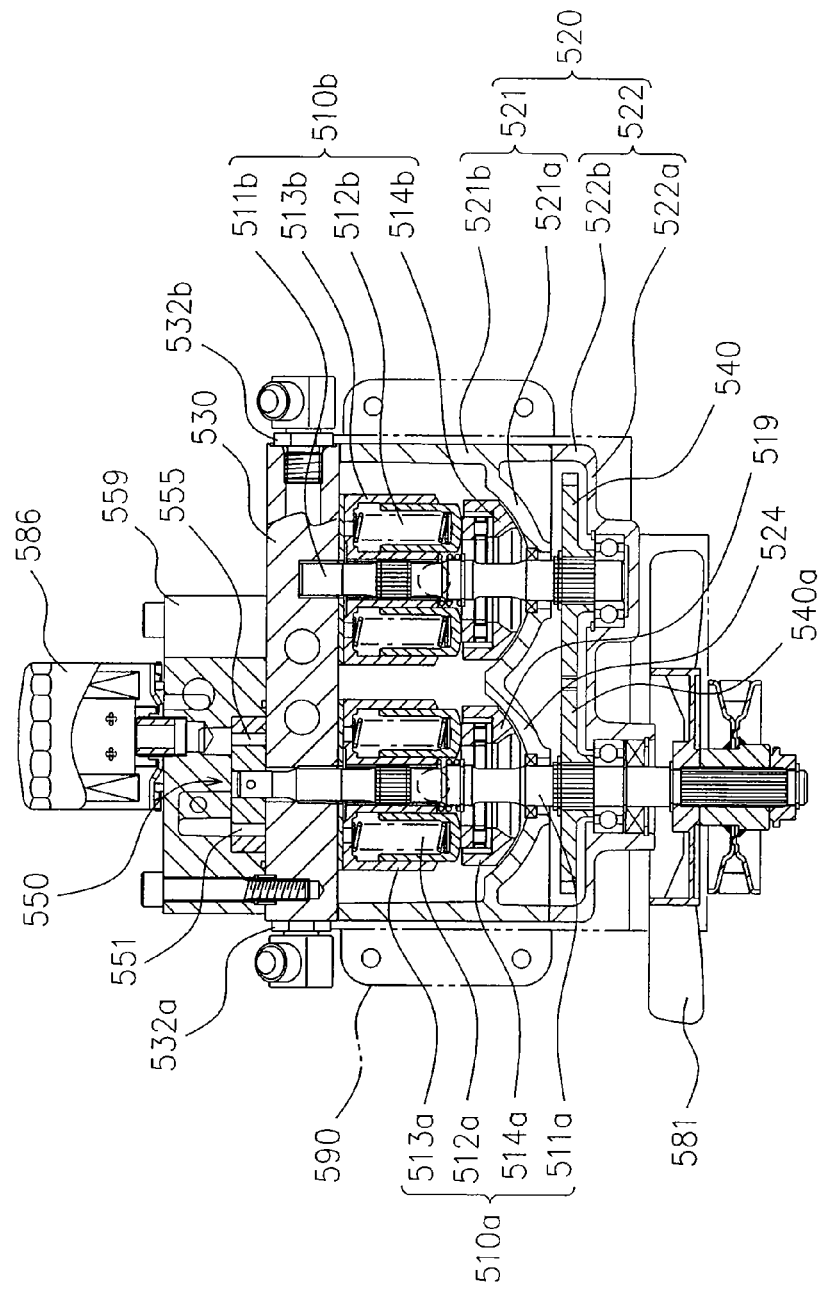
FIG. 45 is a cross section taken along line XXXXV-XXXXV in FIG. 44.

As illustrated in FIGS. 43 to 45, the pump unit 500 is adapted to be used in a vehicle having right and left drive wheels 583a and 583b to which first and second hydraulic motors 582a and 582b are respectively connected, and includes a first hydraulic pump 510a and a second hydraulic pump 510b respectively connected to the first and second hydraulic motors 582a and 582b via a first pair of hydraulic lines 584a and a second pair of hydraulic lines 584b, and a common housing 520 for accommodating these hydraulic pumps 510a and 510b.

The connection form between the right and left drive wheels 583a and 583b, and the first and second hydraulic motors 582a and 582b meant in this embodiment includes the direct connection of the drive wheels respectively to those hydraulic motors, and also an operative connection of the drive wheels respectively to the hydraulic motors via a suitable power transmission mechanism. In FIG. 43, the reference codes 580, 581 and 586 respectively represent a power source, a cooling fan and a filter.

As illustrated in FIGS. 44 to 45, the first hydraulic pump 510a and the second hydraulic pump 510b are axial piston pumps of a variable displacement type, and respectively include a first pump shaft 511a and a second pump shaft 511b that have vertical axes and are disposed parallel to one another in the vehicle width direction within the housing 520, a first piston unit 512a and a second piston unit 512b that are reciprocatingly movable according to the rotation of the pump shafts, a first cylinder block 513a and a second cylinder block 513b that reciprocably support the piston units, a first angularly adjustable swash plate 514a and a second angularly adjustable swash plate 514b that regulate the stroke length of the piston units by varying their tilting angles to vary the input/output flow rates of the piston units, and a first control shaft 515a and a second control shaft 515b that control the tilting angles of these swash plates.

The pump unit of this embodiment is of a vertical type with the first and second pump shafts 511a and 511b having the vertical axes. However, the present invention is not necessarily limited to this arrangement. It is a matter of course that the pump unit 500 can be of a horizontal type with the first and second pump shafts 511a and 511b having the horizontal axes.

As best illustrated in FIG. 45, the first and second angularly adjustable swash plates 514a and 514b of this embodiment are of a cradle type.

Figure 48:
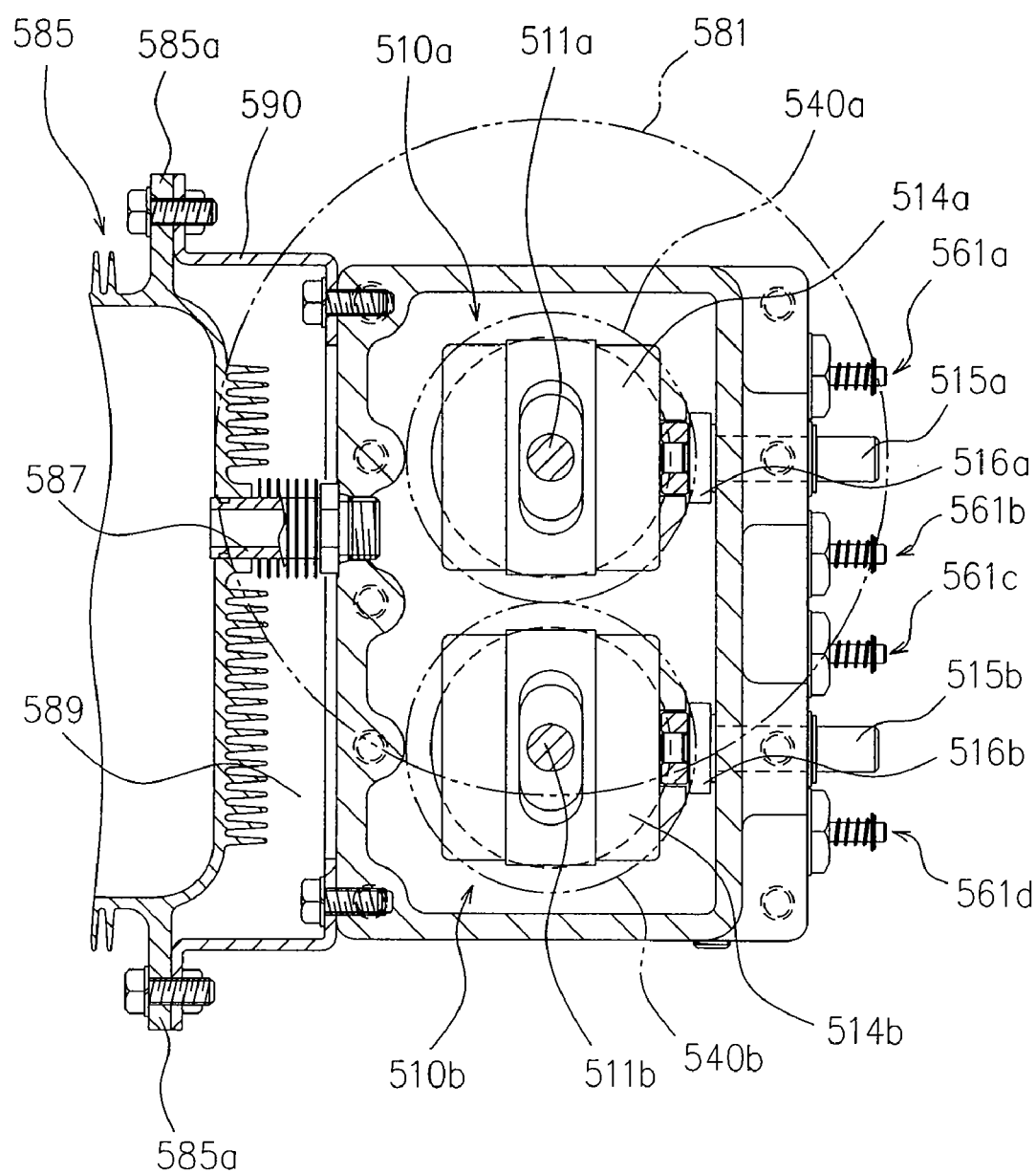
FIG. 48 is a cross section taken along line XXXXVIII-XXXXVIII in FIG. 44.

As illustrated in FIGS. 44 and 48, the first control shaft 515a and the second control shaft 515b respectively have inner ends extending into the housing 520 to be respectively connected to arms 516a and 516b and hence the first and second swash plates 514a and 514b, and outer ends extending rearwards in the vehicle longitudinal direction.

Alternative to the above arrangement, the first and second control shafts 515a and 515b may extend away from one another in the vehicle width direction to respectively have oppositely positioned outer ends. This arrangement is advantageous when installed on the vehicle having push-pull control levers 198a and 198b as illustrated in FIG. 1, since the first and second control shafts 515a and 515b can have the rotating shaft centers disposed parallel to the longitudinal axis of the control levers, thereby achieving the simplification of a link mechanism between these control shafts and the control levers.

In the above arrangement, the first control shaft 515a and the second control shaft 515b are more preferably located at substantially the same position with respect to the vehicle longitudinal direction. The thus arranged first and second control shafts 515a and 515b can be aligned with the control levers in the vehicle width direction, thereby achieving a more simplified structure of the link mechanism.

The pump unit 500 further includes a common center section 530 that supports the first and second hydraulic pumps 510a and 510b, and a power transmission mechanism 540 that is accommodated within the housing 520 to operatively connect the first and second hydraulic pump shafts 511a and 511b together.

The pump unit 500 with the power transmission mechanism 540 permits the simultaneous rotation of both pump shafts 511a and 511b only by connecting the power source to either one of the first and second pump shafts 511a and 511b, or to the first pump shaft 511a in this embodiment, thereby achieving the simplified structure for the power transmission from the power source to the pump unit 500. In this embodiment, the power transmission mechanism 540 is in the form of a gear transmission device that includes a first gear 540a non-rotatably supported on the lower side of the first pump shaft 511a, and a second gear 540b non-rotatably supported on the lower side of the second pump shaft 511b in meshed engagement with the first gear 540a (see FIGS. 45 and 46). Instead of the gear transmission device, any conventional power transmission mechanisms such as chain and belt may be used.

The housing 520, as illustrated in FIGS. 44 and 45, includes a first housing 521 for accommodating the first and second hydraulic pumps 510a and 510b, and a second housing 522 for accommodating the power transmission mechanism 540.

The first housing 521 has a box shape with a first sidewall 521a disposed in the upper or lower side of the pump shafts 511a and 511b along the longitudinal direction thereof, or in this embodiment in the lower side of the pump shafts 511a and 511b, which will be hereinafter referred to simply as the lower side, and a peripheral wall 521b extending from a peripheral edge of the first sidewall 521a to the opposite side of the pump shafts 511a and 511b along the longitudinal direction thereof (i.e., the upper side of the pump shafts 511a and 511b in this embodiment, which will be referred to simply as the upper side). The first sidewall 521a forms bearing holes through which the first and second pump shafts 511a and 511b respectively extend. The upper side of the first housing 521 has an end surface forming an opening through which the first and second hydraulic pumps 510a and 510b can be placed into the first housing 521. The opening of the first housing 521 is sealed by the center section 530 in a liquid tight manner. That is, the center section 530 of this embodiment constitutes a part of the first housing 521.

The second housing 522 is disposed in the lower side, and has a box shape with a lower sidewall 522a forming a bearing hole through which the lower end of the first pump shaft 511a extends and a bearing portion for receiving the lower end of the second pump shaft 511b, and a peripheral wall 522b extending upwardly from a peripheral edge of the lower sidewall 522a. The upper side of the second housing 522 forms an opening through which the power transmission mechanism 540 can be placed into the second housing 522.

The second housing 522 is connected to the first housing 521 in such a manner as to have the opening sealed in a liquid tight manner by the first sidewall 521a of the first housing 521, and form an accommodation space of the power transmission mechanism 540 in cooperation with the first sidewall 521a of the first housing 521.

In the thus arranged housing 520, the first sidewall 521a of the first housing 521 serves as a partition wall dividing the accommodation space of the housing into a hydraulic pump accommodation chamber and a power transmission mechanism accommodation chamber. The partition wall thus defining the hydraulic pump accommodation chamber and the power transmission mechanism accommodation chamber can effectively prevent any foreign matters such as iron powder generated in the power transmission mechanism 540 from intruding into the hydraulic pump accommodation chamber, and hence damaging piston units 512a, 512b, cylinder blocks 513a, 513b, and/or other parts. In addition to this foreign matter prevention measure, the first and second pump shafts 511a and 511b, which extend through the partition wall 521a, may have circumferential peripheries with seal rings thereon to more securely prevent the intrusion of the foreign matters.

Portions of the housing 520, through which the respective shafts 511a, 515a and 515b extend, are sealed by any suitable sealing means in a liquid tight manner, thereby allowing the housing 520 to serve as the hydraulic fluid tank.

The first sidewall 521a serving as the partition wall preferably forms a hydraulic fluid communication hole (not shown) for communication between the hydraulic pump accommodation chamber and the power transmission mechanism accommodation chamber, with a filter provided in the hole for preventing the intrusion of the foreign matters into the hydraulic pump accommodation chamber. The thus formed hydraulic fluid communication hole can omit the necessity of separately feeding the lubricant to the power transmission mechanism 540, with the result that the power transmission mechanism 540 can be lubricated with the hydraulic fluid stored within the housing. This permits low manufacturing cost and ease of maintenance.

In this embodiment, the first and second angularly adjustable swash plates 514a and 514b are of a cradle type, as illustrated in FIG. 45. Therefore, when the partition wall 521a forms, on its side facing the hydraulic pumps 510a, 510b, spherical concave surfaces 524 respectively adapted to spherical convex surfaces 519 formed in the rear sides of the swash plates 514a and 514b, which rear sides being opposite to the surfaces facing the piston units 512a and 512b, the spherical concave surfaces 524 can slidingly guide the spherical convex surfaces 519 of the swash plates 514a and 514b. The swash plates thus can securely rest on the spherical concave surfaces 524.

In this embodiment, the first sidewall 521a of the first housing 521 serves as the partition wall. Alternatively, a partitioning means may take various forms, as long as it can produce the same effect as described above. For example, a separately prepared partition wall may be mounted in a housing having a simple cylindrical box shape (see FIG. 14).

Figure 49:
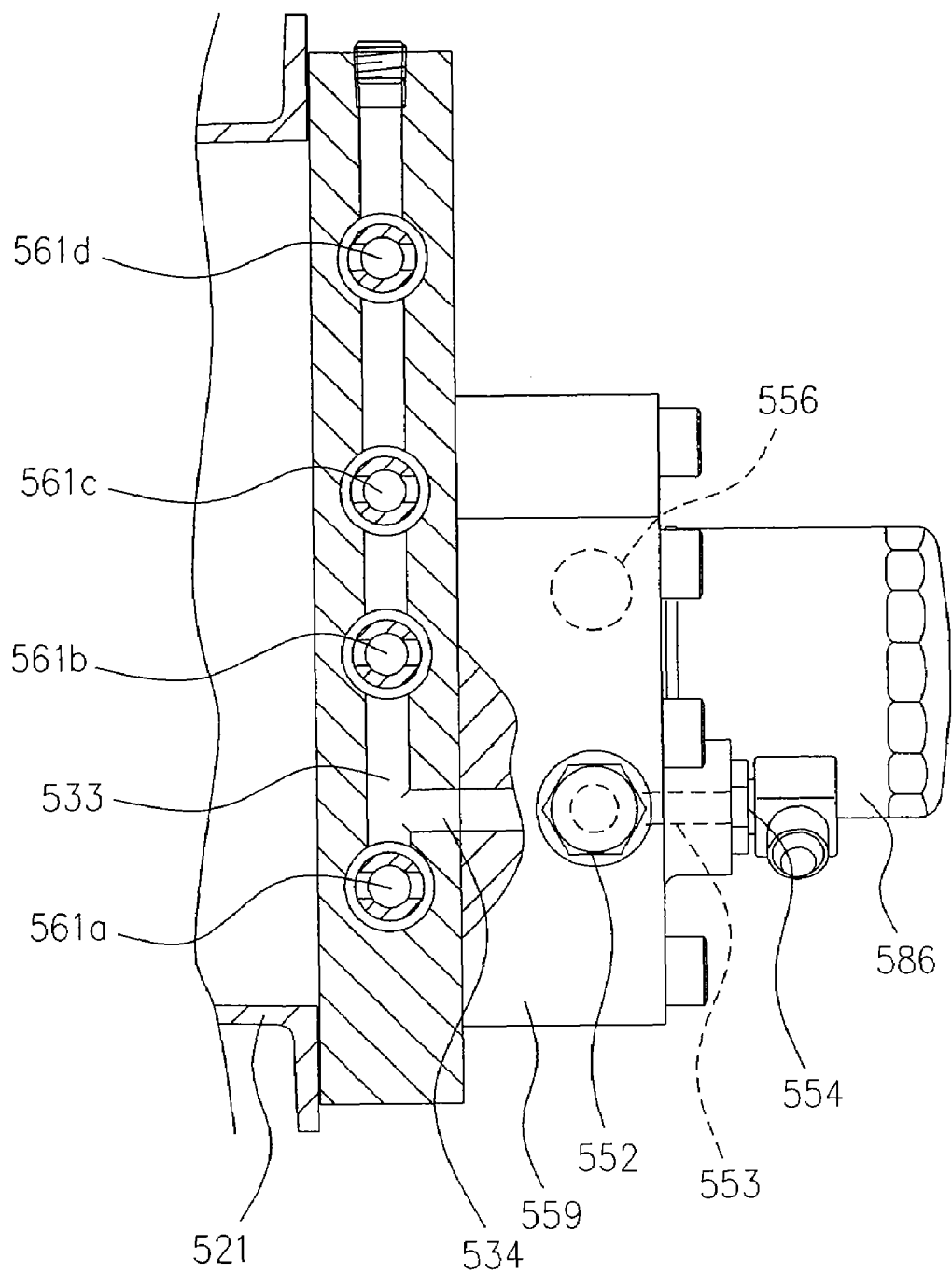
FIG. 49 is a cross section taken along line XXXXIX-XXXXIX in FIG. 47.

Now, the description will be made for the center section 530. FIG. 49 is a cross section taken along lines XXXXIX-XXXXIX in FIG. 47. As best illustrated in FIGS. 47 and 49, the center section 530 forms a first pair of hydraulic passages 531a respectively having first ends communicating with the first piston unit and second ends opening to the outside of the center section 530 to form a first pair of inlet/outlet ports 532a serving as connection ports for connection with the first pair of hydraulic lines 584a (see FIG. 43).

Figure 47:
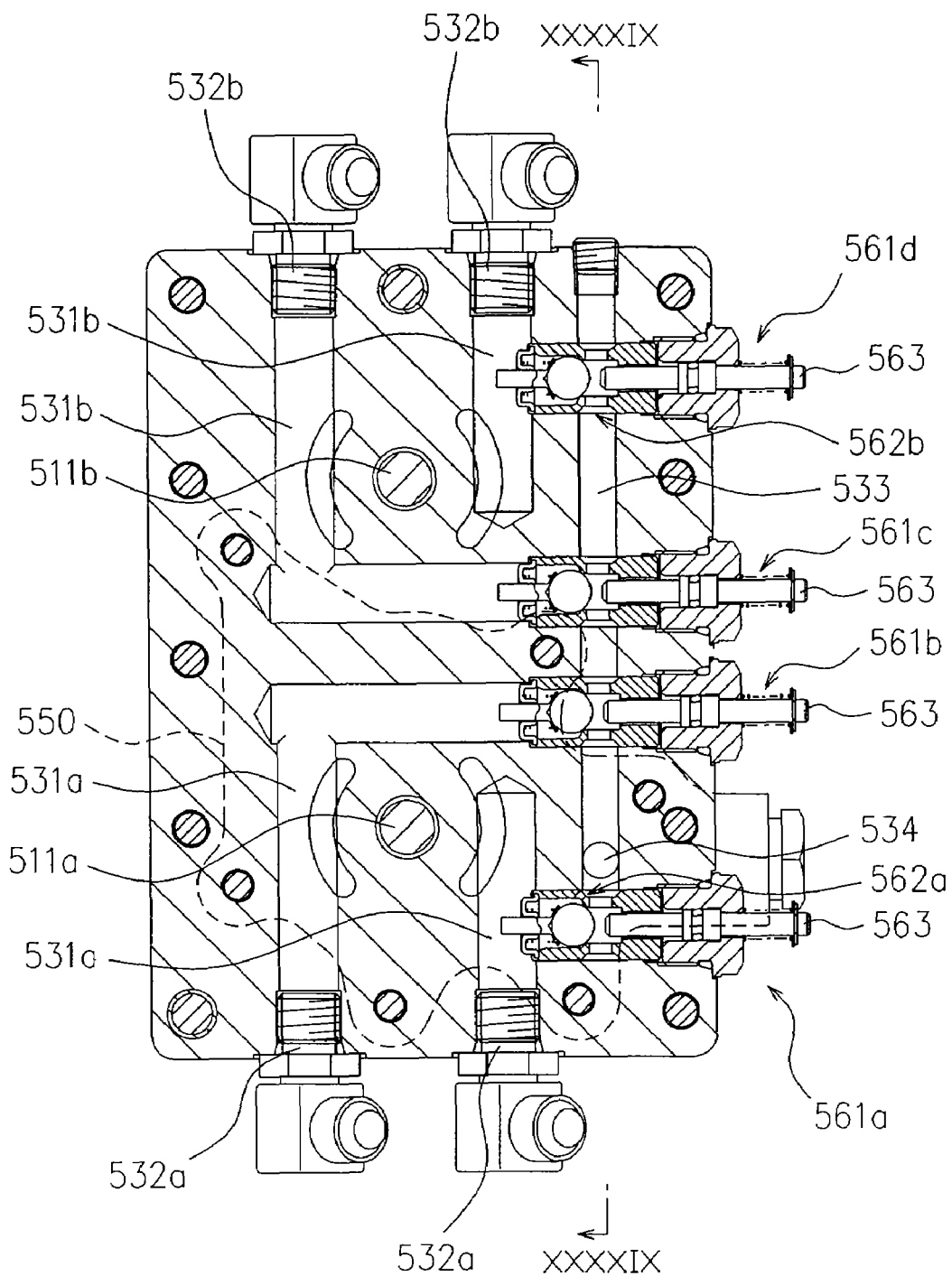
FIG. 47 is a cross section taken along line XXXXVII-XXXXVII in FIG. 44.

The center section 530, as best illustrated in FIG. 47, also forms a second pair of hydraulic passages 531b having first ends communicating with the second piston unit and second ends opening to the outside of the center section 530 to form a second pair of inlet/outlet ports 532b serving as connection ports for connection with the second pair of hydraulic lines 584b (see FIG. 43).

The common center section 530 thus forms all the first and second pairs of inlet/outlet ports 532a and 532b serving as the connection ports for connection with the first and second pairs of hydraulic lines 584a and 584b. Whereby, the piping work between the hydraulic pumps 510a and 510b, and the hydraulic motors 582a and 582b can be facilitated. In this embodiment, the common center section 530 has side surfaces facing one another that respectively form the first pair of inlet/outlet ports 532a and the second pair of inlet/outlet ports 532b. Alternatively, the first and second pairs of inlet/outlet ports 532a and 532b can be formed in the same side of the center section, thereby further facilitating the piping work.

Figure 46:
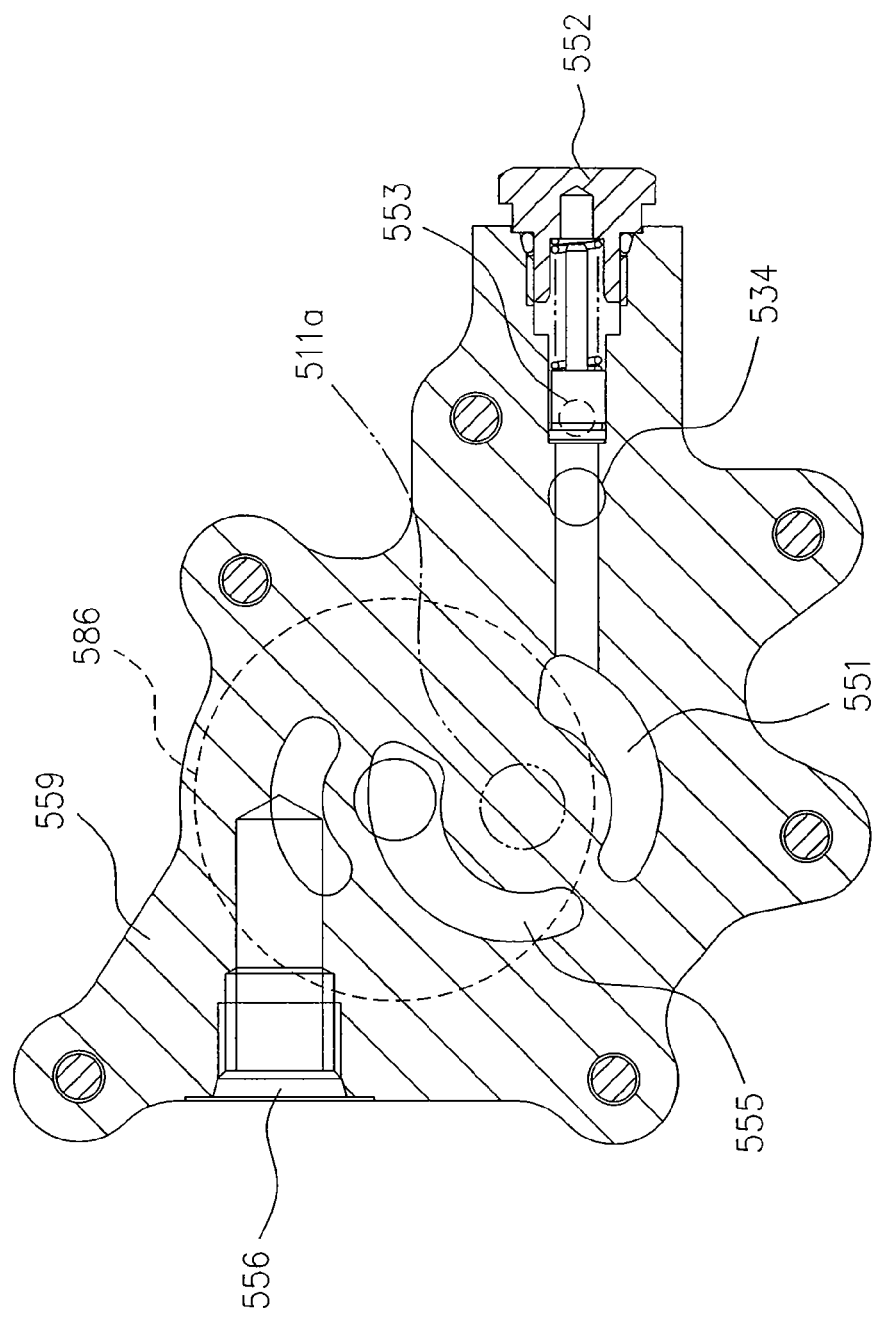
FIG. 46 is a cross section taken along line XXXXVI-XXXXVI in FIG. 44.

The center section 530, as illustrated in FIGS. 44, 46 and 47, also forms a common charging passage 533 having a first end opening to the outside of the center section 530 to form an inlet port for charging 534 serving as an inlet for the hydraulic fluid to be replenished, and a second end communicating with the first pair of hydraulic passages 531a and the second pair of hydraulic passages 531b via check valves 561a, 561b, 561c and 561d.

In this embodiment, the first pump shaft 511a, as best illustrated in FIGS. 44 and 45, has an extension extending upwards from the upper end thereof to be located above the center section 530, thereby supporting a charge pump 550 via the extension. The charge pump 550 has an upper surface with a cartridge filter 586 detachably mounted thereto, through which the hydraulic fluid is sucked into the inlet port 555 of the charge pump 550. The cartridge filter 586 can be provided at the discharge side of the charge pump 550.

The charging passage 533 is connected to a first end of a pressure relief line 553 with a relief valve 552 therein. The relief valve 552 regulates the hydraulic pressure of the charging passage 533 (see FIGS. 43 and 44).

The pressure relief line 533 has a second end opening to the outside to form a drain port 554 through which the hydraulic fluid from the relief valve is drained.

In this embodiment, the pressure relief line 553 is formed in a charge pump casing 559 mounted on the upper surface of the center section 530. However, the present invention is not necessarily limited to this arrangement. That is, the pressure relief line 553 can be formed in the center section 530.

Reference codes 551 and 556 in FIGS. 44 and 46 respectively represent an outlet port of the charge pump, and an inlet port communicating with the inlet port 555 of the charge pump 550 via the filter 586.

As described above, the charging passage 533 has the second end communicating with the first pair of hydraulic passages 531a and the second pair of hydraulic passages 531b via the check valves 561a, 561b, 561c and 561d so as to allow the pressurized hydraulic fluid to be fed from the common charging passage 533 into a lower pressure line of the first pair of hydraulic lines 584a and a lower pressure line of the second pairs of hydraulic lines 584b, while preventing the pressurized hydraulic fluid from flowing in the reverse direction.

Further, bypass lines 562a and 562b having throttle valves are formed between at least one of the first pair of hydraulic passages 531a and the charging passage 533, and between at least one of the second pair of hydraulic passages 531b and the charging passage 533 (see FIGS. 43 and 47).

The bypass lines 562a and 562b are designed to assure the neutralization of the hydraulic pumps 510a and 510b. Specifically, even if the swash plates 514a and/or 514b of the hydraulic pumps 510a and 510b tilts from the neutral positions by a small angle, there occurs the pressure difference between the first pair of hydraulic lines 484a, and/or between the second pair of hydraulic lines 454b. This pressure difference causes the rotation of the hydraulic motors 582a and 582b. That is, even a slight amount of the displacement between the actual neutral positions and the predetermined design positions of the swash plates 514a and 514b due to assembling errors or the like causes an unintentional rotation of the hydraulic motors 582a and 582b. On the contrary, the bypass lines 562a and 562b, as described above, allow the pressurized hydraulic fluid to leak therethrough from the first pair of hydraulic lines 584a and the second pair of hydraulic lines 584b. Thus, the pressure difference between the pair of first hydraulic lines 584a and/or between the second pair of hydraulic lines 584b can effectively be limited, thereby effectively avoiding the unintentional rotation of the hydraulic motors 582a and 582b, even for the swash plates 514a and 514b having the actual neutral position displaced from the design neutral position due to the assembling errors or the like.

In view of transmission efficiency between the hydraulic pumps 510a, 510b and the hydraulic motors 582a, 582b, the leakage of the pressurized hydraulic fluid from the first and second pairs of hydraulic lines 584a, 584b through the bypass lines 562a, 562b is not preferable. Therefore, the bypass lines 562a, 562b are preferably provided in portions from the charging passage 533 to one of the first pair of hydraulic passages 531a, and to one of the second pair of hydraulic passages 531b.

The check valves 561a, 561b, 561c and 561d are more preferably provided with release means 562 to forcibly bring the first pair of hydraulic passages 531a into communication with one another, and the second pair of hydraulic passages 531b into communication with one another, if an emergency arises, as illustrated in FIG. 47. The release means 562 are designed to easily move the vehicle, when the vehicle must forcibly be moved or the vehicle wheels must forcibly be rotated by man power or the like due to the disorder of the power source 580, the hydraulic pumps 510a, 510b or the like. Specifically, when the vehicle wheels connected to the hydraulic motors 582a and 582b are forcibly rotated with the first pair of hydraulic lines 584a and/or the second pair of hydraulic lines 584b lying in the closing state, there occurs the pressure difference between the first pair of hydraulic lines 584a, and between the second pair of hydraulic lines 584b. As a result, the vehicle is hardly moved, or the vehicle wheels are hardly rotated. On the contrary, the release means can easily achieve the communications between the first pair of hydraulic passages 531a, and between the second pair of hydraulic passages 531b by mechanically releasing all the check valves 561a to 561d. Whereby, the vehicle can easily be moved by man power or the like.

As illustrated in FIG. 47, all the release means 563 are preferably disposed in the same side of the center section 530, so that the link mechanism linking these release means 563 for operation of the same can have a simplified structure.

As described above, the pump unit 500 of this embodiment includes the first and second hydraulic pumps 510a and 510b, the center section 530 and the housing 520, all of which are integrally connected together to constitute a single unit 500a. Accordingly, both first and second hydraulic pumps 510a and 510b can be installed on the vehicle only by mounting the single unit 500a on the vehicle, thereby achieving an improved efficiency in assembling the vehicle.

The pump unit 500 of this embodiment also includes a reservoir tank 585 supportingly connected to the single unit 500a, as illustrated in FIGS. 44 to 46. In this embodiment, the reservoir tank 585 has right and left sides respectively forming mounting ribs 585a, so that the reservoir tank 585 is supportingly connected to the single unit 500a via mounting members 590 fastened to the mounting ribs 585a.

The reservoir tank 585 communicates with the housing 520 for a free fluid communication therebetween via a hydraulic fluid replenishing passage 587 or other suitable conduits means, as illustrated in FIGS. 44 and 48. This hydraulic communication allows the reservoir tank 585 to be used as a hydraulic fluid tank together with the housing 520.

Preferably, the reservoir tank 585 has the upper side positioned higher than the upper side of the housing 520, so that the housing can be completely filled with the hydraulic fluid, thereby effectively preventing the air from being entrained in the hydraulic fluid stored within the housing 520. Variation in volume of the hydraulic fluid within the housing 520 due to variation in temperature of this hydraulic fluid can be properly compensated by the reservoir tank 585 communicating with the housing.

The hydraulic fluid tank communicates with the inlet port for charging 534. According to this embodiment, the hydraulic fluid, which has been sucked via the hydraulic fluid replenishing passage 588 from the reservoir tank 585 constituting a part of the hydraulic tank, is fed into the inlet port for charging 534 via the pressure relief line 553 (see FIGS. 43 and 44).

On the other hand, the drain port adapted to drain the hydraulic fluid from the relief valve 552 installed within the pressure relief line 553 is connected to a cooling conduit 591 via a first end thereof. The cooling conduit 591 has a second end communicating with the reservoir tank 585 constituting a part of the hydraulic tank. The cooling conduit 591, as illustrated in FIG. 44, has at least a portion extending through the outside air with a spacing from the single unit 500a and the reservoir tank 585 to air-cool the hydraulic fluid flowing through the cooling conduit 591. The cooling conduit 591 preferably has an outer circumference provided with cooling fins to obtain an enlarged heat radiation area, and hence improved cooling efficiency.

The cooling conduit 591 may be connected to the reservoir tank 585 or the single unit 500a by a suitable bridging means.

The pump unit is thus designed so that the hydraulic fluid, which has been sucked into the inlet port 555 of the charge pump 550 via the hydraulic fluid replenishing passage 588, and discharged through the outlet port 551, partly returns to the hydraulic fluid tank via the cooling conduit 591 extending through the outside air.

Specifically, the hydraulic fluid replenishing passage 588, a part of the pressure relief line 553 and the cooling conduit 591 together constitutes a circulation line having a first end communicating with the hydraulic fluid tank and a second end again communicating with the hydraulic fluid tank. The charge pump 550 is also designed to allow the hydraulic fluid to be sucked through the first end of the circulation line and to be returned to the hydraulic fluid tank through the second end of the circulation line. Whereby, the rise in temperature of the stored hydraulic fluid can effectively be prevented. As a result, deterioration in working efficiency of the hydraulic pumps and the hydraulic motors can effectively be prevented.

The pump unit of this embodiment has the arrangement to allow the hydraulic fluid drained from the relief valve 552 installed within the pressure relief line 553 to be returned to the hydraulic fluid tank via the cooling conduit 591 in consideration of the cooling efficiency of the hydraulic fluid. That is, the hydraulic fluid discharged from the charge pump 550 is highly pressurized, and therefore has a high temperature due to the pressure energy of the discharged hydraulic fluid. Therefore, when the drained hydraulic fluid is directly returned to the hydraulic fluid tank, the temperature of the hydraulic fluid stored in the hydraulic tank may increase. On the contrary, the pump unit of this embodiment includes the cooling conduit 591 to return the hydraulic fluid of a high temperature drained from the relief valve 552 to the hydraulic fluid tank to effectively limit the increase in temperature of the hydraulic fluid stored within the tank.

More preferably, the cooling fan 581 operatively driven by the power source 580 is disposed near the single unit 500a and the reservoir tank 585, and the reservoir tank 585 is connected to the single unit 500a in such a manner as to form between the reservoir tank 585 and the single unit 500a a clearance 589 into which a cooling air stream is drawn from the cooling fan 581. The hydraulic fluid replenishing passage 588 and/or the hydraulic fluid communication passage 587 traverses the clearance 589.

In the above arrangement, the hydraulic fluid replenishing passage 588 and the hydraulic fluid communication passage 587 each preferably have the right and left sides surrounded by a cooling air duct or shroud to effectively guide the cooling air stream from the cooling fan to the clearance 589.

Figure 50:
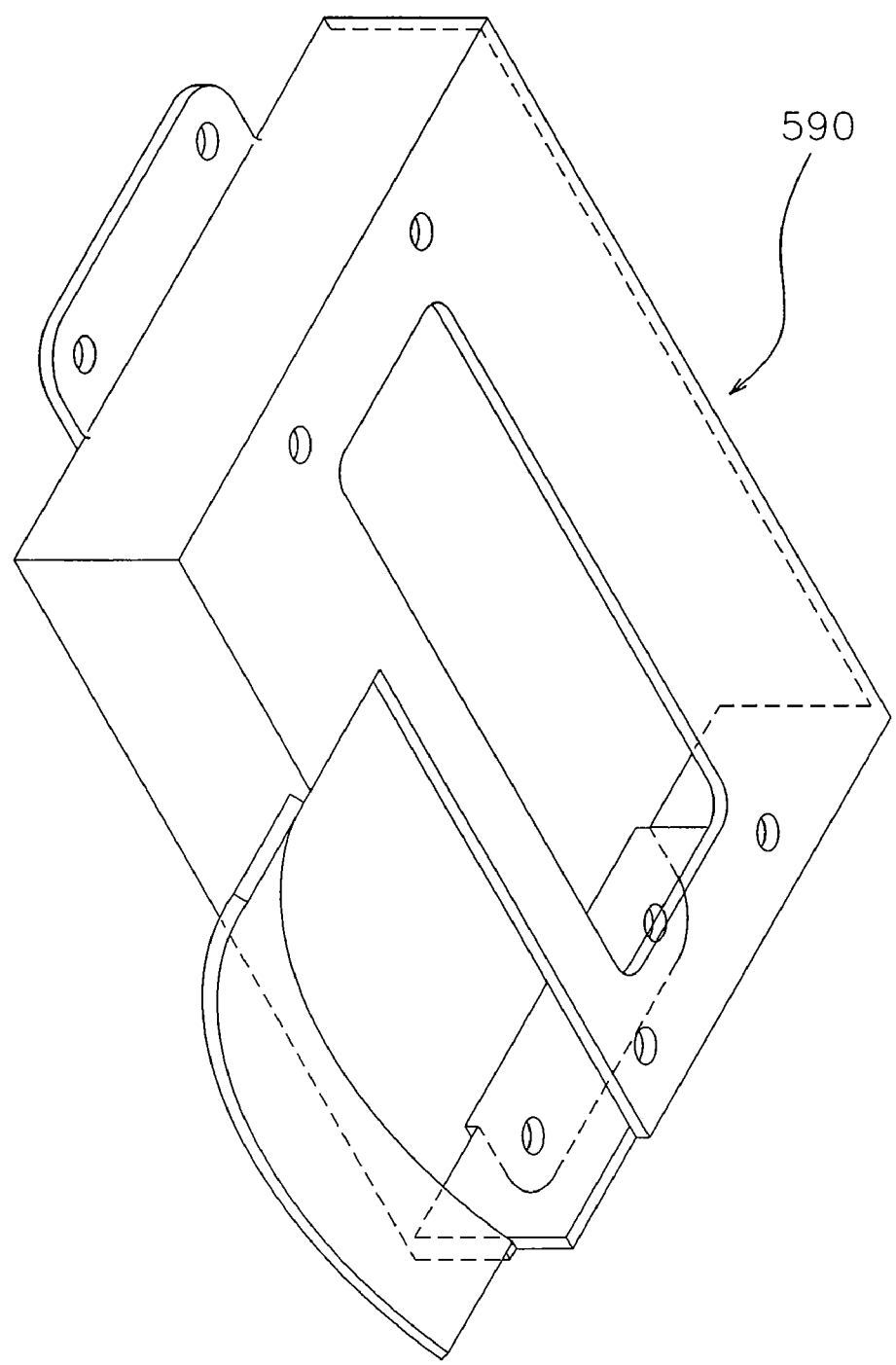
FIG. 50 is a perspective view of a mounting member.

In this embodiment, the mounting members 590 for mounting the reservoir tank 585 to the single unit 500a is formed into a casing (see FIG. 50) with sidewalls, so that the cooling air stream from the cooling fan 581 can efficiently drawn into the clearance along its sidewalls.

Such an additional fluid cooling arrangement can achieve cooling of the hydraulic fluid flowing through the hydraulic fluid replenishing passage 588 and the hydraulic fluid communication passage 587 in addition to the cooling of the hydraulic fluid flowing through the cooling conduit 591, thereby more effectively limiting the increase in temperature of the hydraulic fluid within the hydraulic tank.

The hydraulic fluid replenishing passage and the hydraulic fluid communication passage each more preferably has an outer circumference provided with cooling fins (not shown) to obtain an enlarged heat radiating area, and hence an improved cooling efficiency. The cooling fins can also be provided on the reservoir tank 585 itself.

Preferably, the reservoir tank 585 is made of a semitransparent resin material to afford a visual observation of the level of the hydraulic fluid from the outside of the tank. The reservoir tank 585 can also include a tank cap 585b with an air release mechanism on the top of the tank.

In this embodiment, the charge pump 550 is provided to forcibly feed the pressurized hydraulic fluid to the inlet port for charging 534, and to circulate the hydraulic fluid through the circulation line. The present invention is not necessarily limited to this arrangement. Alternative to this arrangement with the charge pump 550, the inlet port for charging 534 may be directly connected to the reservoir tank 585 via the hydraulic fluid replenishing passage 588 by omitting the charge pump 550. This allows the hydraulic fluid to spontaneously flow into the inlet port 534 when the pressure in a lower pressure line of the first pair of hydraulic lines 584a and/or the pressure in a lower pressure line of the second pair of hydraulic lines 584b drops from a predetermined value. In addition, a pump may be separately provided to circulate the hydraulic fluid through the circulation line.

The pump unit of this embodiment may employ the arrangement, which allows a cooling air stream from a cooling fan (not shown) for the power source or a radiator (not shown) to be applied on the cooling conduit 591. This arrangement can more effectively cool the hydraulic fluid flowing through the cooling conduit 591.

Tenth Embodiment

Figure 51:
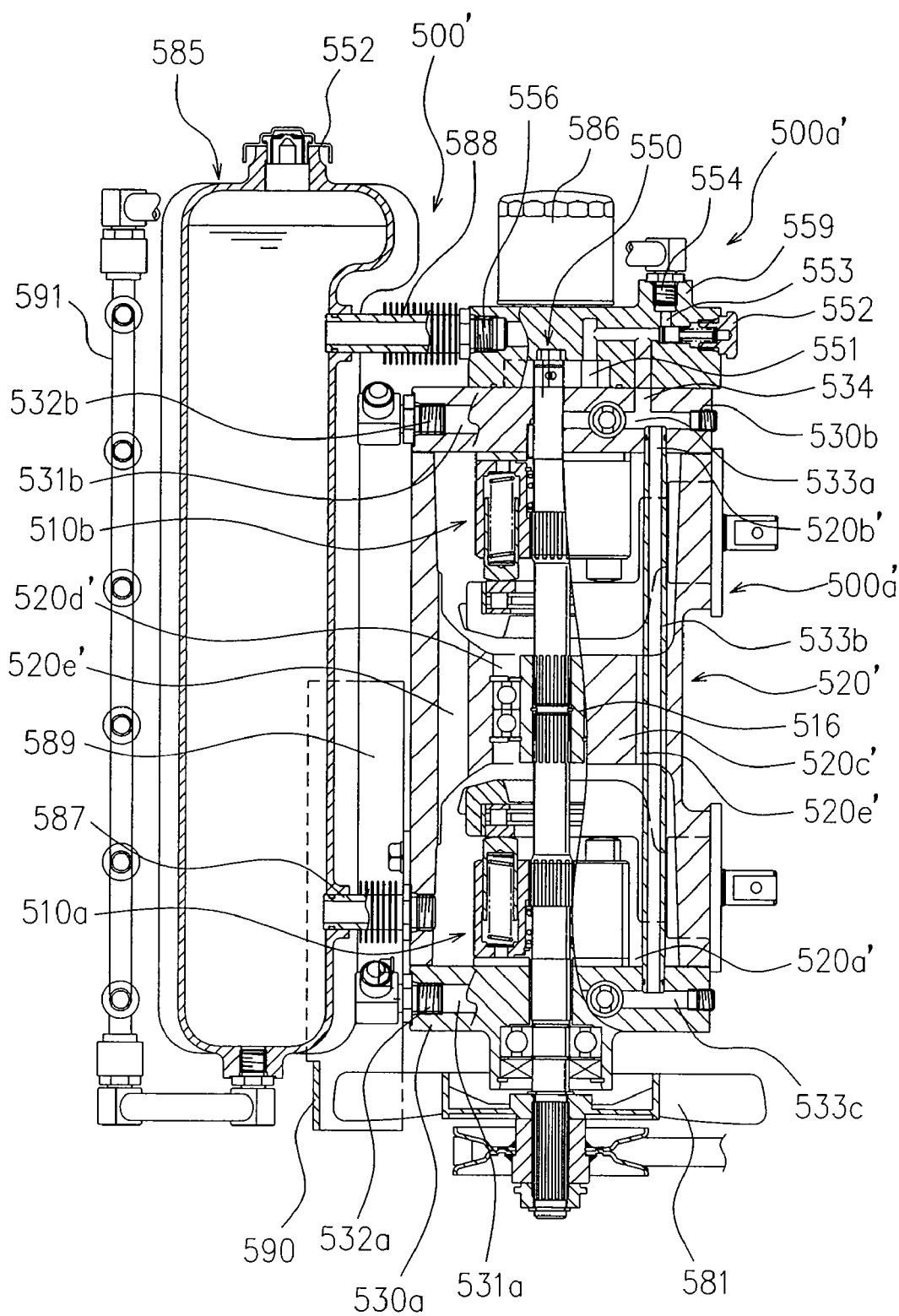
FIG. 51 is a longitudinal cross-sectional side view of a pump unit according to a tenth embodiment the present invention.

A pump unit according to a tenth embodiment of the present invention will be hereinafter described with reference to FIG. 51. FIG. 51 is a longitudinal cross-sectional side view of the pump unit 500'.

As illustrated in FIG. 51, the pump unit 500' of this embodiment is a tandem pump unit with the first hydraulic pump 510a connected in series with the second hydraulic pump 510b. In the following description, corresponding or identical parts to those of the ninth embodiment have been given the same reference characters or those with primes (') to omit a detailed description thereof.

As illustrated in FIG. 51, the pump unit 500' includes the common housing 520' for accommodating the first hydraulic pump 510a and the second hydraulic pump 510b, and the first center section 530a and the second center section 530b respectively supporting the first hydraulic pump 510a and the second hydraulic pump 510b.

The common housing 520' has the first end (the lower end in this embodiment), and the second end (the upper end in this embodiment) along the axial direction thereof respectively defining the first opening 520a' for receiving the first hydraulic pump 510a and the second opening 520b' for receiving the second hydraulic pump 510b.

The common housing 520' also forms the partition wall 520c' at substantially the center in the direction of the pump shaft to divide the common housing into the first pump accommodation chamber and the second pump accommodation chamber. The partition wall 520c' includes a bearing portion for supporting the connection portion between the first pump shaft 511a and the second pump shaft 511b. Specifically, the partition wall 520c' includes a connection member 516 non-rotatably fixed around the downstream end or the upper end of the first pump shaft 511a and the upstream end or the lower end of the second pump shaft 511b, and rotatably supported in the bearing hole 520d' formed in the partition wall. The partition wall 520c' may form a plurality of hydraulic fluid communication passages 520e' for communication between the first pump accommodation chamber and the second pump accommodation chamber. These communication passages enable the entire housing to be used as the hydraulic fluid tank.

The first center section 530a supports on the upper surface thereof the first hydraulic pump 510a, and is connected to the housing 520' in such a manner as to seal the first opening 520a' of the housing. The first pump shaft 511a of the first hydraulic pump 510a has the upstream end or the lower end extending downwardly through the first center section 530a to form a lower extension through which the power is inputted to drive the hydraulic pump units and the cooling fan 581.

On the other hand, the second center section 530b supports on the lower surface thereof the second hydraulic pump 510b, and is connected to the housing 520' in such a manner as to seal the second opening 520b' of the housing 520'. The second pump shaft 511b of the second hydraulic pump 510b has the downstream end or the upper end extending upwardly through the second center section 530b to form an upper extension through which the charge pump 550 is driven.

The first center section 530a, as illustrated in FIGS. 43 and 51, forms a first pair of hydraulic passages 531a for the first hydraulic pump, respectively having first ends opening to the outside of the first center section through the surface facing the first piston unit 512a (the upper surface) to respectively communicate with the inlet/outlet ports of the first piston unit, and second ends opening to the outside of the first center section. The second ends of the first pair of hydraulic passages 531a opening to the outside forms a first pair of inlet/outlet ports 532a respectively serving as connection ports for connection with the first pair of hydraulic lines 584a extending to the first hydraulic motor 582a.

Similarly, the second center section 530b, as illustrated in FIGS. 43 and 51, forms a second pair of hydraulic passages 531b for the second hydraulic pump, respectively having first ends opening to the outside of the second center section through the surface facing the second piston unit 512b to respectively communicate with the inlet/outlet ports of the second piston unit, and second ends opening to the outside of the second center section. The second ends of the second pair of hydraulic passages 531b opening to the outside forms a second pair of inlet/outlet ports 532b respectively serving as connection ports for connection with the second pair of hydraulic lines 584b extending to the second hydraulic motor 582b.

Similarly to the ninth embodiment, the pump unit 500' of this embodiment includes the common charging passage 533 disposed therein, having a first end opening to the outside of the pump unit to form the inlet port for charging 534, and the second end communicating with the first and second pairs of hydraulic passages.

The common charging passage 533, as illustrated in FIG. 51, includes a first bore portion 533a, a conduit portion 533b and a second bore portion 533c. The first bore portion 533a is formed in the second center section 530b to have a first end opening to the outside of the second center section through the upper surface thereof to form the inlet port for charging 534 and a second end communicating with the second pair of hydraulic passages 531b via the check valves 561c and 561d and opening to the second pump accommodation chamber. The conduit portion 533b is disposed to have a first end connected to the second end of the first bore portion 533a and a second end extending through the second pump accommodation chamber, the partition wall 520c and the first pump accommodation chamber to the first center section 530a. The second bore portion 533c is formed in the first center section 530a to have a first end connected to the second end of the conduit portion 533b and a second end communicating with the first pair of hydraulic passages 531a via the check valves 561a and 561b. The conduit portion 533b can be extended through the partition wall 520c' by disposing the conduit portion 533b within one of the plurality of hydraulic fluid communication passages 520e'.

The charging passage 533 is also connected to the pressure relief line 553 via the first end thereof with the relief valve 552 installed therein in the same manner as the ninth embodiment. The relief valve 552 regulates the hydraulic pressure of the charging passage 533 (see FIGS. 43 and 44). The pressure relief line 533 has the second end opening to the outside to form the drain port 554 through which the hydraulic fluid from the relief valve 552 is drained.

Connected to the drain port 554 is the cooling conduit 591, through which the hydraulic fluid drained from the drain port 554 is returned to the hydraulic tank, in the same manner as the ninth embodiment.

The thus arranged pump unit 500' of this embodiment also produces the same effects as those of the ninth embodiment.

Alternative to the conduit portion 533b', it is possible to form in the peripheral wall of the common housing 520a communication hole having a first end connected to the second end of the first bore portion 533a' and a second end connected to the first end of the second bore portion 533c'.

Eleventh Embodiment

A pump unit according to an eleventh embodiment of the present invention will be hereinafter described with reference to the attached drawings.

Figure 52:
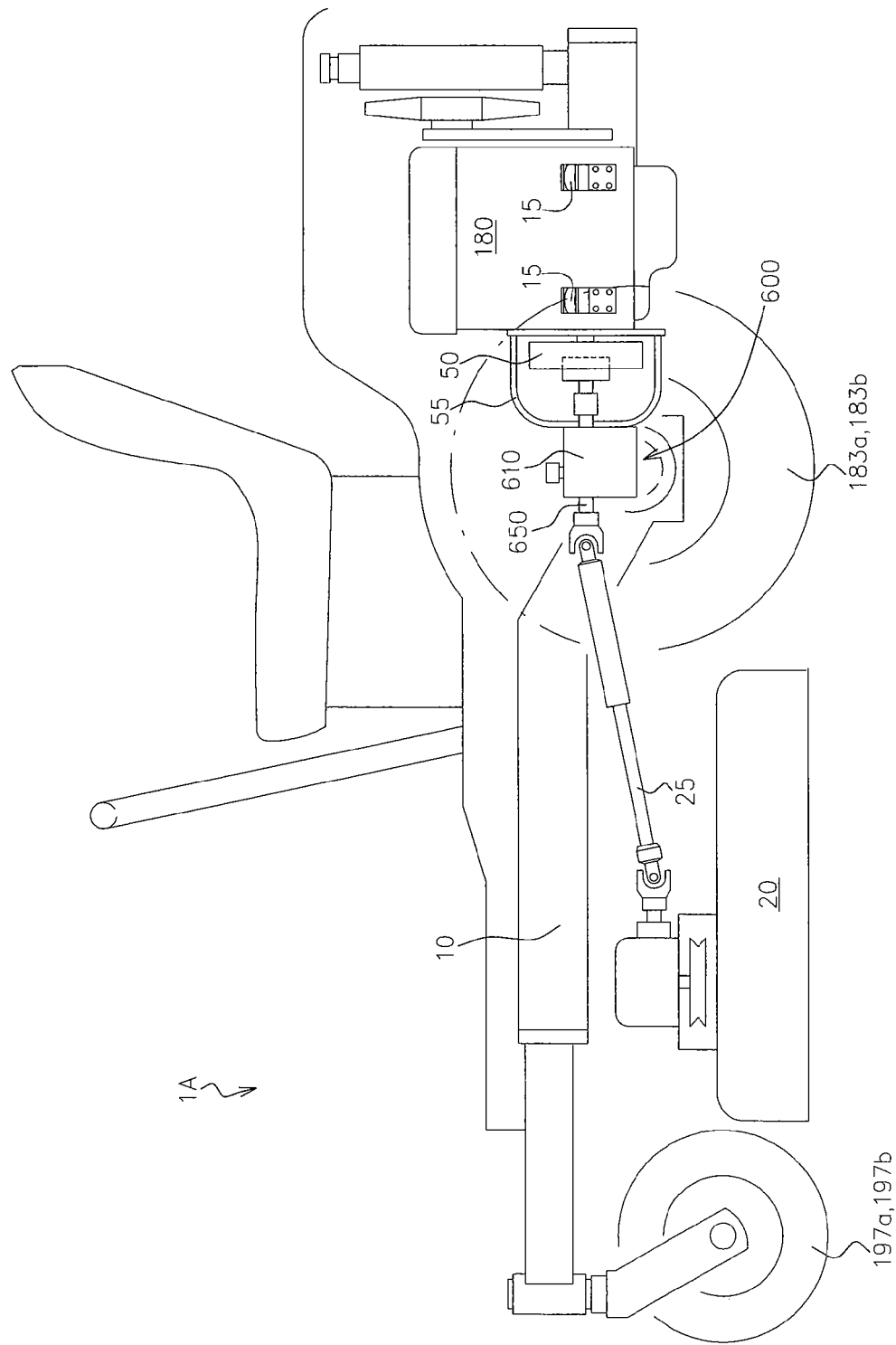
FIG. 52 is a side view of a working vehicle to which a pump unit according to an eleventh embodiment is applied.
Figure 53:
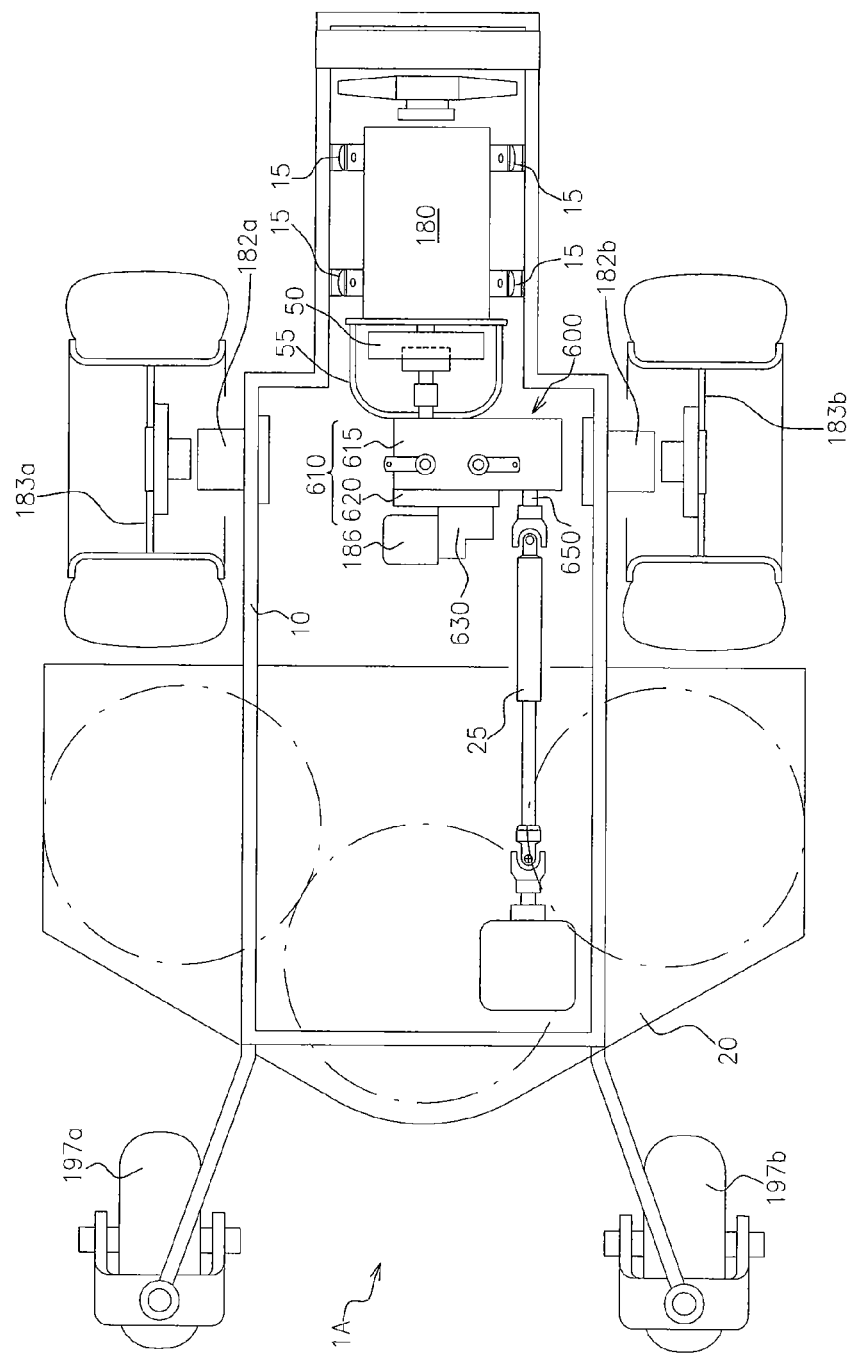
FIG. 53 is a plan view of the working vehicle shown in FIG. 52.
Figure 54:
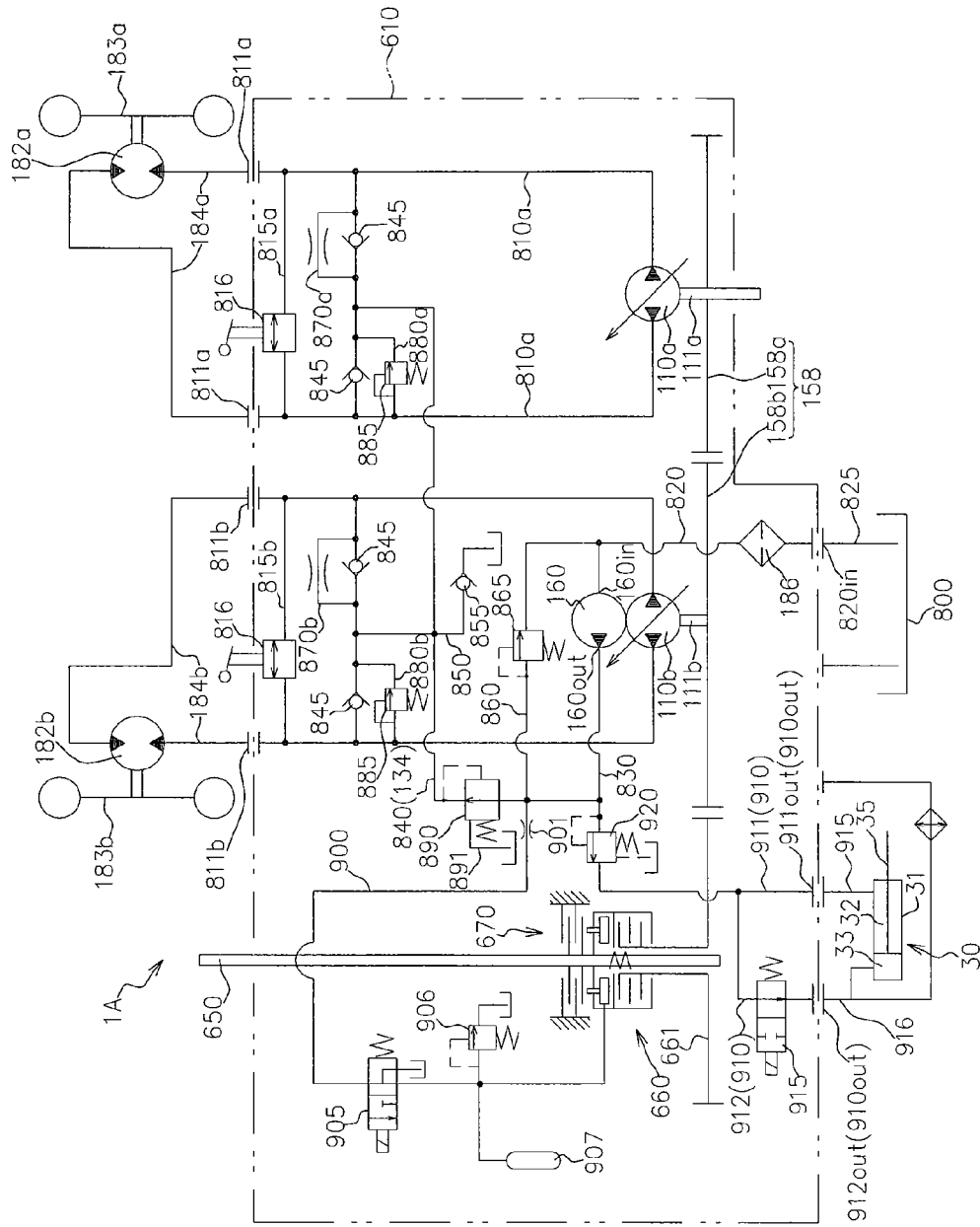
FIG. 54 is a hydraulic circuit diagram of the working vehicle shown in FIG. 52.

FIGS. 52-54 are a side view, a plan view and a hydraulic circuit diagram of a working vehicle 1A to which a pump unit 600 according to the present embodiment is applied, respectively.

Figure 55:
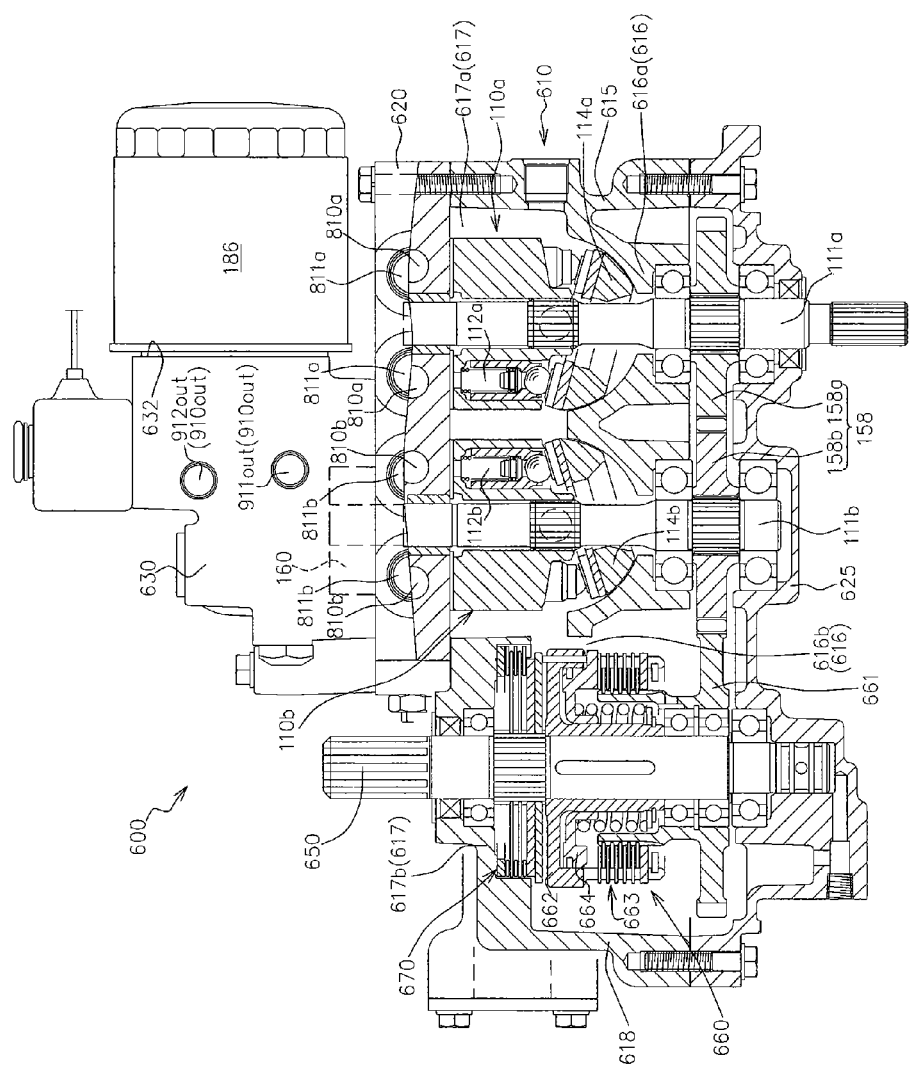
FIG. 55 is a cross sectional plan view of the pump unit according to the eleventh embodiment.
Figure 56:
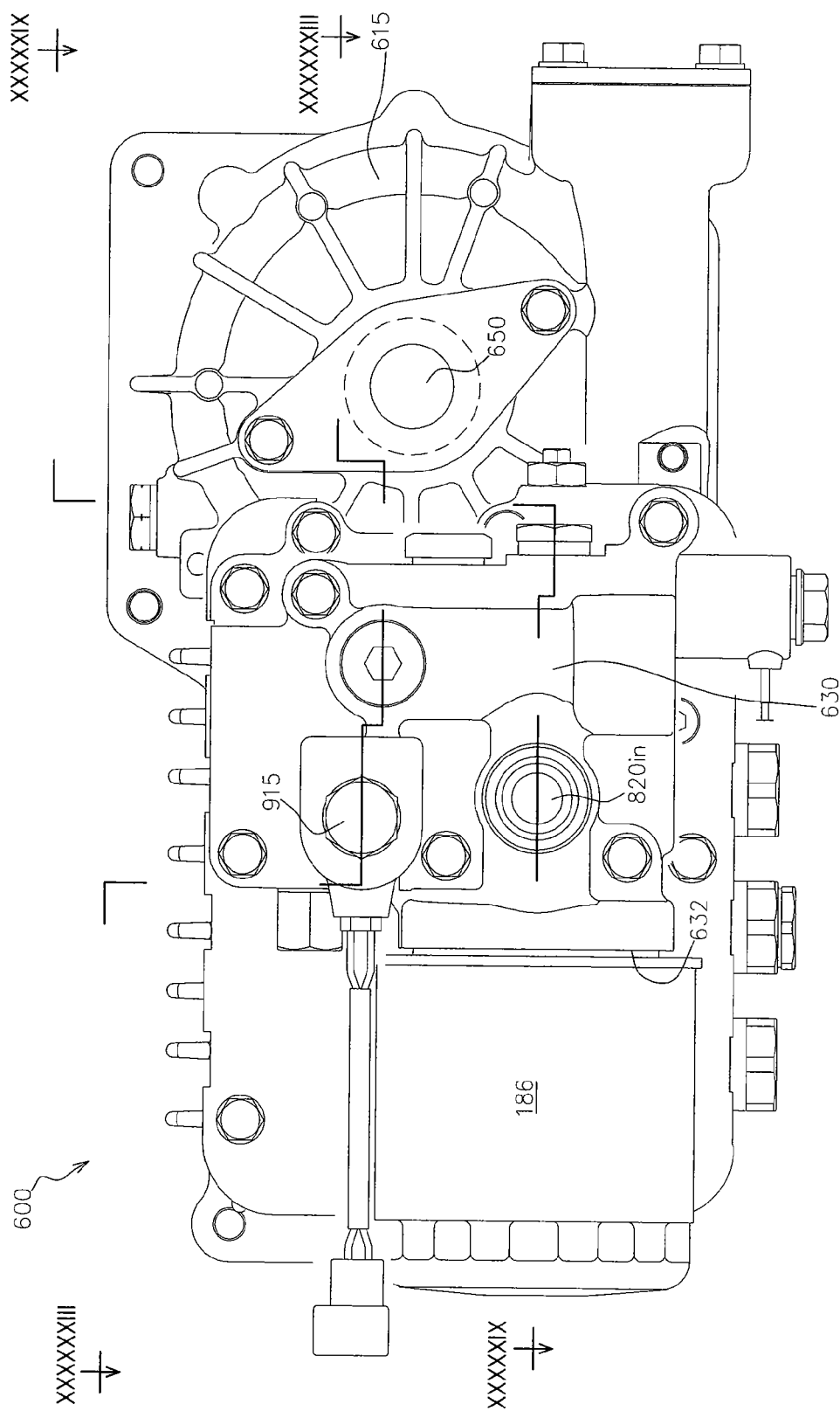
FIG. 56 is a front view of the pump unit shown in FIG. 55.

FIGS. 55 and 56 are a cross sectional plan view and a front view of the pump unit 600, respectively.

In the figures, the same reference characters are denoted for the same members as in the first embodiment, and the detailed explanations thereof are omitted.

As shown in FIGS. 52-56, the pump unit 600, in the same manner as each of the above embodiments, includes plurality of hydraulic pumps respectively fluidly connected to plurality of hydraulic motors, which are disposed away from the pump unit 600, so as to form closed circuits.

Specifically, the pump unit 600, in the same manner as each of the above embodiments, includes the first hydraulic pump 110a fluidly connected to the first hydraulic motor 182a, which operatively drives one 183a of the drive wheels, through the first pair of hydraulic lines 184a so as to form a first closed circuit, and the second hydraulic pump 110b fluidly connected to the second hydraulic motor 182b, which operatively drives the other 183b of the drive wheels, through the second pair of hydraulic lines 184b so as to form a second closed circuit, the first and second hydraulic pumps 110a, 110b being operatively driven by the power source 180.

Furthermore, the pump unit 600, in the same manner as the embodiments 1, 2 and 7-10, includes the filter 186 interposed within the charge line 134 for replenishing the operation fluid into the first pair of hydraulic lines 184a and the second pair of hydraulic lines 184b, thereby simplifying the filtering structure for filtering the charge line 134.

That is, in the prior configuration, the filter interposed within the charge line is fixed at a portion such as the body frame to be mounted via an exclusive mounting member such as a mounting stay, at a position away from the pump unit including the hydraulic pump.

In the prior configuration, it is needed another mounting work for mounting the filter at the body frame or the like via the exclusive mounting member, in addition to the mounting work for the pump unit. Moreover, it is needed to fluidly connect between a reservoir tank and the filter via one external conduit and to fluidly connect between the filter and the closed circuits via another external conduit, resulting in involving a troublesome piping work in forming the filtering structure.

On the other hand, in the above embodiments 1, 2, 7-10 and the present embodiment, the filter 186 is mounted at the pump unit 600 as explained above.

With the configuration, it is unnecessary to separately mount the filter 186 at the body frame 110 or the like, and the another conduit for fluidly connecting between the filter 186 and the closed circuits could be omitted, thereby simplifying the filtering structure.

Preferably, the filter 186 is mounted at a pump case 610 in a threaded manner in the same manner as the embodiments 1, 2 and 7-10.

The detailed configuration of the pump unit 600 according to the present embodiment will be now described.

As shown in FIGS. 54 and 55, the pump unit 600 includes, in addition to the first ad second hydraulic pumps 110a, 110b and the filter 186, a pump case 610 for accommodating the first and second hydraulic pumps 110a, 110b; the first and second pump shafts 111a, 111b supported by the pump case 610 in a rotatable manner around its axis line in a state of being parallel to each other, the first and second pump shafts 111a, 111b supporting the first and second hydraulic pumps 110a, 110b in a relatively non-rotatable manner, respectively; the power transmission mechanism 158 operatively connecting the first and second pump shafts 111a, 111b; the charge pump 160 driven by either one of the first and second pump shafts 111a, 111b; a PTO shaft 650 operatively driven by the power source 180 through the power transmission mechanism 158; and a hydraulic PTO clutch device 660 for selectively engaging or disengaging the power transmission from the power source 180 to the PTO shaft 650.

The pump case 610 includes a case body 615 and a center section 620 detachably connected to the case body 615.

The case body 615 has first and second end walls 616, 617 orthogonal to the axis lines of the first and second pump shafts 111a, 111b, the first and second end walls 616, 617 being positioned away from each other in the axis lines, and a peripheral wall 618 connecting between the peripheral edges of the first and second end walls 616, 617, as shown in FIG. 55.

The first end wall 616 has a swash plate receiving portion 616a that supports rear surfaces (the surfaces opposite to the surfaces at which the free ends of the piston units 112a, 112b are contacted) of the first and second swash plates 114a, 111b so that the swash plates 114a, 114b are capable of tilting, and a first opening 616b through which the PTO clutch device 660 can pass.

The second end wall 617 has a second opening 617a through which the first and second hydraulic pumps 110a, 110b can pass, the second opening 617a being provided at an area opposite the swash plate receiving portion 616a, and a bearing portion 617b supporting the PTO shaft 650 in a rotatable manner around its axis, the bearing portion 617b being provided at an area opposite the first opening 616b.

As shown in FIG. 55, the center section 620 is detachably connected to the case body 615 so as to seal the second opening 617a in a liquid tight manner.

The center section 620 forms therein a various fluid passages including a pair of first operation fluid passages 810a configuring a part of the first pair of hydraulic lines 184a and a pair of second operation fluid passages 810b configuring a part of the second pair of hydraulic lines 184b, as shown in FIG. 54. These fluid passages will be later described.

As shown in FIG. 55, the pump case 610 further includes a lid member 625 detachably connected to the case body 615 so as to seal the first opening 616b in a liquid tight manner.

In the present embodiment, the lid member 625 is configured to form a space for accommodating the power transmission mechanism 158 in cooperation with the first end wall 616, as shown in FIG. 55.

Specifically, the lid member 625 is connected to the first end wall 616 so as to liquid-tightly seal the first opening 616b in a state that there is a space between the lid member 625 and the first end wall 616.

As shown in FIGS. 52 and 53, the pump case 610 is integrally connected the power source 180, which is supported by a vehicle frame 10 in a vibrating manner through vibration-absorbing rubbers 15, in a free state with respect to the vehicle frame 10 (i.e. in a state of having no direct connection to the vehicle frame 10 so as to be capable of vibrating relative to the vehicle frame 10), whereby the power source 180 and the pump case 610 are integrally supported by the vehicle frame 10 without vibration difference therebetween.

In the present embodiment, the working vehicle 1A includes a flywheel body 50 connected to an output portion of the power source 180, and a flywheel housing 55 for covering the flywheel body 50 from the outsides.

Then, the pump case 610 is supported by the flywheel housing 55 in a state where the lid member 625 is contacted to the flywheel housing 55.

The first and second pump shafts 111a, 111b are supported by the lid member 625, the first end wall 616 and the center section 620 in a rotatable manner around its axis line in a state of being parallel to each other.

In a same manner as the embodiment 1, either one of the first and second pump shafts 111a, 111b is configured so that its end on a side closed to the power source 180 extends outsides from the pump case 610 to form an input end that is operatively connected to the power source 180.

In the present embodiment, the first pump shaft 111a functions as an input-side pump shaft that has the input end, as shown in FIGS. 52 and 55.

Furthermore, either one (hereinafter referred to as a charge-driving-side pump shaft) of the first and second pump shafts 111a, 111b is configured so that its one end extends outwards from the pump case 610 to form an output end that drives the charge pump 160, in the same manner as the embodiment 1 or the like.

In the present embodiment, the second pump shaft 111b functions as the charge-driving-side pump shaft, and is configured so that its end on a side away from the power source 180 extends outsides from the center section 620, as shown in FIGS. 52 and 55.

The power transmission mechanism 158 includes the first gear 158a supported by the first pump shaft 111a in a relatively non-rotatable manner, and the second gear 158b supported by the second pump shaft 111b in a relatively non-rotatable manner in a state of being engaged with the first gear 158a.

The first and second gears 158a, 158b are accommodated in the space between the first end wall 616 and the lid member 625.

The charge pump 160 is accommodated in a charge pump case 630 that is detachably connected to the center section 620, in the same manner as the embodiment 1 or the like.

The charge pump case 630 includes a contacting surface 631 to which the center section 620 is contacted, and a filter-mounting surface 632 to which the filer 186 is mounted, as shown in FIG. 55.

Preferably, the filter 186 is mounted at the mounting surface 632 so as to overlap with the hydraulic pump body (the first hydraulic pump 110a in the present embodiment) driven by the pump shaft (the first pump shaft 111a in the present embodiment, and hereinafter referred to as charge-non-driving-side pump shaft) that is different from the charge-driving-side pump shaft when seen from the front along the axial direction of the first and second pump shafts 111a, 111b, as shown in FIGS. 55 and 56.

With the configuration, it is possible to utilize a dead space in the pump unit 600 as a mounting space for the filer 186.

Specifically, the charge pump case 630 has outer surfaces orthogonal to an imaginary plane passing the axis line of the charge-driving-side pump shaft (the second pump shaft 111b in the present embodiment) and the axis line of the charge-non-driving-side pump shaft (the first pump shaft 111a in the present embodiment), and is configured to utilize one outer surface closed to the charge-non-driving-side pump shaft on the basis of the axis line of the charge-driving-side pump shaft, out of the outer surfaces, as the filter-mounting surface 632.

In the present embodiment, on the basis of the mounting state where the pump unit 600 is mounted at the working vehicle 1A, the first pump shaft 111a functioning as the charge-non-driving-side pump shaft and the second pump shaft 111b functioning as the charge-driving-side pump shaft extend along the fore-and-aft direction of the working vehicle, and are arranged in parallel so that the first and second pump shafts 111a, 111b are respectively inward and outward in the vehicle width direction.

In the configuration, the outer side surface facing inward in the vehicle width direction, out of the outer surfaces of the charge pump case 630, forms the filter-mounting surface 632.

Alternatively to the configuration, it may be configured that the first pump shaft 111a functioning as the input-side pump shaft also functions as the charge-driving-side pump shaft.

Figure 57:
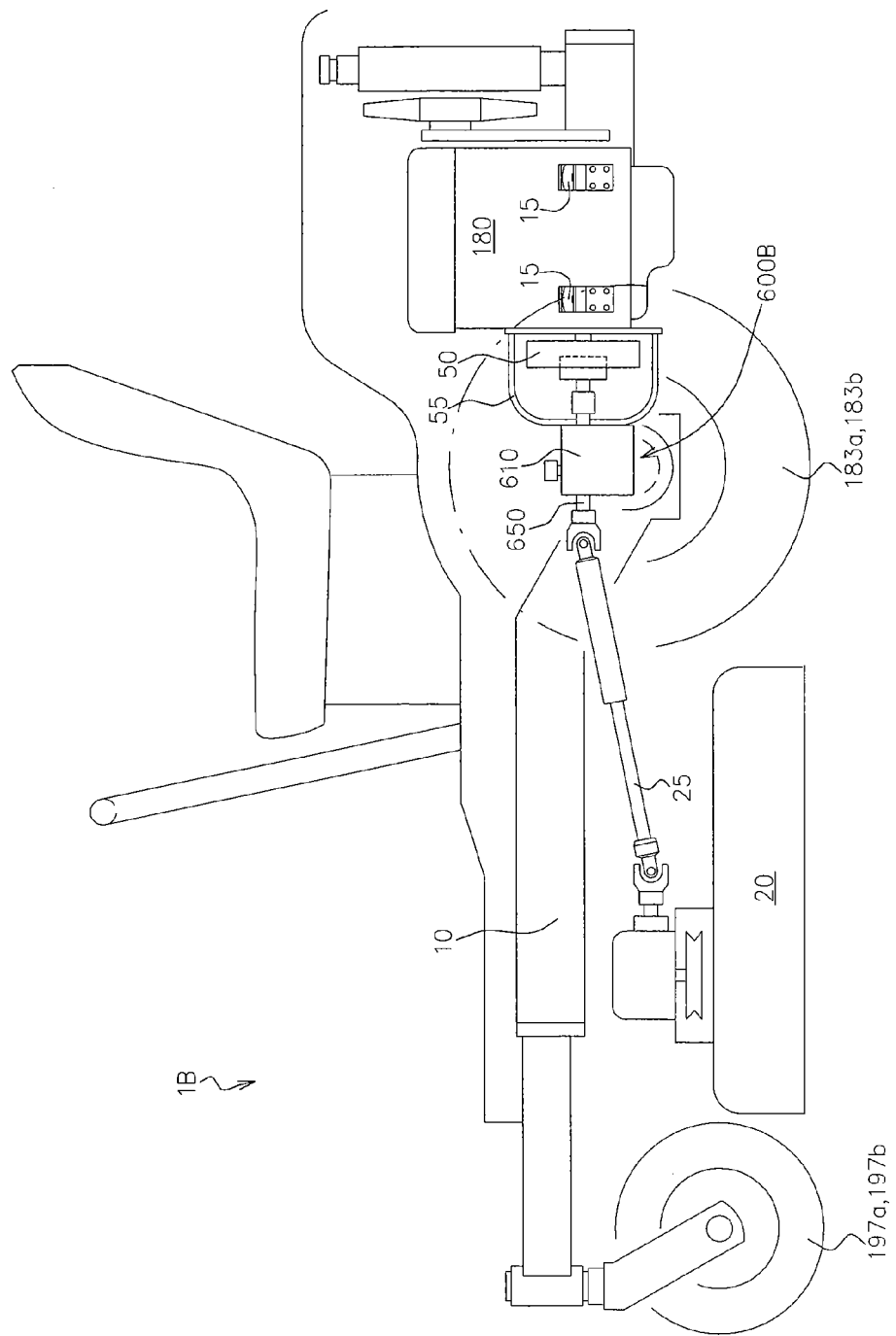
FIG. 57 is a side view of a working vehicle to which a modified pump unit according to the eleventh embodiment is applied.
Figure 58:
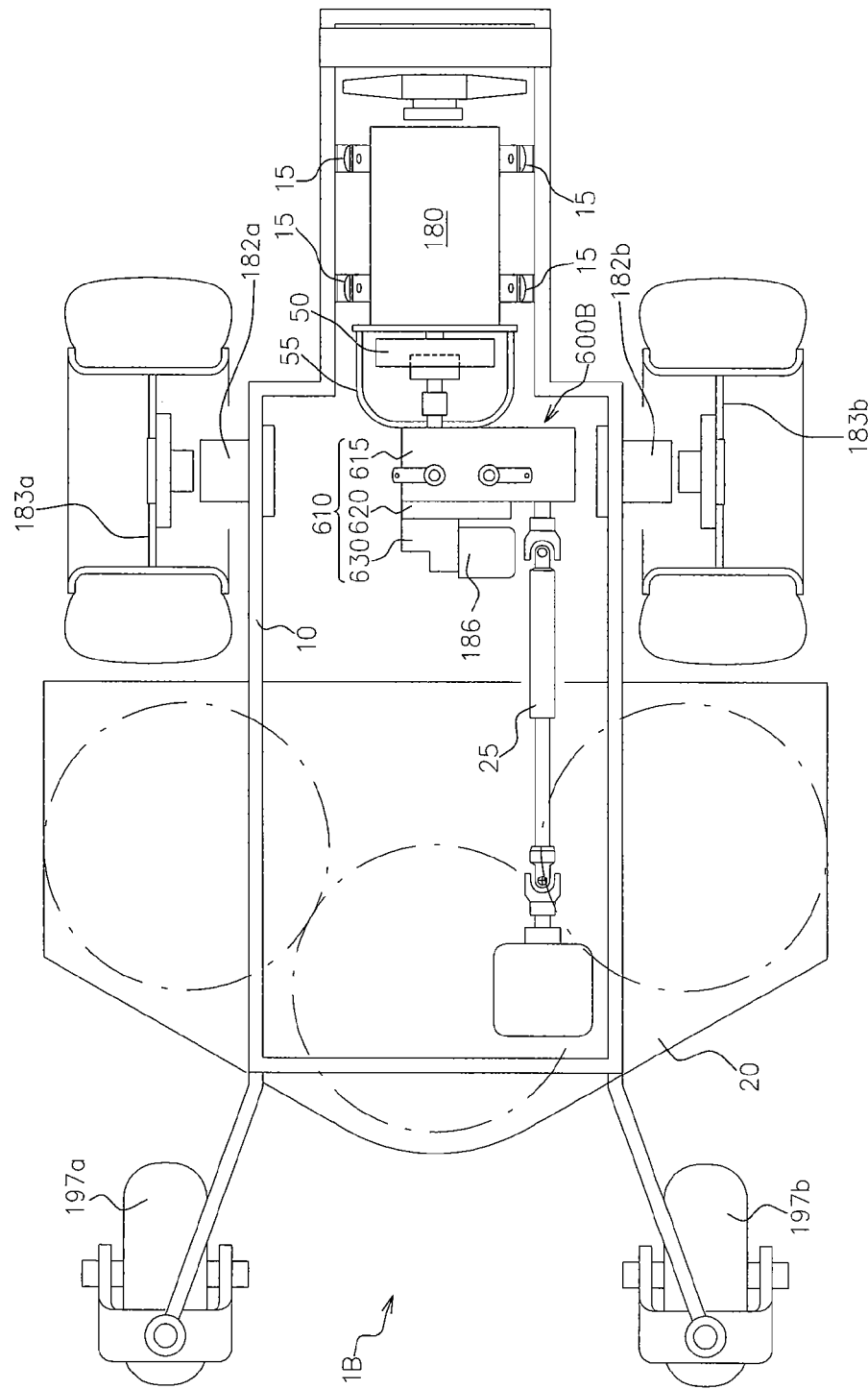
FIG. 58 is a plan view of the working vehicle shown in FIG. 57.

FIGS. 57 and 58 are, respectively, a side view and a plan view of a working vehicle 1B to which a modified embodiment 600B of the pump unit 600 according to the present embodiment is applied.

In the modified pump unit 600B, the first pump shaft 111a that is positioned inward in the vehicle width direction and that functions as the input-side pump shaft also functions as the charge-driving-side pump shaft.

In the modified configuration, out of the outer surfaces of the charge pump case 630, the outer surface that is orthogonal to the imaginary plane passing the axis lines of the first and second pump shafts 111a, 111b and is closed to the second pump shaft 111b on the basis of the axis line of the first pump shaft 111a, that is, the outer surface facing outward in the vehicle width direction functions as the filter-mounting surface 632.

The charge pump case 630 forms therein fluid passages including a suction fluid passage 820 and a discharge fluid passage 830 fluidly connected to a suction side 160 in and a discharge side 160out of the charge pump 160, respectively, as shown in FIG. 54. These fluid passages will be later explained.

Figure 59:
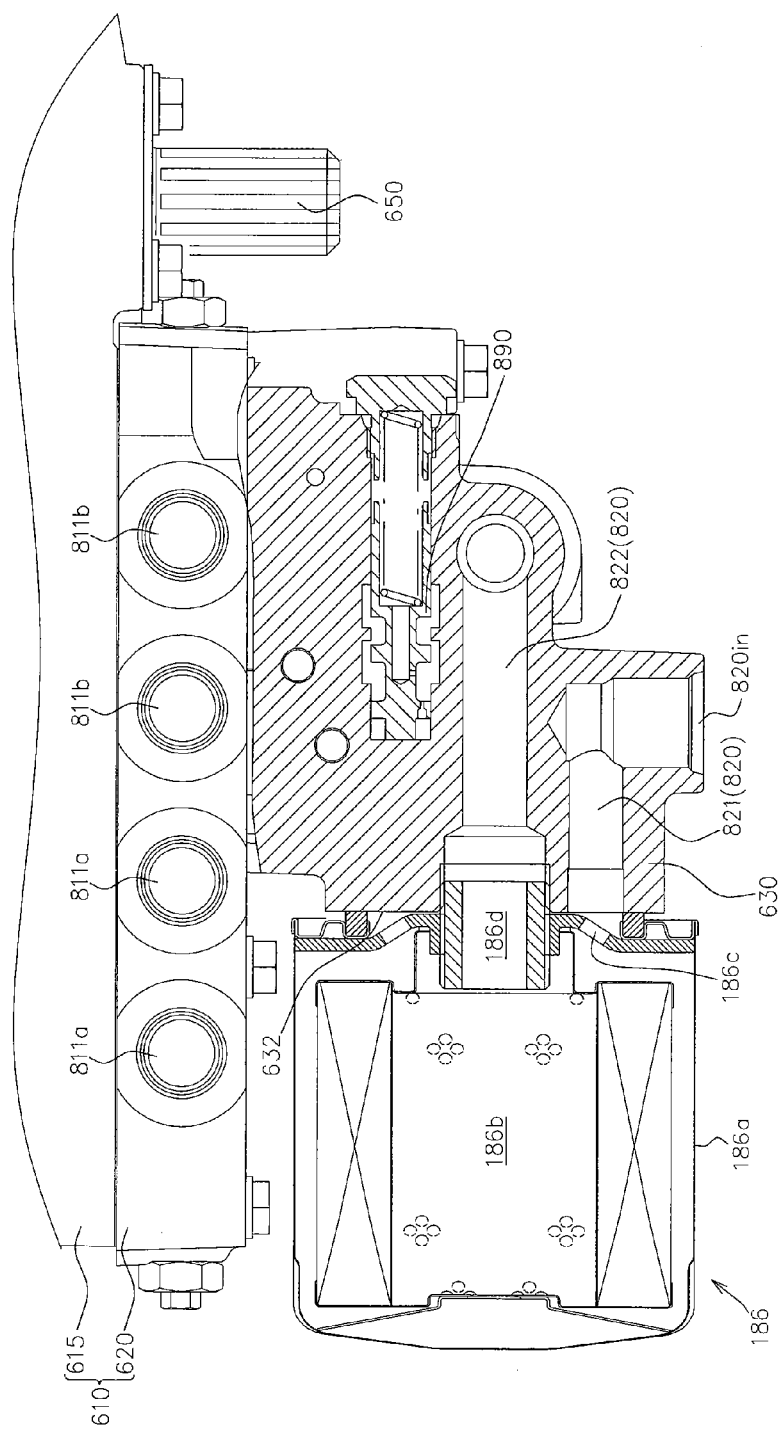
FIG. 59 is a cross section taken along line XXXXXIX-XXXXXIX in FIG. 56.

FIG. 59 is a cross section taken along line XXXXXIX-XXXXXIX in FIG. 56.

The filter 186, as shown in FIG. 59, includes a filer case 186a having a contact surface contacted to the filer-mounting surface 632, a filter body 186b accommodated in the filter case 186a, a filter-side suction passage 186c having an opening opened to the contact surface, and a filter-side discharge passage 186d having an opening opened to the contact surface, the filer-side discharge passage 186d being fluidly connected to the filter-side suction passage 186c through the filter body 186b.

The filter body 186b has a hollow shape. The filer-side suction passage 186c is fluidly connected to one of a gap between an outer surface of the filer body 186b and an inner surface of the filter case 186a or a hollow portion of the filter body 186b, and the filter-side discharge passage 186d is fluidly connected to the other of the gap or the hollow portion.

In the present embodiment, the filer-side suction passage 186c is fluidly connected to the gap, and the filter-side discharge passage 210d is fluidly connected to the hollow portion, as shown in FIG. 59.

As explained above, in the present embodiment, the filer-mounting surface 632 faces in the vehicle width direction. Consequently, the filter 186 is mounted at the filter-mounting surface 632 so as to be orthogonal to the axis line of the charge-driving-side pump shaft in a state where the openings of the filter-side suction passage 186c and the filter-side discharge passage 186d face in the horizontal direction.

The PTO shaft 650 is supported by the pump case 610 in a rotatable manner around its axis line so that its output end extends outwards.

In the present embodiment, as shown in FIG. 55, the PTO shaft 650 is supported by the second end wall 617 of the pump case body 615 and the lid member 625 in a rotatable manner around its axis line so that its end on a side away from the power source 180 forms the output end.

The output end of the PTO shaft 650 is operatively connected to an input portion of the working machine such as the mower device 20 via a vibration absorbing-type transmission means 25. In this embodiment, as shown in FIGS. 52 and 53, a transmission shaft having universal joints on both ends serves as the vibration absorbing-type transmission means 25.

The PTO shaft 650 is operatively driven by the power source 180, as described above.

In the present embodiment, the PTO shaft 650 receives rotational power from the power source through the PTO clutch device 660.

Specifically, the PTO clutch device 660, as shown in FIG. 55, includes a driving-side member 661 supported on the PTO shaft 650 in a rotatable manner relative to the PTO shaft 650, the driving-side member 661 being operatively connected to the input-side pump shaft; a driven-side member 662 supported on the PTO shaft 650 in a non-rotatable manner relative to the PTO shaft 650; and a friction plate group 663 including a driving-side friction plate supported in a non-rotatable manner relative to the driving-side member 661 and in a slidable manner in the axial direction and a driven-side friction plate supported in a non-rotatable manner relative to the driven-side member 662 and in a slidable manner in the axial direction, the friction plate group 663 being selectively taken a engaged state or disengaged state by the action of the hydraulic pressure.

In the present embodiment, the PTO clutch device 660 is of a hydraulic pressure operated type in which the friction plate group 663 is taken the engaged state when receiving the hydraulic pressure.

Consequently, the PTO clutch device 660 further includes a clutch-pushing member 664 for friction-engaging the friction plate group 663 by receiving the action of the hydraulic pressure, and a clutch-biasing member 665 for moving the clutch-pushing member 664 away from the friction plate group 663.

The driving-side member 661 is operatively connected to the input-side pump shaft through the power transmission mechanism 158.

In the present embodiment, the PTO shaft 650 is disposed in substantially parallel to the first and second pump shafts 111a, 111b on a side opposite of the first pump shaft 111a with the second pump shaft 111b as a reference.

In the configuration, the driving-side member 661 is engaged with the second gear 158b supported by the second pump shaft 111b in a relatively non-rotatable manner.

In the present embodiment, the pump unit 600 further includes a hydraulic PTO brake device 670 that operates in a contradictory manner with respect to the PTO clutch device 660, as shown in FIGS. 52 and 55.

The PTO brake device 670 is configured so as to apply the brake power to the PTO shaft 650 when the PTO clutch device 660 disengages the power transmission from the input-side pump shaft to the PTO shaft 650 and to release the brake power to the PTO shaft 650 when the PTO clutch device 660 engages the power transmission from the input-side pump shaft to the PTO shaft 650.

However the PTO shaft 650 is arranged in parallel to the first and second pump shafts 111a, 111b in the vehicle width direction in the present embodiment (see FIGS. 52 and 53) and the modified embodiment (see FIGS. 57 and 58), the present invention is not necessarily limited to this configuration.

Figure 60:
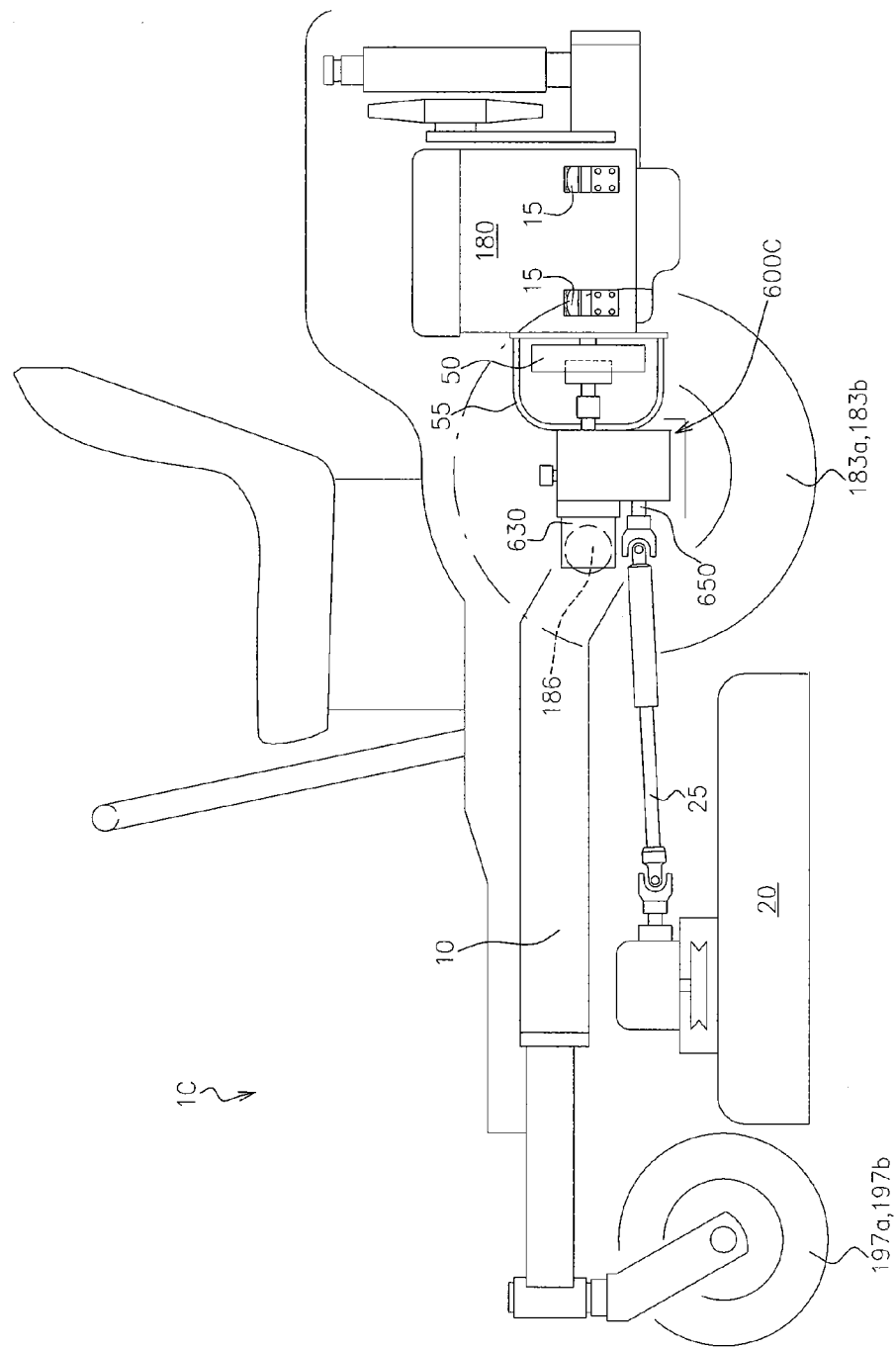
FIG. 60 is a side view of a working vehicle to which another modified pump unit according to the eleventh embodiment is applied.
Figure 61:
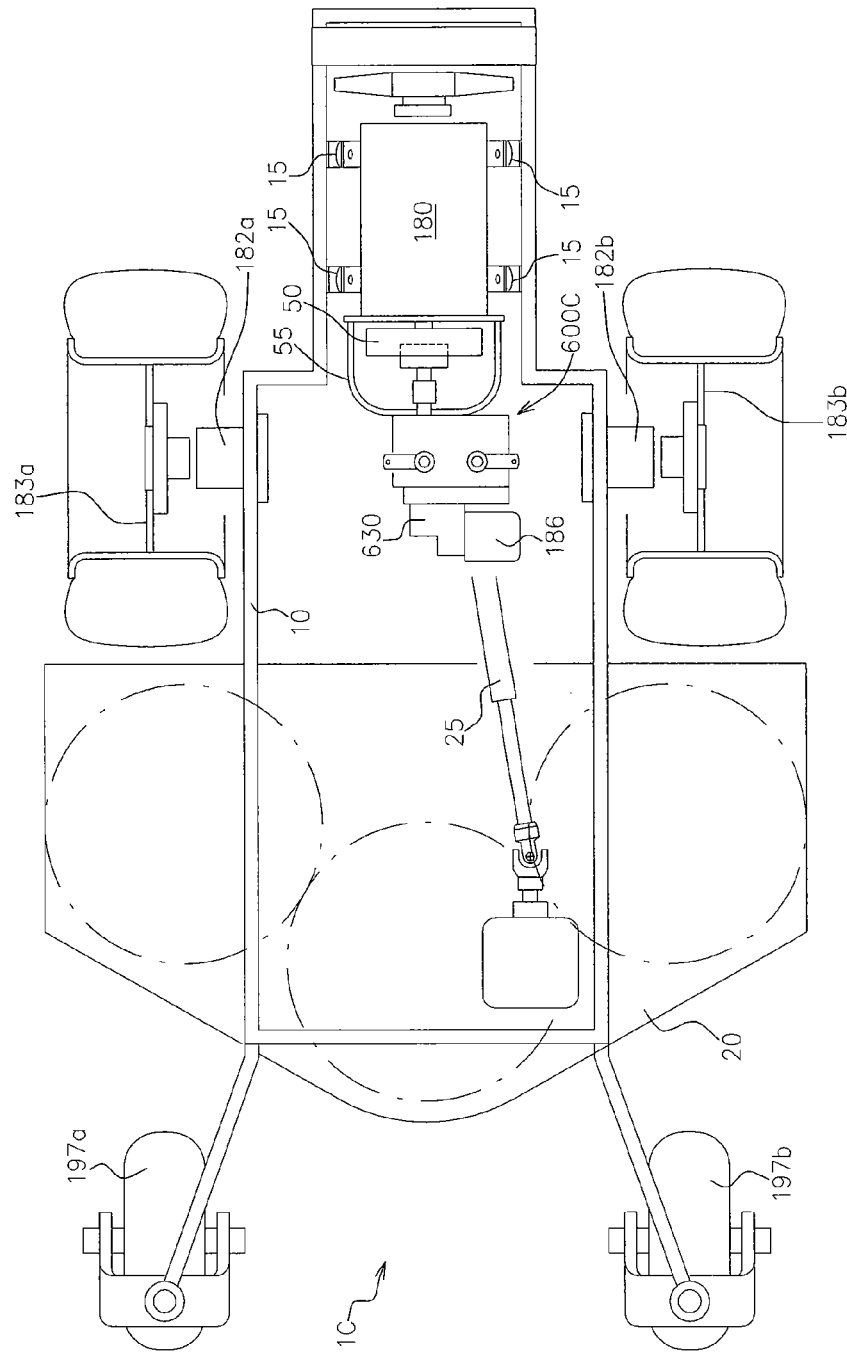
FIG. 61 is a plan view of the working vehicle shown in FIG. 60.

FIGS. 60 and 61 are, respectively, a side view and a plan view of a working vehicle 1C equipped with another modified embodiment 600C of the pump unit 600 according to the present embodiment.

Figure 62:
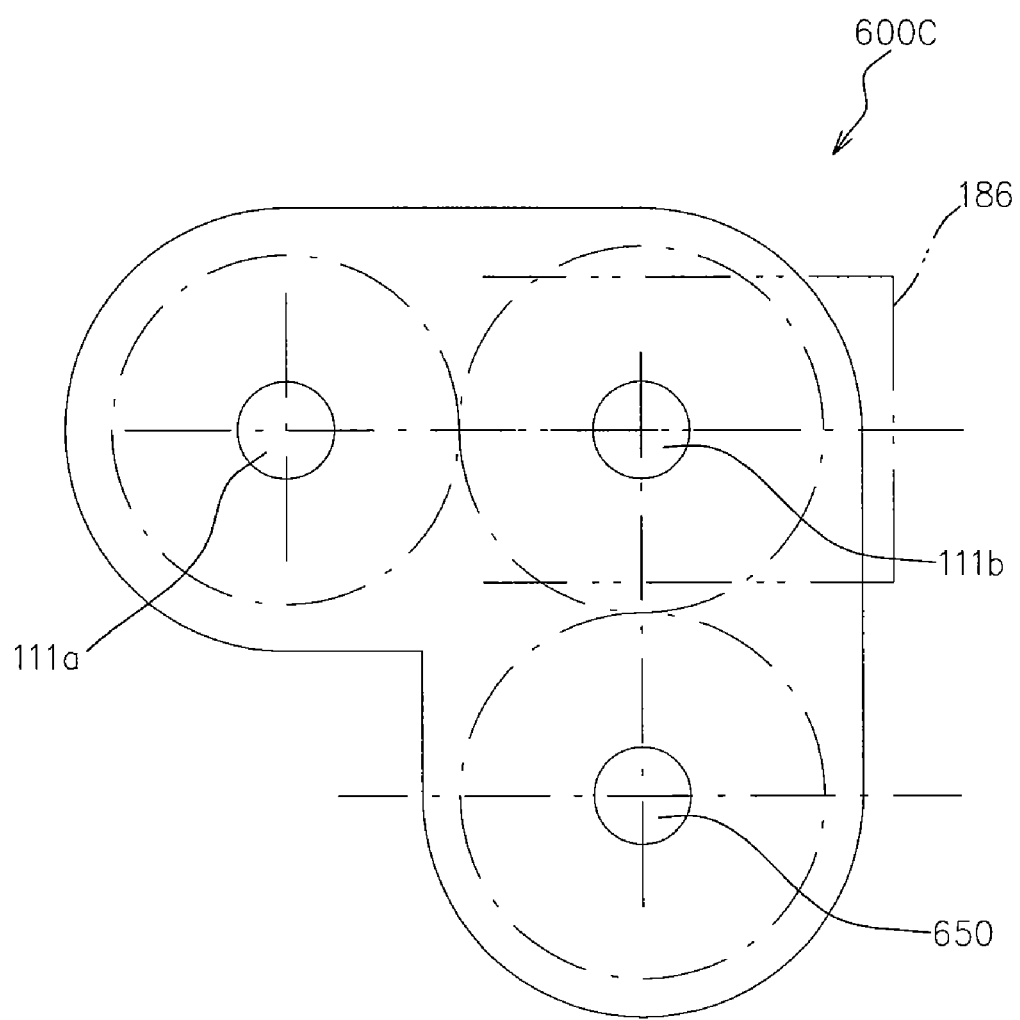
FIG. 62 is a schematic front view of the another modified pump unit.

FIG. 62 is a schematic front view of the pump unit 600C according to the another modified embodiment.

As shown in FIGS. 60-62, in the another modified pump unit 600C, the first pump shaft 111a functions as both the input-side pump shaft and the charge-driving-side pump shaft, the second pump shaft 111b which is the charge-non-driving-side pump shaft is arranged in parallel to the first pump shaft 111a in the vehicle width direction, and PTO shaft 650 is arranged at the substantially same position in the vehicle width direction and below in the vertical direction with respect to the second pump shaft 111b.

In the another modified pump unit 600C, the filter 186 is arranged at a space above the output end of the PTO shaft 650 so as to overlap with the second hydraulic pump 110b when seen from the front.

With the configuration, the PTO shaft 650 could be arranged at a below position, while achieving the above various effects. Consequently, an inclination angle of the transmission shaft 25 that is connected to the PTO shaft 650 could be decreased with respect to the up-and-down direction.

Now, the fluid passages in the pump unit 600 according to the present embodiment are explained.

As shown in FIG. 54, the pump unit 600, in the same manner as the pump unit 100 according to the first embodiment, includes the pair of first operation fluid passages 810a forming a part of the first pair of hydraulic lines 184a; the pair of second operation fluid passages 810b forming a part of the second pair of hydraulic lines 184b; a first bypass passage 815a that fluidly connects between the pair of first operation fluid passages 810a and in which a bypass valve 816 for selectively communicating or shutting off the first bypass passage 815a is inserted; a second bypass passage 815b that fluidly connects between the pair of second operation fluid passages 810b and in which a bypass valve 816 for selectively communicating or shutting off the second bypass passage 815b is inserted; the suction fluid passage 820 having a first end opened to an outer surface to form a suction port 820 in and a second end fluidly connected to the suction side 160 in of the charge pump 160; the discharge fluid passage 830 having a first end fluidly connected to the discharge side 160out of the charge pump 160; a charge passage 840 having a first end fluidly connected to the discharge fluid passage 830 and second ends fluidly connected to each of the pair of first operation fluid passages 810a and the pair of second operation fluid passages 810b via a check valve 845; a self-suction passage 850 having a first end fluidly connected to an inner space of the pump case 610 functioning as the fluid sump and a second end fluidly connected to the charge passage 840 at an upstream side of the check valve 845 in the flow direction of the charged fluid, the self-suction passage 850 in which a self-suction check valve 855 is inserted; and a pressure-setting passage 860 in which a main relief valve 865 for setting the hydraulic pressure of the discharge fluid passage 830 is inserted.

Furthermore, the pump unit 600, in the same manner as the embodiment 1, includes a first leak passage 870a which fluidly connects between one (preferably the first operation fluid passage 810a on a side in which the hydraulic pressure becomes high when the working vehicle travels in a rearward direction) of the pair of first operation fluid passages 810a and the charge passage 840 with bypassing the corresponding check valve 845, the first leak passage 870a having a throttle or an orifice inserted therein; and a second leak passage 870b which fluidly connects between one (preferably the second operation fluid passage 810a on a side in which the hydraulic pressure becomes high when the working vehicle travels in a rearward direction) of the pair of second operation fluid passages 810b and the charge passage 840 with bypassing the corresponding check valve 845, the second leak passage 870b having a throttle or an orifice inserted therein, as shown in FIG. 54.

With the leak passages 870a, 870b, it is possible to reliably secure the neutral range of the first HST formed by the first hydraulic pump 110a and the first hydraulic motor 182a and the second HST formed by the second hydraulic pump 110b and the second hydraulic motor 182b, while preventing traveling system transmission efficiency from worsening.

Further, the pump unit 600 is provided with a first relief passage 880a which fluidly connects between one (preferably the first operation fluid passage 810a on a side in which the hydraulic pressure becomes high when the working vehicle travels in a forward direction) of the pair of first operation fluid passages 810a and the charge passage 840 with bypassing the corresponding check valve 845 and in which a high-pressure relief valve 855 having a primary side fluidly connected to the one of the pair of first operation fluid passages 810a is inserted; and a second relief passage 880b which fluidly connects between one (preferably the second operation fluid passage 810b on a side in which the hydraulic pressure becomes high when the working vehicle travels in a forward direction) of the pair of second operation fluid passages 810b and the charge passage 840 with bypassing the corresponding check valve 845 and in which a high-pressure relief valve 855 having a primary side fluidly connected to the one of the pair of second operation fluid passages 810b is inserted.

With the first and second relief passages 880a, 880b, it is possible to effectively prevent the pair of first operation fluid passages 810a and the pair of second operation fluid passages 810b from becoming excessively high pressure.

The pair of first operation fluid passages 810a are formed in the center section 620 so as to have first ends opened to an outer surface to form a pair of first operation fluid ports 811a, in a state of being fluidly connected to the first hydraulic pump 110a via kidney ports, in the same manner as the embodiment 1.

The pair of second operation fluid passages 810b are also formed in the center section 620 so as to have first ends opened to an outer surface to form a pair of second operation fluid ports 811b, in a state of being fluidly connected to the second hydraulic pump 110b via kidney ports, in the same manner as the embodiment 1.

In the present embodiment, the suction fluid passage 820 is formed in the charge pump case 630 so that the filter 186 is inserted in the suction fluid passage 820, as shown in FIG. 59.

Figure 63:
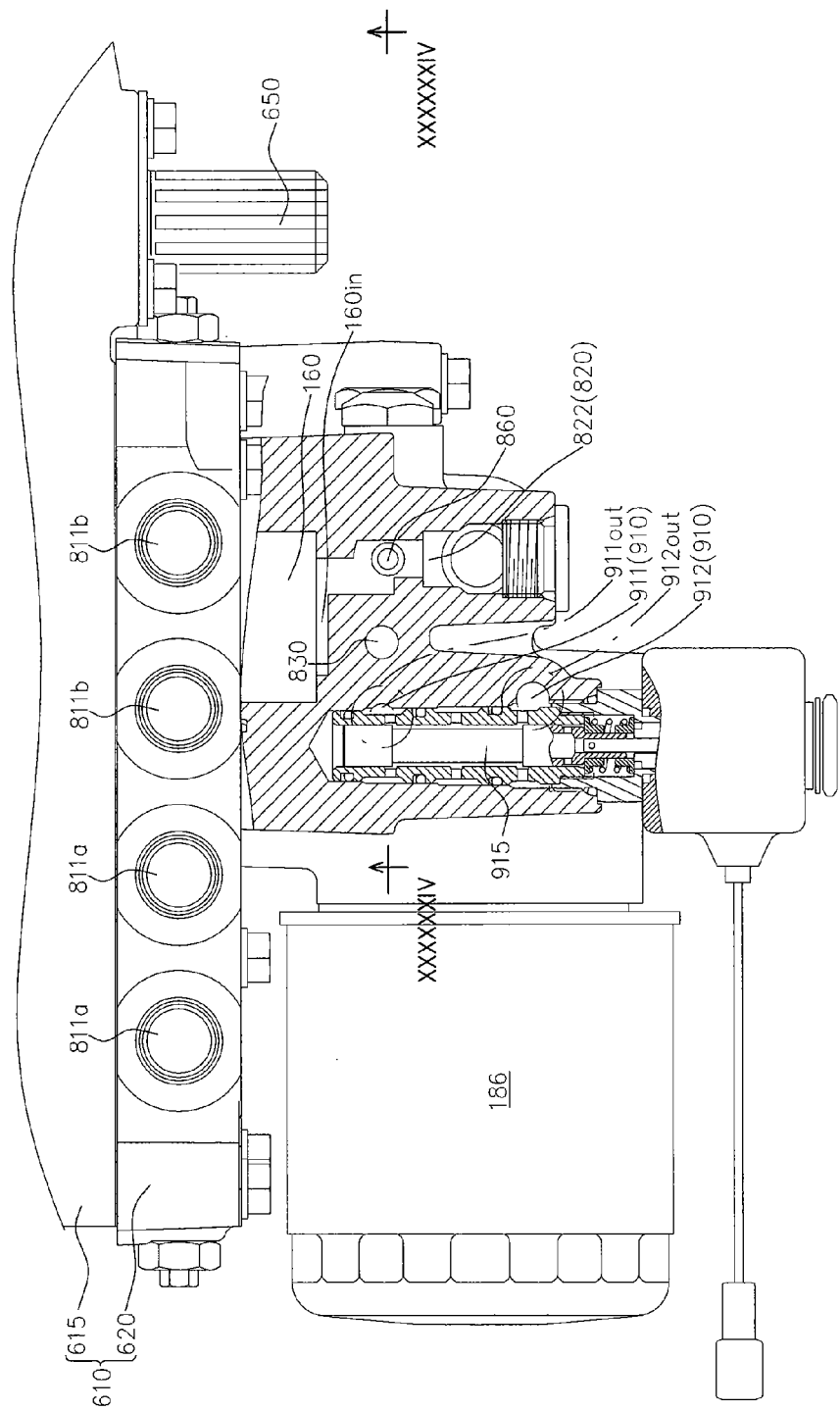
FIG. 63 is a cross section taken along line XXXXXXIII-XXXXXXIII in FIG. 56.

FIG. 63 is a cross section taken along line XXXXXXIII-XXXXXXIII in FIG. 56.

Specifically, as shown in FIGS. 59 and 63, the suction fluid passage 820 includes an upstream-side passage 821 having a first end opened to an outer surface to form the suction port 820 in and a second end opened to the filter-mounting surface 632 to fluidly connect to the filter-side suction passage 186c, and a downstream-side passage 822 having a first end opened to the filter-mounting surface 632 to fluidly connect to the filer-side discharge passage 186d and a second end fluidly connected to the suction side 160 in of the charge pump 160.

The suction port 820 in is fluidly connected to a reservoir tank 800 via an external conduit 825, as shown in FIG. 52.

Figure 64:
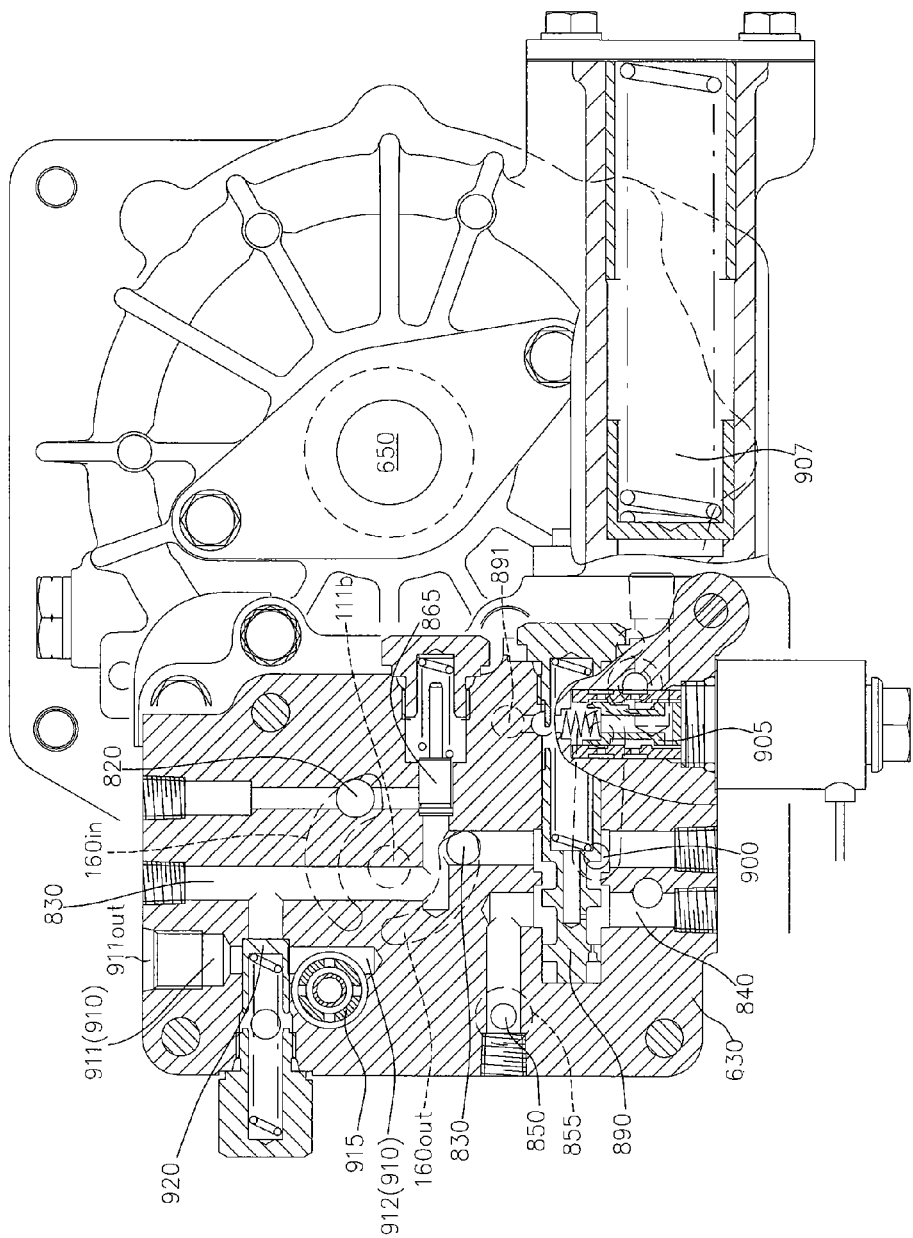
FIG. 64 is a cross section taken along line XXXXXXIV-XXXXXXIV in FIG. 63.

FIG. 64 is a cross section taken along line XXXXXXIV-XXXXXXIV in FIG. 63.

In the present embodiment, the discharge fluid passage 830 is formed in the charge pump case 630, as shown in FIG. 64.

The pressure-setting passage 860 and the charge passage 840 are fluidly connected to the discharge fluid passage 830.

Specifically, the pressure-setting passage 860 has a first end fluidly connected to the discharge fluid passage 830 so that a primary side of the main relief valve 865 is fluidly connected to the discharge fluid passage 830, as shown in FIGS. 54 and 64.

In the present embodiment, the pressure-setting passage 860 has a second end fluidly connected to the suction fluid passage 820 so that the charge pump 160 sucks excess fluid relieved from the main relief valve 865 again.

The charge passage 840 is fluidly connected to the discharge fluid passage 830 through a pressure-reducing valve 890, as shown in FIG. 54.

Specifically, the pressure-reducing valve 890 has a primary side fluidly connected to the discharge fluid passage 830 and a secondary side fluidly connected to the charge passage 840. A reference numeral 891 in FIGS. 54 and 64 is a drain passage fluidly connected the pressure-reducing valve 890.

In the present embodiment, the pressure-reducing valve 890 is accommodated in the charge pump case 630, as shown in FIG. 64.

To the discharge fluid passage 830, a PTO fluid passage 900 and a working machine operating fluid passage 910 in addition to the pressure-setting passage 860 and the charge passage 840 are fluidly connected.

Specifically, the pump unit 600 according to the present embodiment includes, in addition to the above various passages, the working machine operating fluid passage 910 for supplying a part of pressurized fluid in the discharge fluid passage 830 toward an external hydraulic device 30 such as a hydraulic lifting device for lifting up and down the mower device 20, and the PTO fluid passage 900 for supplying a part of pressurized fluid in the discharge fluid passage 830 to the PTO clutch device 660, as shown in FIG. 54.

As described above, the pump unit 600 according to the present embodiment is configured so as to supply the pressurized fluid from the charge pump 160 to the charge passage 840, the working machine operating fluid passage 910 and the PTO fluid passage 900, thereby effectively utilizing the pressurized fluid from the charge pump 160.

As shown in FIG. 54, the working machine operating fluid passage 910 has a proximal end fluidly connected to the discharge fluid passage 830 via a sequence valve 920 and a distal end opened to an outer surface to form a working machine operating fluid port 910out.

By providing the pump unit 600 with the working machine operating fluid passage 910 fluidly connected to the discharge fluid passage 830 as described above, it is possible to drive the external hydraulic device without providing an additional hydraulic pressure source such as an auxiliary pump.

Preferably, the working machine operating fluid port 910out, the pair of first operation fluid ports 811*a* and the pair of second operation fluid ports 811*b* are faced to the same direction.

With the configuration, it is possible to improve the workability in connecting external conduits to each of the ports 910out, 811*a*, and 811*b*.

In the present embodiment, the pair of first operation fluid ports 811*a* and the pair of second operation fluid ports 811*b* are positioned at one outer surface of the center section 620, and the working machine operating fluid port 910out is positioned at an outer surface which direct to the same direction as the one outer surface of the center section 620, out of the outer surfaces of the charge pump case 630.

Preferably, the pump unit 600 may be provided with a working machine switching valve 915 for selectively communicating or shutting off the working machine operating fluid passage 910.

By providing the pump unit 600 with the working machine switching valve 915, it is possible to simplify a hydraulic structure for performing supply-discharge control with respect to the external hydraulic device 30.

That is, the working machine switching valve is typically interposed within an external conduit for fluidly connecting between the hydraulic pressure source such as the auxiliary pump and the external hydraulic device in the prior arts. In the conventional configuration, an exclusive mounting member such as a mounting stay for fixing the working machine switching valve at a portion such as the vehicle frame to be mounted is needed. Further, in the conventional configuration, it is needed to fluidly connect between the hydraulic pressure source and the working machine switching valve via one external conduit and to fluidly connect between the working machine switching valve and the external hydraulic device via another external conduit. Consequently, the conventional configuration poses the problem of increasing the cost due to increase of the number of components and deterioration of assembling workability.

On the other hand, in the present embodiment, the working machine switching valve 915 is mounted at the pump unit 600, as explained above. The thus configured pump unit 600 could omit the exclusive mounting member and simplify the piping work. In the present embodiment, the working machine switching valve 915 is mounted at the charge pump case 630, as shown in FIGS. 63 and 64.

In the present embodiment, the working vehicle 1A includes a hydraulic lifting device for lifting up and down the mower device 20 as the external hydraulic device 30.

The hydraulic lifting device includes a cylinder 31 and a piston 35 accommodated in the cylinder 31 in a reciprocating manner, the piston 35 dividing an internal space of the cylinder 31 into a lifting-up chamber 32 and a lifting-down chamber 33. The hydraulic lifting device moves up or down the mower device 20 by selectively fluidly connecting the lifting-up chamber 32 to a hydraulic pressure source or a fluid sump.

The pump unit 600 according to the present embodiment includes first and second working machine operating fluid passages 911, 912 as the working machine operating fluid passage 910 in order to properly operate the hydraulic lifting device.

Specifically, the first working machine operating fluid passage 911 has a proximal end fluidly connected to the discharge fluid passage 830 via the sequence valve 920 and a distal end opened to the outer surface of the pump case 610 to form a first working machine operating fluid port 911out.

The second working machine operating fluid passage 912 has a proximal end fluidly connected to the discharge fluid passage 830 via the sequence valve 920 and a distal end opened to the outer surface of the pump case 610 to form a second working machine operating fluid port 912out.

The first port 911out is fluidly connected to the lifting-up chamber 32 through a first external conduit 915.

The second port 912out is connected to a second external conduit 916. Specifically, the second external conduit 916 has a proximal end connected to the second port 912out and distal ends that are branched so as to be fluidly connected to the lifting-down chamber 33 and the fluid sump.

In the configuration, the working machine switching valve 915 is interposed within the second working machine operating fluid passage 912.

The hydraulic lifting device 30 operates as follows according to the operating control of the working machine switching valve 915.

When the working machine switching valve 915 shuts off the second working machine operating fluid passage 912, the first working machine operating fluid passage 911 that is fluidly connected to the lifting-up chamber 32 is fluidly disconnected to the fluid sump. Consequently, the pressurized fluid flows into the lifting-up chamber 32 so that the piston 35 moves to the direction that causes the mower device 20 to move up.

On the other hand, when the working machine switching valve 915 communicates the second working machine operating fluid passage 912, the first working machine operating fluid passage 911 that is fluidly connected to the lifting-up chamber 32 is fluidly connected to the fluid sump through the second working machine operating fluid passage 912 and the second external conduit 916. Consequently, the pressure in the lifting-up chamber 32 is not increased so that the mower device 20 moves down due to its own weight.

In a case where the first and second working machine operating fluid passages 911, 912 are provided as the working machine operating fluid passage 910 as in the above configuration, the first and second ports 911out, 912out are preferably arranged so as to face the same direction.

More preferably, all of the first and second ports 911out, 912out, and the pair of first hydraulic fluid ports 811*a* and the pair of second hydraulic fluid ports 811*b* are arranged so as to face the same direction.

The PTO fluid passage 900 is fluidly connected to the discharge fluid passage 830 via a throttle or orifice 901, as shown in FIG. 54.

A PTO switching valve 905 selectively taking an operation fluid supply state in which the pressurized fluid from the discharge fluid passage 830 is supplied to the PTO clutch device 660 or an operation fluid discharge state in which the PTO fluid passage 900 is fluidly connected to the fluid sump, a PTO relief valve 906 for setting the hydraulic pressure in the PTO the PTO fluid passage 900, and an accumulator 907 for gradually increasing the hydraulic pressure of the PTO fluid passage 900 to the predetermined hydraulic pressure set by the PTO relief valve 906 are inserted within the PTO fluid passage 900.

In the present embodiment, the PTO switching valve 905 is mounted at the charge pump case 630, as shown in FIG. 64.

Twelfth Embodiment

A pump unit according to a twelfth embodiment of the present invention will be hereinafter described with reference to the attached drawings.

Figure 65:
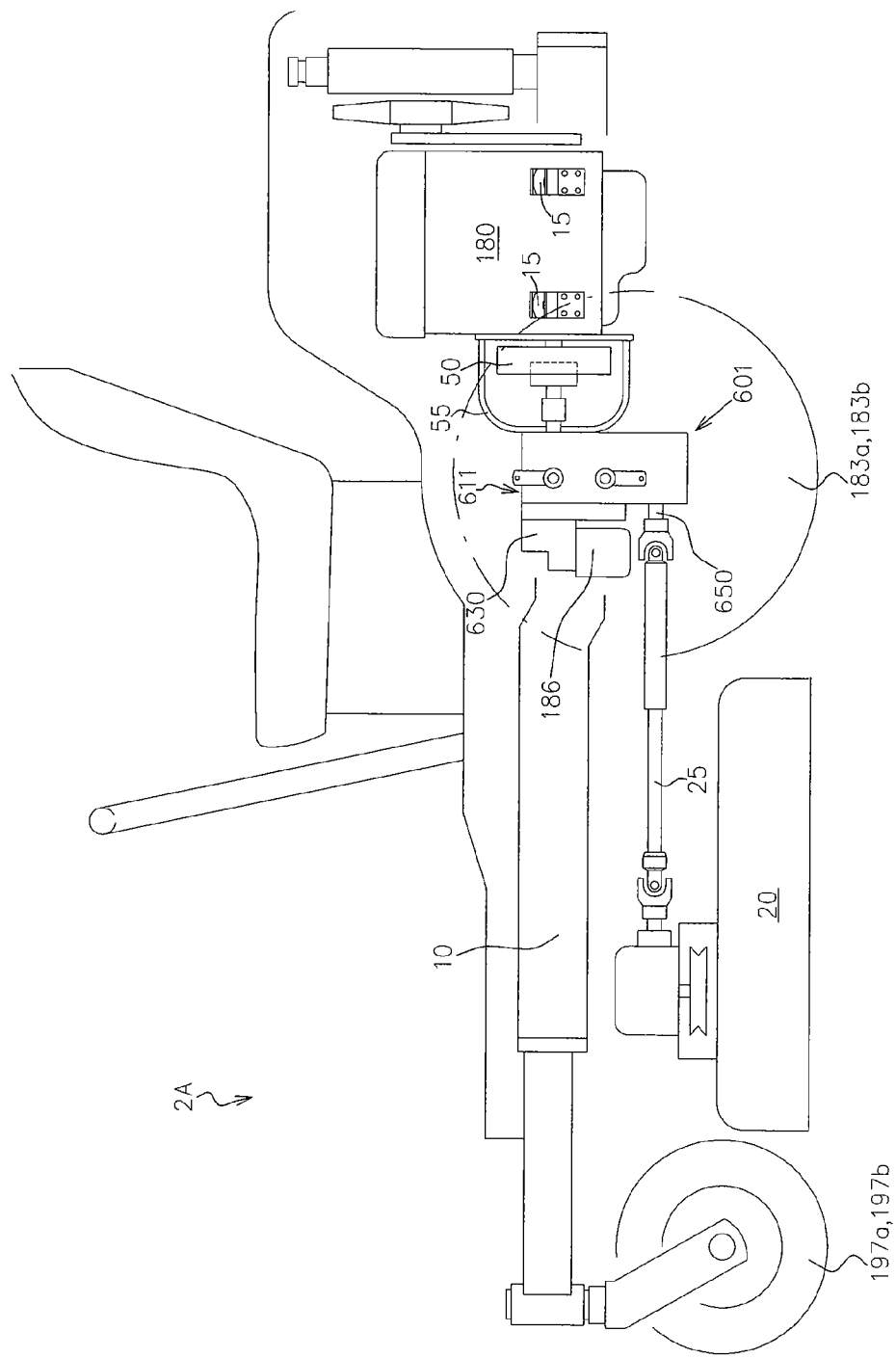
FIG. 65 is a side view of a working vehicle to which a pump unit according to the twelfth embodiment is applied.
Figure 66:
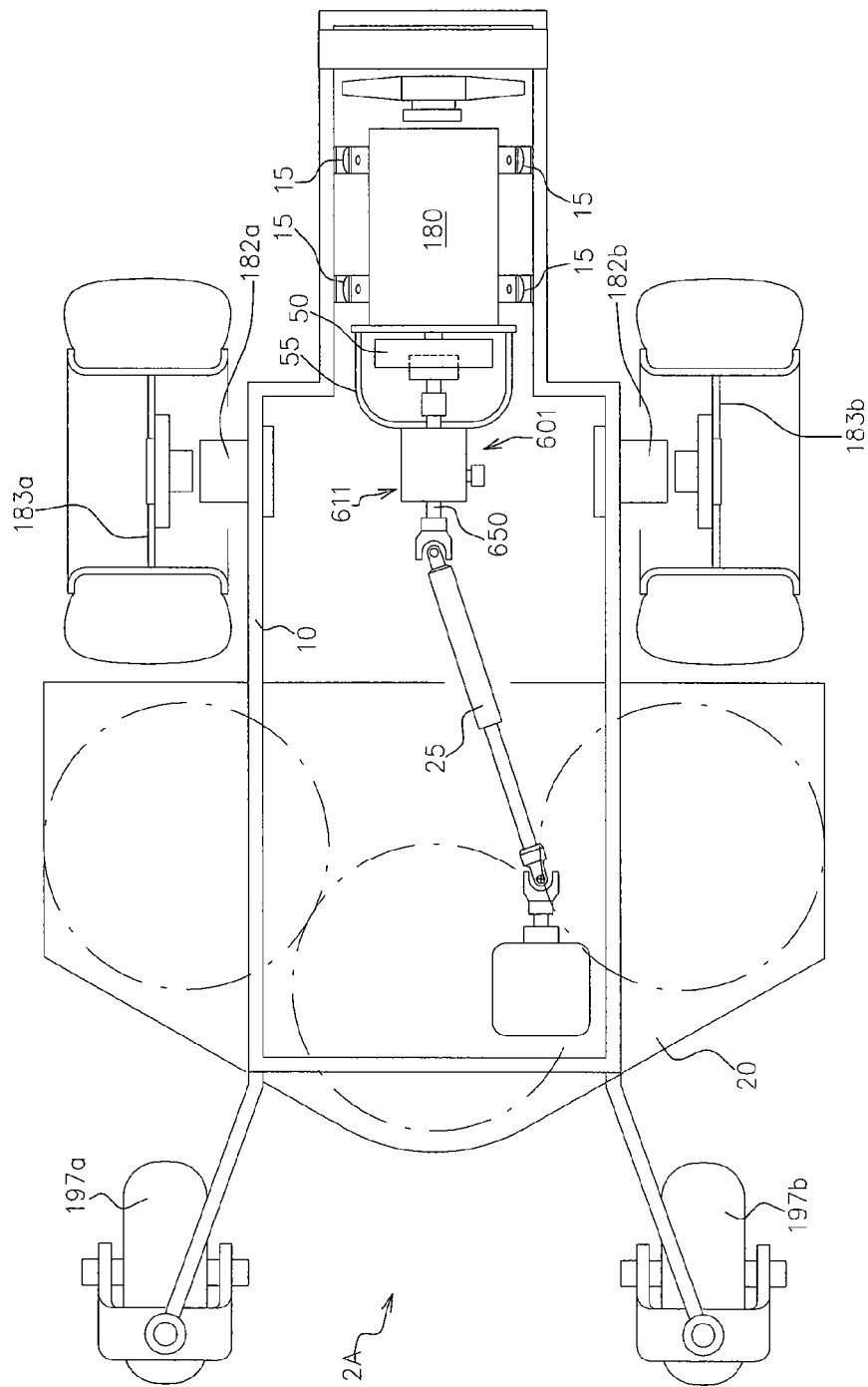
FIG. 66 is a plan view of the working vehicle shown in FIG. 65.

FIGS. 65 and 66 are a side view and a plan view of a working vehicle 2A to which a pump unit 601 according to the present embodiment is applied, respectively.

Figure 67:
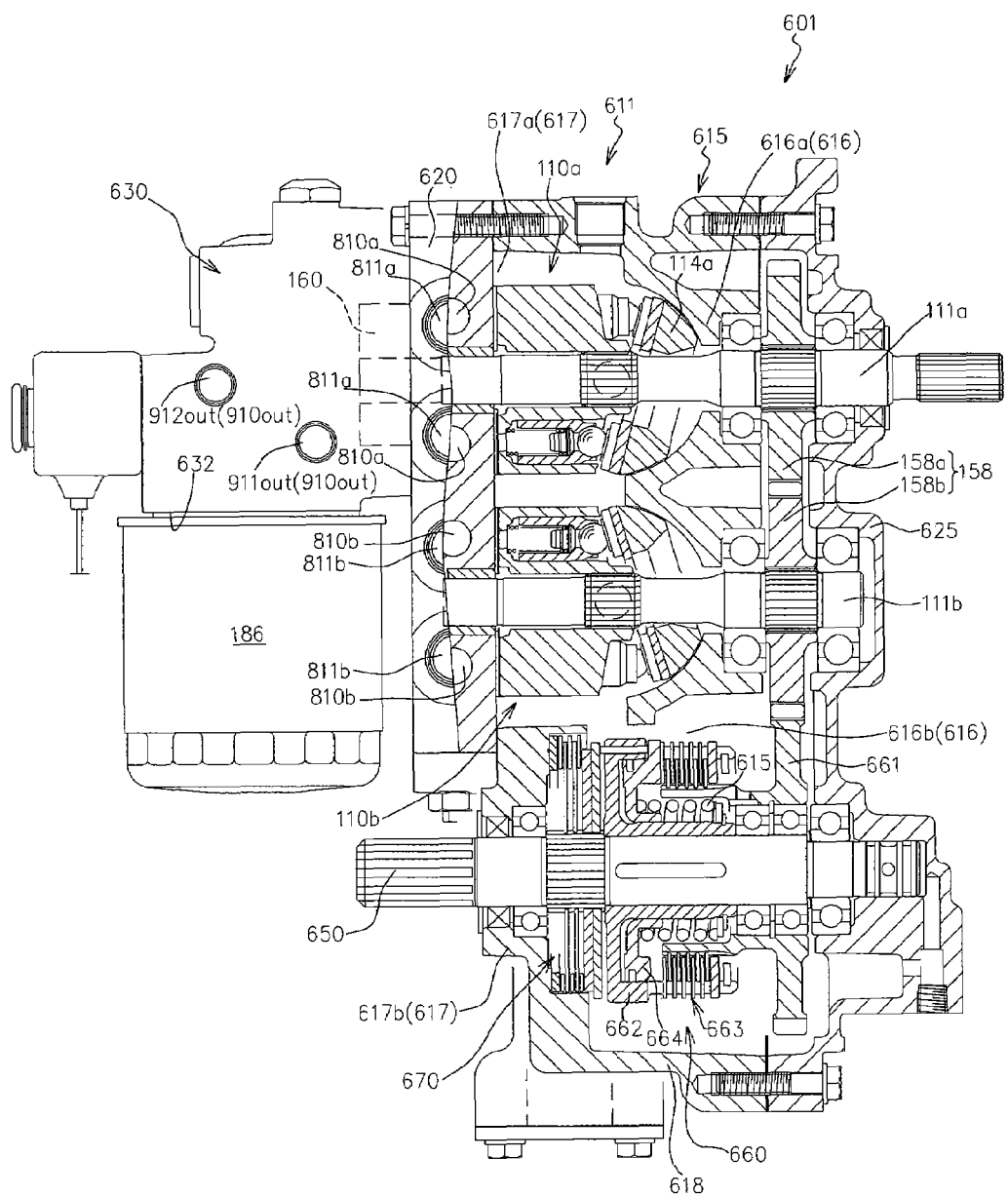
FIG. 67 is a vertical cross sectional side view of the pump unit according to the twelfth embodiment.

FIG. 67 is a vertical cross sectional side view of the pump unit 601.

In the figures, the same reference characters are denoted for the same members as in the eleventh embodiment, and the detailed explanations thereof are omitted.

In the eleventh embodiment, the filter 186 is mounted at the pump case 610 so as to extend along a horizontal direction on the basis of the mounting state of the pump unit 600 (see FIG. 61).

On the other hand, in the pump unit 601 according to the present embodiment, the filter 186 is mounted at the charge pump case 630 so that the openings of the filer-side suction passage 186c and the filter-side discharge passage 186d face upward on the basis of the mounting state of the pump unit 601.

The configuration where the filter 186 is mounted at the charge pump case 630 so that the openings of the filer-side suction passage 186c and the filter-side discharge passage 186d face upward effectively prevents air from remaining within in the filter 186, thereby stabilizing the operation of the hydraulic devices to which operation fluid are supplied through the discharge fluid passage 830.

Specifically, the pump unit 601 according to the present embodiment includes a pump case 611 in place of the pump case 610 in the pump unit 600 according to the eleventh embodiment.

The pump case 611 supports the first pump shaft 111a, the second pump shaft 111b and the PTO shaft 650 so that the second pump shaft 111b functioning as the charge-non-driving-side pump shaft is positioned substantially vertically below the first pump shaft 111a functioning as both the input-side pump shaft and the charge-driving-side pump shaft, and the PTO shaft 650 is positioned below the second pump shaft 111b.

In the configuration, the filter 186 is mounted at an outer surface facing below, out of the outer surfaces of the charge pump case 630 surrounding the charge pump 160 driven by the first pump shaft 111a, in a state that the openings of the filer-side suction passage 186c and the filter-side discharge passage 186d are directed upward.

The pump unit 601 according to the present embodiment could prevent the air from retaining within the filter 186 and also position the PTO shaft 650 as low as possible, thereby decreasing the inclination angle of the transmission shaft 25, which transmits rotational power from the PTO shaft 650 to the mower device 20, with respect to the up-and-down direction, in addition to the effects in the eleventh embodiment.

Figure 68:
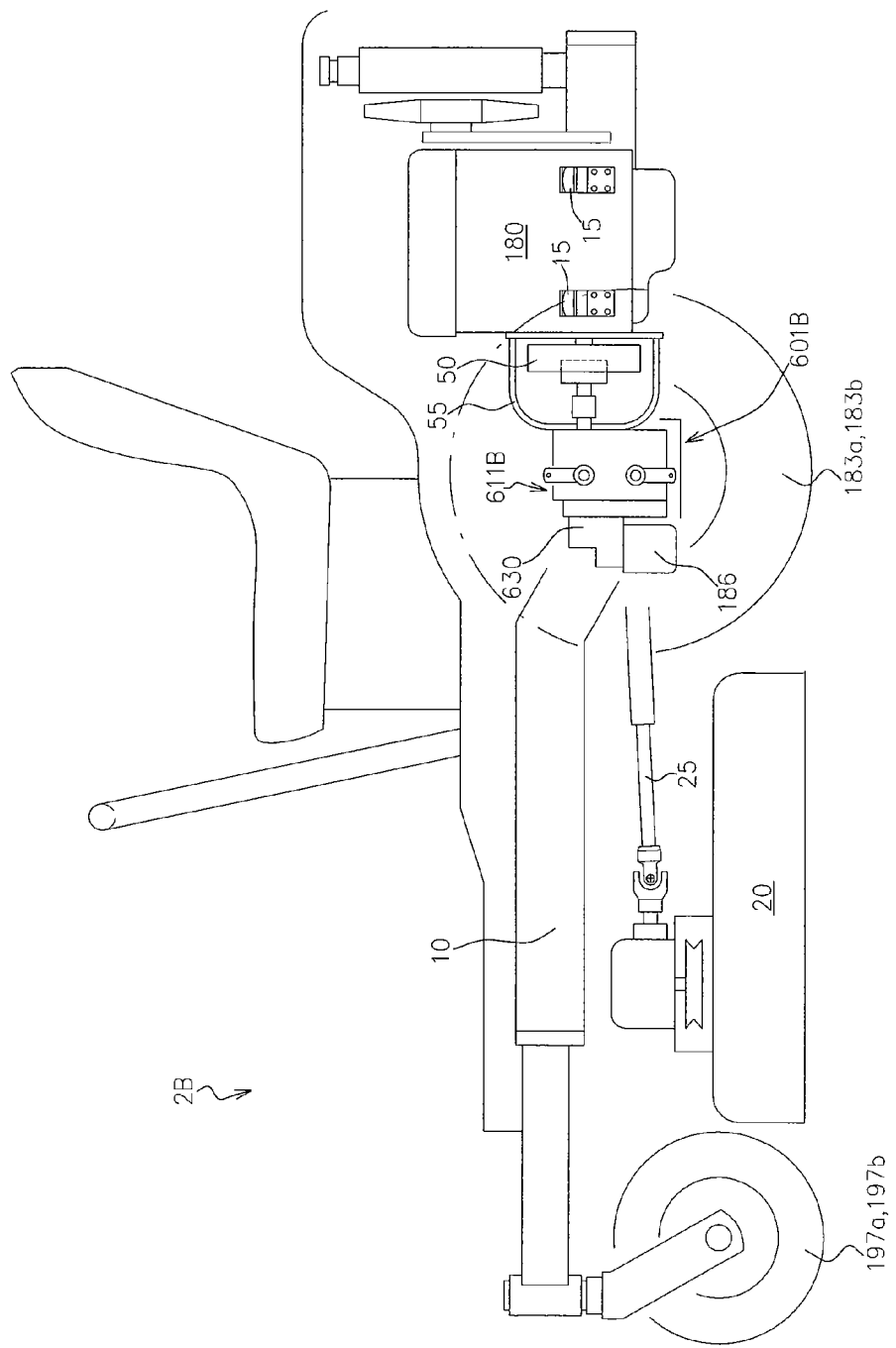
FIG. 68 is a side view of a working vehicle to which a modified pump unit according to the twelfth embodiment is applied.
Figure 69:
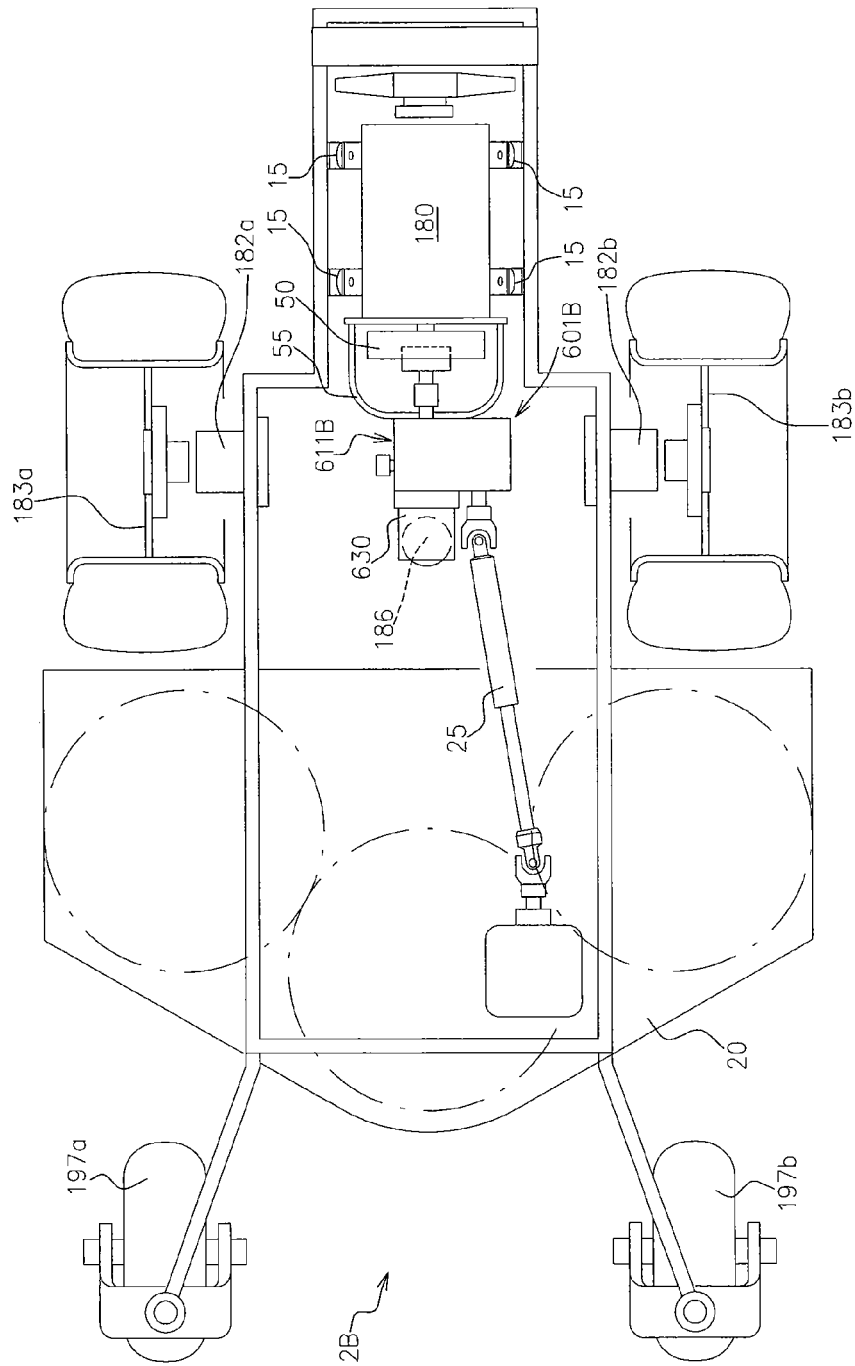
FIG. 69 is a plan view of the working vehicle shown in FIG. 68.

FIGS. 68 and 69 are respectively a side view and a plan view of a working vehicle 2B to which a modified pump unit 601B of the pump unit 601 is applied.

Figure 70:
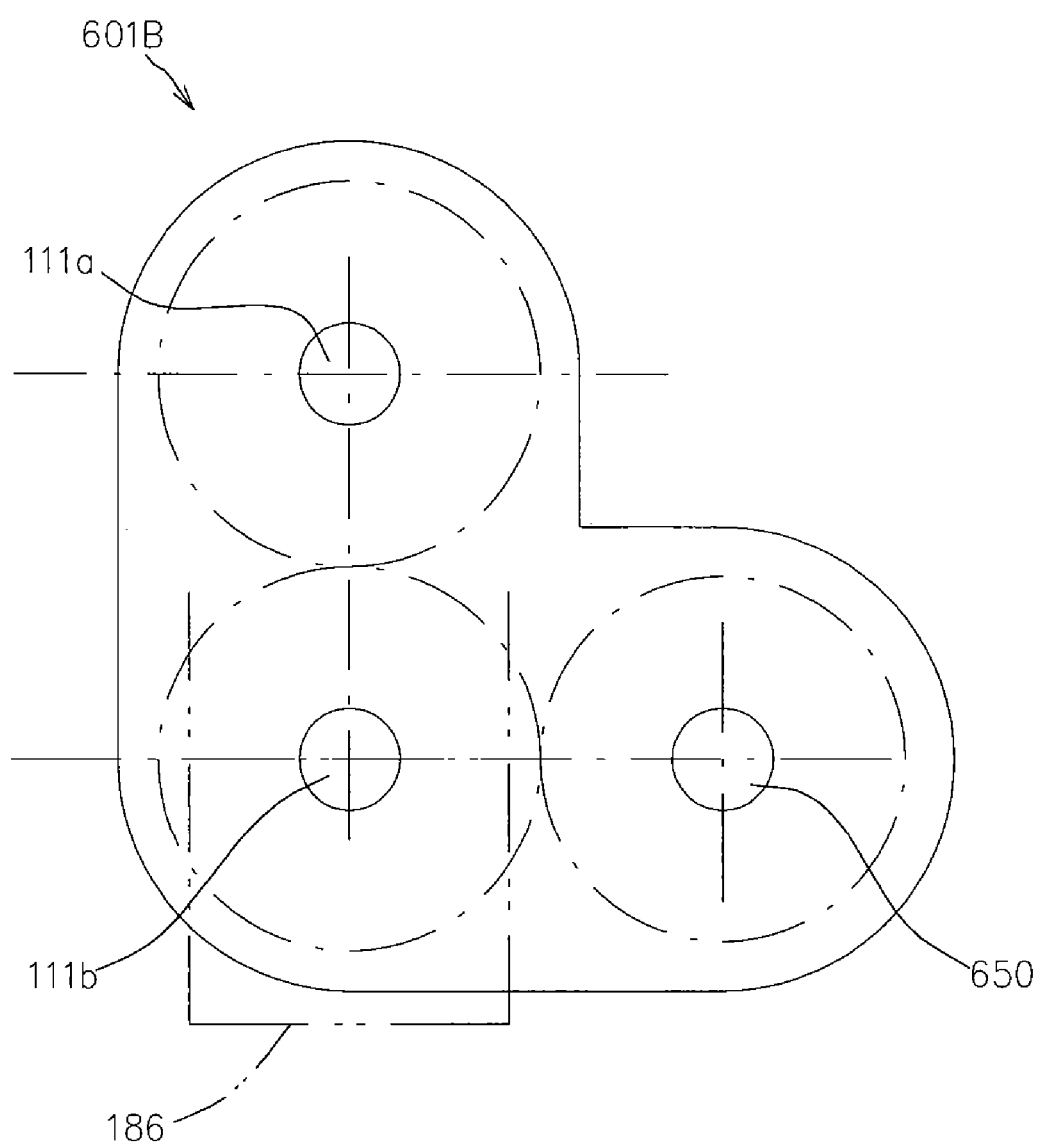
FIG. 70 is a schematic front view of the modified pump unit.

FIG. 70 is a schematic front view of the modified pump unit 601B.

As shown in FIGS. 68-70, the pump unit 601B according to the modified embodiment includes a pump case 611B. The pump case 611B supports the first pump shaft 111a, the second pump shafts 111b and the PTO shaft 650 so that the second pump shaft 111b functioning as the charge-non-driving-side pump shaft is positioned substantially vertically below the first pump shaft 111a functioning as the charge-driving-side pump shaft, and the PTO shaft 650 is displaced from the second pump shaft 111b in the vehicle width direction.

In the modified pump unit 601B, the filter 186 is mounted at the outer surface facing below, out of the outer surfaces of the charge pump case 630 surrounding the charge pump 160 driven by the first pump shaft 111a, in a state that the openings of the filer-side suction passage 186c and the filter-side discharge passage 186d are directed upward.

The modified pump unit IF could also arrange the PTO shaft at a below position while preventing the air from remaining within the filter 210.

This specification is by no means intended to restrict the present invention to the preferred embodiments set forth therein. Various modifications to the pump units described herein, may be made by those skilled in the art without departing from the spirit and scope of the present invention as defined in the appended claims.

What is claimed is:

1. A pump unit including a plurality of hydraulic pumps respectively fluidly connected to a plurality of hydraulic motors, which are disposed away from the pump unit, so as to form closed circuits, the pump unit comprising:
   (a) a pump case accommodating the plurality of hydraulic pumps so that the plurality of hydraulic pumps are operatively driven by a common power source;
   (b) a charge pump having a suction side fluidly connected to the fluid sump and a discharge side fluidly connected to a charge passage, the charge pump operatively driven by the common power source; and
   (c) a charge pump case accommodating the charge pump;
   (d) a filter inserted in the charge passage for replenishing operation fluid from a fluid sump to the closed circuits;
   (e) wherein the filter is mounted at the charge pump case in a threaded manner.

2. A pump unit including a plurality of hydraulic pumps respectively fluidly connected to a plurality of hydraulic motors, which are disposed away from the pump unit, so as to form closed circuits, the pump unit comprising:
   (a) a pump case accommodating the plurality of hydraulic pumps so that the plurality of hydraulic pumps are operatively driven by a common power source;
   (b) a charge pump having a suction side fluidly connected to the fluid sump and a discharge side fluidly connected to the charge passage, the charge pump operatively driven by the common power source;
   (c) a charge pump case accommodating the charge pump;
   (d) a filter inserted in a charge passage for replenishing operation fluid from a fluid sump to the closed circuits;
   (e) wherein the plurality of hydraulic pumps includes first and second hydraulic pumps respectively driven by first and second pump shafts that are arranged in parallel to each other;
   (f) the charge pump is driven by one of the first and second pump shafts, the one pump shaft having an output end that extends outwards from the pump case accommodating the first and second hydraulic pumps; and
   (g) the filter is mounted at the charge pump case so as to overlap with the hydraulic pump driven by the other pump shaft out of the first and second pump shafts when seen from the front along the axial direction of the first and second pump shafts.

3. A pump unit including a plurality of hydraulic pumps respectively fluidly connected to a plurality of hydraulic motors, which are disposed away from the pump unit, so as to form closed circuits, the pump unit comprising:
   (a) a pump case accommodating the plurality of hydraulic pumps so that the plurality of hydraulic pumps are operatively driven by a common power source;
   (b) a charge pump having a suction side fluidly connected to the fluid sump and a discharge side fluidly connected to a charge passage, the charge pump operatively driven by the common power source; and
   (c) a charge pump case accommodating the charge pump;

(d) a filter inserted in the charge passage for replenishing operation fluid from a fluid sump to the closed circuits;

(e) wherein the filter includes a filter case having a contact surface contacted to the charge pump case, a filter body accommodated in the filter case, and a filter-side suction passage and a filter-side discharge passage having openings opened to the contact surface, the filter-side suction passage and the filter-side discharge passage being fluidly connected to each other through the filter body; and (f) the filter is mounted at the charge pump case so that the openings of the filter-side suction passage and the filter-side discharge passage face upward on the basis of the mounting state of the pump unit.

4. A pump unit including a plurality of hydraulic pumps respectively fluidly connected to a plurality of hydraulic motors, which are disposed away from the pump unit, so as to form closed circuits, the pump unit comprising:

(a) a pump case accommodating the plurality of hydraulic pumps so that the plurality of hydraulic pumps are operatively driven by a common power source;

(b) a charge pump having a suction side fluidly connected to the fluid sump and a discharge side fluidly connected to a charge passage, the charge pump operatively driven by the common power source; and (c) a charge pump case accommodating the charge pump;

(d) a single filter inserted in a charge passage for replenishing operation fluid from a fluid sump to the closed circuits;

(e) wherein the plurality of hydraulic pumps includes first and second hydraulic pumps that are respectively driven by first and second pump shafts arranged in parallel with each other;

(f) wherein the charge pump is driven by one of the first and second pump shafts that has an end extending outward from the pump case; and (g) wherein the single filter is mounted at an outer surface of the charge pump case which extends in a direction that is parallel to the longitudinal axis line of one of the first and second pump shafts, and that faces towards the pump shaft that does not drive the charge pump.

5. A pump unit including a plurality of hydraulic pumps respectively fluidly connected to a plurality of hydraulic motors, which are disposed away from the pump unit, so as to form closed circuits, the pump unit comprising:

(a) a pump case accommodating the plurality of hydraulic pumps so that the plurality of hydraulic pumps are operatively driven by a common power source;

(b) a filter mounted at the pump case so as to be inserted in a charge passage for replenishing operation fluid from a fluid sump to the closed circuits;

(c) a charge pump having a suction side fluidly connected to the fluid sump and a discharge side fluidly connected to the charge passage, the charge pump operatively driven by the common power source;

(d) a suction fluid passage fluidly connected to a suction side of the charge pump;

(e) a discharge fluid passage fluidly connected to a discharge side of the charge pump;

(f) a charge passage for replenishing a part of pressurized fluid in the discharge fluid passage into each of the closed circuits; and (g) a working machine operating fluid passage for supplying a part of the pressurized fluid in the discharge fluid passage toward an external hydraulic device.

6. A pump unit according to claim 5 further comprising a working machine switching valve for selectively communicating or shutting off the working machine operating fluid passage.

7. A pump unit according to claim 6 wherein (a) the working machine operating fluid passage includes a proximal end fluidly connected to the discharge fluid passage and distal ends branched so as to have two working machine operating fluid ports; and (b) the working machine switching valve is inserted in one of the two branched passages.

8. A pump unit according to claim 5 wherein hydraulic fluid ports to the plurality of hydraulic motors and a working machine operating fluid port to the external hydraulic device are faced to the same direction with respect to one another.

9. A pump unit according to claim 5 further comprising a relief valve that has a primary side fluidly connected to the discharge fluid passage; wherein (a) the working machine operating fluid passage is fluidly connected to the discharge fluid passage via a sequence valve; and (b) the charge passage is fluidly connected to the discharge fluid passage via a pressure-reducing valve.

10. A pump unit according to claim 9, further comprising:

(a) a PTO shaft operatively driven by the common power source;

(b) a hydraulic PTO clutch for selectively engaging or disengaging power transmission from the common power source to the PTO shaft;

(c) a PTO fluid passage having a proximal end fluidly connected to the discharge fluid passage via an orifice and a distal end fluidly connected to the PTO clutch;

(d) a PTO switching valve inserted within the PTO fluid passage; and (e) a PTO relief valve having a primary side fluidly connected to the PTO fluid passage.

* * * * *